United States Patent [19]

Johnson et al.

[11] Patent Number: 5,231,521
[45] Date of Patent: Jul. 27, 1993

[54] CHIRAL SMECTIC LIQUID CRYSTAL POLARIZATION INTERFERENCE FILTERS

[75] Inventors: Kristina M. Johnson; Gary D. Sharp, both of Boulder, Colo.

[73] Assignee: The University of Colorado Foundation, Inc., Boulder, Colo.

[21] Appl. No.: 883,537

[22] Filed: May 15, 1992

Related U.S. Application Data

[63] Continuation-in-part of Ser. No. 522,215, May 1, 1990, Pat. No. 5,132,826, and a continuation-in-part of Ser. No. 855,646, Apr. 30, 1992.

[51] Int. Cl.$^5$ ............................................. G02F 1/133
[52] U.S. Cl. .................................. 359/93; 359/53; 359/56; 359/73; 359/63; 359/100
[58] Field of Search .................. 359/93, 94, 53, 63, 359/73, 66, 100, 56

[56] References Cited

U.S. PATENT DOCUMENTS

| | | | |
|---|---|---|---|
| 3,540,795 | 11/1970 | Harris | 359/73 |
| 3,912,369 | 10/1975 | Kashnow | 359/73 |
| 4,129,357 | 12/1978 | Title | 359/73 |
| 4,232,948 | 11/1980 | Shanks | 359/93 |
| 4,394,069 | 7/1983 | Kaye | 359/93 |
| 4,563,059 | 1/1986 | Clark et al. | 359/84 |
| 4,674,841 | 6/1987 | Buzak | 359/63 |
| 4,838,663 | 6/1989 | Lagerwall et al. | 359/100 |
| 4,958,916 | 9/1990 | Clark et al. | 359/84 |
| 5,107,356 | 4/1992 | Castleberry | 359/93 |
| 5,132,826 | 7/1992 | Johnson et al. | 359/93 |

FOREIGN PATENT DOCUMENTS

| | | |
|---|---|---|
| 0233418 | 2/1987 | European Pat. Off. |
| 2238200 | 7/1974 | France |
| 9009614 | 8/1990 | PCT Int'l Appl. |

OTHER PUBLICATIONS

Sharp et al., "Smectic liquid crystal tunable filters", Ferroelectrics, vol. 114, pp. 55-69, 1991.
Masterson et al. "Smectic liquid crystal turnable filters", Opt. Let. 14(22) :1249-1251, Nov. 1989.
Andersson et al. "Device physics of the soft-mode electro-optic effect" J. Appl. Phys. 66(10):4983-4995, Nov. 1989.
Funfschilling et al., "Fast responding and highly multiplexible distorted helix ferroelectric liquid crystal display" J. Appl. Phys. vol. 66, No. 8, Oct. 1989, pp. 3877-3882.

(List continued on next page.)

Primary Examiner—William L. Sikes
Assistant Examiner—Huy K. Mai
Attorney, Agent, or Firm—Greenlee and Winner

[57] ABSTRACT

The present invention provides optical polarization interference filters which employ chiral smectic liquid crystal (CSLC) cells as electronically rotatable retarders. The filters of the present invention are improved in that they are optimized for increased spectral discrimination, uniqueness of spectral outputs and efficient use of CSLC elements. The filters of the present invention include improved single and multiple stage filters. Improved discretely tunable and continuously tunable filters are provided. With respect to filters having one or more stages that contain a series of birefringent elements which are either fixed birefringent elements or active CSLC cells, this invention provides designs which optimize the number of pure spectral outputs which are unique. This optimization relates to the relative order of elements in a stage, the pattern of switching of the active CSLC cells, and the retardations of the CSLC cells in a stage. In a specific embodiment, this invention provides an improved tunable filter that substantially retains the transmissions of a Lyot-type multiple stage filter without requiring the thicknesses of the active CSLC cells to increase geometrically. Continuously tunable filters of this invention include those having a stage which has an analog variable retarder which is the combination of an achromatic quarter-waveplate and one or more analog CSLC cells in series.

42 Claims, 21 Drawing Sheets

OTHER PUBLICATIONS

Sharp et al. "Continuously tunable smectic A* liquid crystal color filter" Opt. Lett. 15(10):523-525, May 1990.

Title et al. "Tunable birefringent filters", Optical Engineering, vol. 20, No. 6, 1981, pp. 815-823.

Evans, "The birefringent filter", Journal of the Opt. Soc. America, vol. 39, No. 3, Mar. 1949, pp. 229-242.

Weis et al., "Electromagnetic transmission and reflection characteristics of anisotropic multilayered structure", J. Opt. Soc. Am., vol. 4, No. 9, 1987, p. 1720.

Andersson et al. Appl. Phys. Lett., vol. 51, No. 9, Aug. 1987, pp. 640-642.

Lagerwall et al. "Ferroelectric liquid crystal" (1989) Ferroelectrics 94:3-62.

PCT International Examination Report, PCT/US90/06288 dated Mar. 19, 1992.

PCT Internation Search Report for PCT/US90/06288 dated Mar. 4, 1991.

CHIRAL SMECTIC LIQUID CRYSTAL POLARIZATION INTERFERENCE FILTERS

This application is a continuation-in-part of U.S. patent application Ser. No. 07/522,215, filed May 1, 1990 now U.S. Pat. No. 5,132,826 and U.S. patent application Ser. No. 07/855,646, filed Apr. 30, 1992, both of which are incorporated in their entirety by reference herein.

FIELD OF THE INVENTION

The present invention relates to tunable optical filters and display elements which employ chiral smectic liquid crystal materials, particularly ferroelectric liquid crystal materials in tuning elements.

BACKGROUND OF THE INVENTION

Birefringent or polarization interference filters were first used in solar research where sub-angstrom spectral resolution is required to observe solar prominences. The first type of birefringent filter was invented by Lyot (Lyot, B. (1933) Comptes rendus 197:1593) in 1933. The basic Lyot filter (Yariv, A. and Yeh, P. (1984) *Optical Waves in Crystals*, Chapter 5, John Wiley and Sons, New York) can be decomposed into a series of individual filter stages. Each stage consists of a birefringent element placed between parallel polarizers. The exit polarizer for a particular stage acts as the input (or entrance) polarizer for the following stage. In a Lyot-type filter, fixed birefringent elements are oriented with optic axes parallel to the interface and oriented at 45° to the direction of the input polarization. The thickness, and therefore the retardation of the birefringent elements, increases geometrically in powers of two for each successive stage in the conventional Lyot geometry Lyot-like filters in which thicknesses of the birefringent elements in successive stages increase in various arithmetic, geometric and other mathematic progressions, such as in a Fibinacci series (i.e., 1,1,2,3,5 . . . ) have been implemented. Multiple stage devices have been demonstrated with high resolution (0.1 angstrom) and broad free-spectral-range (FSR) (entire visible spectrum) (Title, A. M. and Rosenberg, W. J. (1981) Opt. Eng. 20:815).

More recently, research in optical filters has focused on tuning the wavelength of peak transmission. An optical filter which can be rapidly tuned has applications in remote sensing, signal processing, displays and wavelength division multiplexing. Tunability of otherwise fixed frequency Lyot filters has been suggested and implemented using various techniques (Billings, B. H. (1948) J. Opt. Soc. Am. 37:738; Evans, J. W. (1948) J. Opt. Soc. Am. 39:229; Title, A. M. and Rosenberg, W. J. (1981) Opt. Eng. 20:815). These include mechanical methods such as stretching plastic sheets in series with the birefringent elements (Billings, B. H. (1948) J. Opt. Soc. Am. 37:738), mechanically rotating waveplates or sliding wedge plates (Title, A. M. and Rosenberg, W. J. (1981) Opt. Eng. and Evans, J. W. (1948) J. Opt. Soc. Am. 39:229), changing the retardation of the birefringent elements by temperature tuning the birefringence, or changing the birefringence using electro-optic modulators (Billings, B. H. (1948) J. Opt. Soc. Am. 37:738). Temperature tuning and mechanical tuning methods are inherently slow. Electro-optic tuning of known filter devices, while much more rapid, requires large drive voltages and is limited in bandwidth by material breakdown voltages for the thin birefringent elements required (Weis, R. S. and Gaylord, T. K. (1987) J. Opt. Soc. Am. 4:1720).

Other electronically tunable filters, which have been demonstrated include acousto-optic tunable filters (AOTF) (Harris, S. E. and Wallace, R. W. (1969) J. Opt. Soc. Am. 59:744; Chang, I. C. (1981) Opt. Eng. 20:824), electro-optic tunable filters (EOTF) (Pinnow, D. A. et al. (1979) Appl. Phys. Lett. 34:391; Lotspeich, J. F. et al. (1981) Opt. Eng. 20:830), multiple-cavity Fabry-Perot devices (Gunning, W. (1982) Appl. Opt. 21:3129) and hybrid filters such as the Fabry-Perot electro-optic Sölc filter (Weis, R. S. and Gaylord, T. K. (1987) J. Opt. Soc. Am. 4:1720).

The operation of the AOTF is based on the interaction of light with a sound wave in a photoelastic medium. Strong acousto-optic interaction only occurs when the Bragg condition is satisfied. Therefore, only one spectral component of incident radiation is diffracted from the structure at a given acoustic frequency. Tuning is accomplished by changing the acoustic frequency. This was the first electrically tunable filter, which succeeded in varying the transmission wavelength from 400 nm to 700 nm by changing the acoustic frequency from 428 MHz to 990 MHz with a bandwidth of approximately 80 nm (Harris, S. E. and Wallace, R. W. (1969) J. Opt. Soc. Am. 59:744). Current AOTF's have 12° fields of view, high throughput, high resolution and broad tunability (Chang, I. C. (1981) Opt. Eng. 20:824). However, power requirements are high for many applications (on the order of 10 watts/cm$^2$) and frequency shifts induced by the filter prohibit the use of AOTF's in laser cavities. Furthermore, in AOTF's there is a tradeoff between resolution and tuning speed.

The electro-optic tunable filter (EOTF) consists of a Y-cut LiTaO$_3$ platelet, placed between crossed polarizers, with an array of separately addressable finger electrodes (Pinnow, D. A. et al. (1979) Appl. Phys. Lett. 34:391). Tunability is accomplished by applying a spatially periodic (sinusoidal) voltage to the 100 electrodes. Current applications of this device, however, utilize more elaborate programmable passband synthesis techniques (Lotspeich, J. F. et al. (1981) Opt. Eng. 20:830). While the power requirements for the EOTF are low, it suffers from a small clear aperture and field-of-view. This is also the main disadvantage of the Fabry-Perot devices.

Color switching has been described in liquid crystal displays which incorporate dichroic dyes (see: e.g. Aftergut et al. U.S. Pat. No. 4,581,608). Buzak U.S. Pat. No. 4,674,841 refers to a color filter switchable between three output colors incorporating a variable retarder which is a twisted nematic liquid crystal cell. Nematic liquid crystals have also been used for tuning optical filters (Kaye, W. I., U.S. Pat. No. 4,394,069; Tarry, H. A. (1975) Elect. Lett. 18:47; Gunning, W. (1980) Proc. SPIE 268:190; and Wu, S. (1989) Appl. Opt. 28:48). A disadvantage of these filters is their slow tuning speed (~100 ms), which is a particular problem in high resolution applications since the switching speed decreases as the order of the retarder increases. These filters are also limited in spatial resolution and angular viewing capability.

The surface stabilized ferroelectric liquid crystal (SSFLC) cell has been shown to possess properties useful in optical shutters and a number of other optoelectronic device applications requiring high contrast ratio or large modulation depth. These include electro-optic shutters, spatial light modulators for opto-electronic computing, and flat panel display devices. In such devices, the speed of response is often important. This response speed is given approximately by the equation:

$$\tau = \frac{1.8\,\eta}{P\,E}$$

where $\tau$ is the optical response (10%–90%) to an applied electric field of magnitude E, $\eta$ is the orientational viscosity, and P is the ferroelectric polarization density. FLC cells combine moderately fast switching speeds, with low voltage requirements and high contrast.

The physics and operation of the surface stabilized FLC (SSFLC) cells have been extensively described (Clark, N. A. et al. (1983) Mol. Cryst. Liq. Cryst. 94:213; and in U.S. Pat. Nos. 4,367,924, 4,563,059, 4,813,767, 4,840,463 and 4,958,916 all of Clark and Lagerwall). An SSFLC cell is typically formed of uniformly-spaced transparent or semi-transparent retaining walls of an inert substrate, like glass. The inside surface of the substrate walls is provided with transparent or semi-transparent electrodes. A FLC composition, often a mixture of components, is inserted between the uniformly-space transparent electrodes and the FLC molecules are aligned with respect to the substrate walls and electrodes. In an SSFLC, smectic layers are aligned perpendicular to the substrate walls which bound the FLC layer. In a SmC* SSFLC the molecular director $\hat{n}$, i.e., the optic axis of the cell, makes an angle $\alpha$ to the smectic layer normal ($\hat{z}$) in the plane of the substrate walls. Application of an appropriate electric field to the cell electrodes allows selection between two $\hat{n}$ orientation states separated by $2\alpha$. For many SmC* FLC mixtures, $\alpha = \pm 22.5°$, and such SmC* SSFLC cells can act like retarders which can be electronically rotated by 45°. The voltage requirements for SSFLC switching devices are modest ($\pm 10$ V), and power consumption is quite low because the voltage need not be applied to maintain the FLC in the switched state, i.e., the devices are bistable (Clark, N. A. and Lagerwall, S. T. (1980) Appl. Phys. Lett. 36:899). Typical switching times for SmC* SSFLC cells are <44 $\mu$s at room temperature (ZLI-3654 mixture available from E. Merck, D-6100 Darmstadt 1, Frankfurter, Strabe, 250, F.R.G.).

Light valves have also been based upon the so called electroclinic effect in chiral smectic A (SmA*) LC materials. These devices exhibit several attractive features (see, Anderson et al. (1987) Appl. Phys. Lett. 51:640), including very fast response and voltage regulated gray scale. A number of SmA* materials have been shown to display an electroclinic effect when incorporated into SSFLC type cells. The applied voltage induces a rotation of the optic axis in these materials in an analog fashion up to a maximum $\alpha_{MAX}$. The effect is described as being linear in applied voltage with very rapid response. SmA* materials having $\alpha_{MAX}$ up to about 22.5° are known in the art, although $\alpha_{MAX}$ for most SmA* materials is considerably less than 22.5°.

The distorted helix ferroelectric (DHF) effect has been described with smectic C* liquid crystals having a short pitch (see: Ostrovski and Chigrinov (1980) Krystallografiya 25:560; Ostrovski et al. in *Advances in Liquid Crystal research and Application*, (L. Bata, ed.) Pergamon, Oxford; Funfschilling and Schadt (1989) J. Appl. Phys. 66:3877). In SSFLC cells incorporating certain short-pitch materials, the helix of the material is not suppressed, and thus the helix can be distorted by the application of an electric field. This distortion results in a electric field-dependent, spatially-averaged change in the tilt angle of the material coupled with a voltage-dependent variation in spatially averaged birefringence. DHF cells are attractive since induced tilt angles as high as about $\pm 38°$ can be attained with applied voltages lower than those required for SmA* electroclinic and SmC* SSFLC cells. Beresnev et al., EPO Patent Application EP 309,774, published Apr. 5, 1989, describe DHF cells. DHF materials are further described in Buchecker et al., EP 339,414, published Nov. 2, 1989.

Ozaki et al. (1985) Jpn. J. Appl. Phys. (part 24 (suppl.24-3):63 refers to a high speed color switching element in which dichroic dyes are mixed with ferroelectric liquid crystals. Color switches and or displays which combine color filters and ferroelectric liquid crystal cell shutters have been described. See: e.g. Seikimura et al. U.S. Pat. No. 4,712,874; Takao et al. U.S. Pat. No. 4,802,743; Yamazaki et al. U.S. Pat. No. 4,799,776; Yokono et al. U.S. Pat. No. 4,773,737.

Carrington et al. (1989) Second International Conference on Ferroelectric Liquid Crystals Program and Abstracts (Göteborg, Sweden, 27–30 June 1989) Abstract 015 refers to rapid switching of spatial arrays of FLC two color switches in color displays.

Lagerwall et al. (1989) "Ferroelectric Liquid Crystals: The Development of Devices" Ferroelectrics 94:3–62 is a recent review of the use of FLC cells in device applications. In a section called "SSFLC Color" the reviewers refer to color display (e.g. for television applications). Matsumoto et al. (1988) SID88 Digest, 41, refers to color generation via pixel subdivision using FLC cells. Each pixel of a display is divided into three (or more) sub-pixels of blue, green and red. Disadvantages of this technique for color generation include a reduction in resolution and the complexity of fabrication of large, high resolution displays. Ross (1988) International Display Research Conference (1988) 185 refers to color sequential backlighting using FLC cells. This method is implemented by switching between blue, green and red images at sufficient rates that the eye averages the primary color images. The method involves switching of a wavelength selective source synchronously with images on a liquid crystal display. Three primary colors (usually red, green and blue) define an area in color space. Desired colors in the area can be displayed by controlling the level of primary colors in each pixel. Backlighting liquid crystal displays uses fluorescent tubes with fast phosphors (White (1988) Phys. Technol. 19:91).

Johnson and Sharp in U.S. patent application Ser. No. 07/522,215 and PCT application WO91/06888 published May 16, 1991, describe birefringent or polarization interference filters employing chiral smectic liquid crystal cells as electronically rotatable retarders. Discretely tunable and continuously tunable single and multiple stage filters are described.

SUMMARY OF THE INVENTION

The present invention provides optical polarization interference filters which employ chiral smectic liquid crystal cells as electronically rotatable retarders. The filters of the present invention are improved in that they are optimized for increased spectral discrimination, uniqueness of spectral outputs and efficient use of CSLC elements. The filters of the present invention include improved single and multiple stage filters. Improved discretely tunable and continuously tunable filters are provided.

With respect to filters having one or more stages that contain a series of birefringent elements which are either fixed birefringent elements or active CSLC cells, this invention provides designs which optimize the number of pure spectral outputs which are unique. This optimization relates to the relative order of elements in a stage, the pattern of switching of the active CSLC cells, and the retardations of the CSLC cells in a stage.

Multiple stage filters of this invention include those in which the thicknesses of the birefringent elements in the stages of the filter (i.e. the retardations) increase in a mathematically progression, such as a geometric progression. In a specific embodiment, this invention provides an improved tunable filter that substantially retains the transmissions of a Lyot-type multiple stage filter without requiring the thicknesses of the active CSLC cells to increase geometrically.

Continuously tunable filters of this invention include those having a stage which has an analog variable retarder which is the combination of an achromatic quarter-waveplate and one or more analog CSLC cells in series. The analog CSLC cells are preferably half-waveplates over the tuning range of the filter. This variable retarder is combined in a filter stage between polarizers with a fixed or active birefringent element, preferably with optic axis at ±45° with respect to the plane of polarization entering the stage. The achromatic quarter-waveplate is between the birefringent element and the analog CSLC cells. The continuously tunable filters of this invention are optimized for tuning range and compensate for chromaticity effects which limit the tuning range that can be achieved. Chromaticity effects are minimized by optimization of the relative orientations of the optic axes of the analog CSLC cells in a stage. It is preferred that the field-free optic axes orientations of sequential analog CSLC cells in series in the stage are perpendicular to each other. A specific embodiment utilizes the addition of a discrete state CSLC cell, for example a binary state CSLC, to a filter stage. The discrete state cells is optically coupled with the series of analog CSLC cells and positioned between the quarter-waveplate and the CSLC cells or between the exit polarizer and the CSLC cells. The use of a combination of a discrete state CSLC cell and the analog CSLC cells allows a filter to be tuned through an entire FSR.

Polarizers useful in this invention include any means for generating selecting or analyzing polarized light. The specific embodiments described herein employ linear polarizers and polarization analyzers.

Birefringent elements of this invention include any optically anisotropic material which display multiple indices of refraction. The use of uniaxial elements is specifically described herein, but biaxial materials can also be used. Fixed birefringent elements include among others birefringent crystals, stretched polymer layers, and holographic elements.

Active birefringent elements are those in which the retardation can be selectively changed, for example, electronically as in CSLC cells in which the orientation of the optic axis of the cell can be electronically rotated or as in nematic liquid crystal cells in which the birefringence of the cell can be electronically changed.

The polarizers of this invention include any means for generating, separating, selecting or analyzing polarized light including, among others, polarizing beam splitters, particle polarizers and polarization sensitive filters. The filters specifically described herein employ linear polarizers which are preferred for many filtering applications. The filters of this invention can readily be adapted to employ circular and elliptical polarizers.

The CSLC cells of the filters of this invention are electronically rotated by means of application of an electric field across cell electrodes. Any means that achieves the desired rotation can be employed. A direct voltage can be applied to the cell or some form of varying voltage can be applied. An electric field can be induce by activating a photosensor with light. The applied field can be electrically or optically induced by any means known in the art.

CSLC cells of this invention include those in which the optic axis is discretely or continuously rotatable. Discretely and continuously tunable CSLC cells are said to be tunable or switchable between optical states characteristic of the orientations of the optic axis. CSLC cells are, thus, specific examples of active birefringent elements. CSLC cells include but are not limited to those which are ferroelectric liquid crystal cells, electroclinic-effect liquid crystal cells and distorted helix ferroelectric liquid crystal cells. CSLC cells which have a discrete number of possible optic axis orientations include stable binary state SSFLC cells having two optic axis orientations and ternary state antiferroelectric-effect liquid crystal cells having three optic axis orientations. Analog CSLC cells can be operated in a multiple discrete-state mode having two or more different optic axis orientations which are electronically selectable by choice of applied voltage. Analog CSLC cells include but are not limited to surface stabilized chiral smectic A liquid crystal cells and distorted helix ferroelectric liquid crystal (DHF) cells.

Filters of this invention, most generally, include those in which one or more discretely tunable filter stages are combined with one or more continuously tunable filter stages and/or with passive filter stages containing a fixed birefringent element. Continuously tunable filters implemented with one or two SmA* FLCs are specifically exemplified.

The filters of this invention require polarized input and generate a polarized output. The filters of this invention can be readily adapted to be polarization insensitive by polarization diversity methods which are well known in the art. The light source may be broad band or a mixture of narrow wavelength bands. The light entering the filter may be prefiltered to pass a particular band pass or series of wavelength peaks. The filters of this invention can be employed with any non-monochromatic light source.

The discretely and continuously tunable filters of this invention can be readily adapted as reflection-mode devices.

DETAILED DESCRIPTION OF PREFERRED EMBODIMENTS

Figure 1:
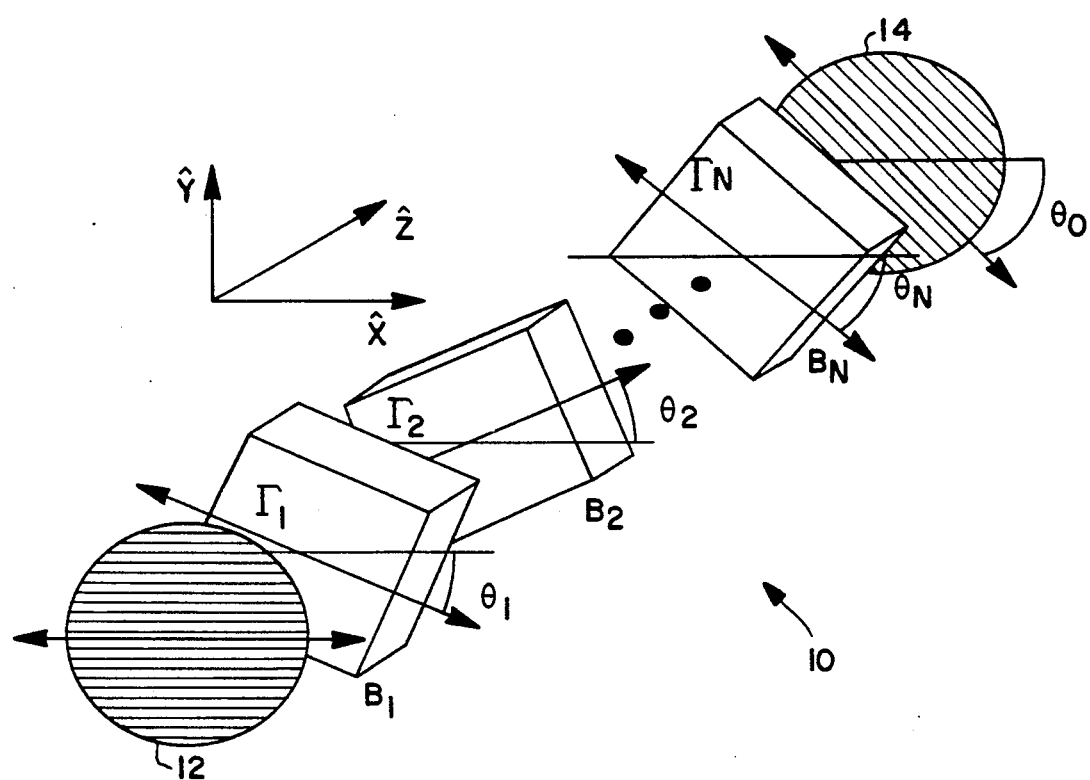
FIG. 1 is a schematic diagram of a single-stage polarization interference filter containing fixed birefringent elements or CSLC cells between polarizers.

The term chiral smectic liquid crystal (CSLC) cell is used generally herein to refer to transparent or semi-transparent cells containing a aligned layer of a chiral smectic liquid crystal material which functions on application of an electric field to cell electrodes to rotate the polarization of light passing through the cell. Cells are typically formed of uniformly-spaced transparent or semi-transparent retaining walls of an inert substrate, such as glass or quartz. A conducting material is typically coated on the inside surface of the substrate walls to provide transparent or semi-transparent electrodes. A chiral nonracemic smectic liquid crystal composition, often a mixture of components, is inserted between the uniformly-space transparent electrodes. A method of alignment of the ferroelectric liquid crystal molecules within the cell is typically employed. One preferred alignment is the "bookshelf" alignment of which has been described by Clark and Lagerwall, supra. In a bookshelf aligned CSLC cell, smectic layers are aligned perpendicular to the substrate walls which bound the LC layer. In a chiral smectic C CSLC cell, the molecular director $\hat{n}$ makes an angle $\alpha$ to the smectic layer normal ($\hat{z}$). In a chiral smectic A CSLC cell (so called electroclinic effect cell), $\hat{n}$ is aligned with z in the field free state. Application of an electric field indicates $\hat{n}$ to tilt with response to $\hat{z}$. The molecular director is the average direction of the long axis of the molecule in the layer. Surface stabilization suppresses the formation of a helix in the smectic layer within the material so that the molecular director, i.e., the optic axis, is confined to rotate in the plane of the substrate walls. Surface stabilization is required for SmC* and SmA* planar-aligned cells. In a discrete, multi-state FLC cell, for example a bistable surface stablized FLC cell like a SmC* SSFLC cell, application of an appropriate electric field to the cell electrodes allows selection between molecular director orientations—two orientations separated by $2\alpha$ in the case of the bistable SSFLC. The discrete states of the cell are associate with the discrete orientations of the optic axis of the cell in the plane of the substrate walls of the cell. In a discrete state CSLC cell, for example, the application of a voltage, above a certain threshold voltage, to the cell electrodes result in switching of the orientation of the chiral smectic LC molecules. Bistable cells have two such orientations. Tristable cells have three such orientations. With a multi-stable state CSLC cell, a voltage need not be applied to maintain the orientation of the CSLC molecules which defines the state of the cell. In a CSLC cell in which all of the states are not stable, it can be necessary to apply a voltage to maintain the cell in a desired state.

Analog CSLC materials, for example SmA* electroclinic materials and DHF materials, when incorporated into CSLC cells and aligned in a planar, bookshelf geometry display an analog rotation of the cell optic axis with applied electric field. The maximum rotation angle that can be obtained is twice the maximum tilt angle ($\alpha_{MAX}$) of the electroclinic or DHF material employed in the cell. In the alternative, analog CSLC cells can be operated in a multi-state mode by appropriate application of an electric field to the cell electrodes. DHF materials in addition to the field dependent rotation of the optic axis, display a voltage dependent change in birefringence ($\delta\Delta n$) which should be considered when DHF cell thicknesses are selected.

Homeotropic alignment is an alternative CSLC cell alignment in which the smectic layers are parallel to the substrate walls (which in this case may or may not be the aperture of the cell). The electric field is applied to such a cell across the smectic layers, i.e., parallel to the layers by electrodes that are lateral to the substrate walls. The layer normal is $\hat{z}$. The liquid crystal molecules are aligned with respect to each other within the smectic layers by well-known techniques such as by application of an aligning electric field during cell preparation. The molecular director (n̂) makes an angle α with respect to ẑ. Application of an electric field across the layers rotates n̂ in a plane perpendicular to the direction of the E field. Homeotropically aligned CSLC cells can be employed in an analogous manner to bookshelf aligned CSLC cells in the filters of the present invention to rotate the plane of polarized light in a filter stage.

A basic polarization interference filter (PIF) consists of three components: an entrance polarizer, an exit polarizer (or polarization analyzer), and a single birefringent element bounded by the polarizers. This sequence of elements, referred to here as a filter stage, is the simplest stand-alone PIF design. A PIF can be a single-stage device having a number of birefringent elements (or retarders) as, for example, a Solc filter or can be a multiple stage device which is a cascading of filter stages, for example, a Lyot filter. A multiple-stage filtering scheme involves selection of specific relative thicknesses of birefringent elements in each stage in order to produce a desired output spectrum. A Lyot filter, for example, achieves optimum finesse with the geometric series of birefringent element thickness ratios (1:2:4 ... ). The finesse, given as the number of passband full-widths in a period of the filter spectrum (or free-spectral-range (FSR)), scales as $2^M$ for an M-stage (and therefore M birefringent element) conventional Lyot filter. By contrast, the Solc filter finesse scales as M, thus making inefficient use of the birefringent elements. Due to the independence of filter stages, the overall transmission function from a multiple-stage filter is given by the product of the transmission functions of the individual stages. Because of this, the performance of a multiple stage filter can be understood by analyzing the performance of a single filter stage.

PIFs can be implemented using chiral smectic liquid crystal (CSLC) cells as electronically controllable retarders (see U.S. Ser. No. 07/522,215, now allowed, and WO 91/06888. Referring to FIG. 1, a general single-stage CSLC PIF (10) consists of input (12) and exit (14) polarizers and a series of birefringent elements (B1 ... BN) which can be CSLC active birefringent elements or fixed birefringent elements. The birefringent elements have fixed retardation given by ($\Gamma_1, \Gamma_2, \ldots \Gamma_N$), where N is the total number of elements, oriented such that the optic axes of the elements form angles ($\Theta_1, \Theta_2, \ldots \Theta_N$) with respect to the input polarization. The exit polarizer is oriented at an arbitrary angle $\Theta_0$ with respect to the input polarization. The structure of FIG. 1 is analyzed for CSLCs which are SSFLCs. The SSFLCs are treated as uniaxial crystals with optic axis (molecular directors) contained in the plane of the substrate walls, i.e., "book-shelf" aligned FLCs.

The following describes means for optimizing discrete tuning single-stage all FLC PIFs as well as an FLC PIF stage which includes a passive retarder, i.e., a fixed birefringent element. The emphasis is placed on maximizing the number of unique output wavelength bands with a minimum number of active FLC components. The analysis also relates to maximizing the number of outputs with highest spectral discrimination. This is accomplished by maximizing the number of unique spectrally pure outputs of the filter. The optimization is extended to multiple-stage designs. This is accomplished by maximizing the number of unique spectrally pure outputs of the filter. For purposes of this application, a pure output is one which is a sinusoidal transmission spectrum.

For a filter stage which contains N active FLC devices, each of which exhibits two stable optic axis orientations or states (as in a SmC* bistable FLC cell), there are, in general, $2^N$ output spectra that are electronically selectable by independent switching of cells between states. The angle of the molecular director of each FLC, $\alpha_N$, can be modulated between angles, $\alpha_1 = (\Theta_1, \Theta_1 + 2\alpha)$, $\alpha_2 = (\Theta_2, \Theta_2 + 2\alpha) \ldots \alpha_N = (\Theta_N, \Theta_N + 2\alpha)$ where α is the tilt angle that the molecular director of the FLC forms with the smectic layer normal. For simplicity, in the following analysis, the devices are assumed to have equal tilt angles. In general, each of the $2^N$ switched states can result in a different output spectrum, or filter transmission function. However, some of these outputs are not preferred for optical filtering applications. To be useful for filtering, an output spectrum must be both unique (i.e., different from other outputs) and satisfy performance specifications for the particular filtering application. While uniqueness is easily defined, utility of a particular transmission function depends upon the performance requirements. More generally, a P state CSLC cell will exhibit $P^N$ output spectra.

In general, for optical filtering, maximum transmission of a particular band of wavelengths (ideally unity), with strong blocking (ideally a null in transmission) of all wavelengths outside of this band is preferred. It is further desirable to employ a minimum number of optical components to achieve the desired filtering. For maximum spectral discrimination with efficient use of components, it is preferred that the optic axes of the birefringent elements of the filter are at + or −45° (π/4) with respect to the input polarization. Fixed birefringent elements can be positioned within a stage with their optic axis at ±45°. The optic axis of CSLC cells can be rotated to ±45° of the input polarization. Light passing first through a linear polarizer incident on a birefringent element oriented at angle π/4 with respect to the input polarization produces two orthogonally polarized waves from the linearly polarized input wave, introducing a wavelength dependent phase shift between them. The phase shift is a consequence of the difference in optical path-length experienced between the ordinary and extraordinary waves. The amplitudes of the two waves are determined by the orientation of the optical field vector with respect to the crystal axes. For a slab of uniaxial material of thickness d, the two waves exit the crystal with a phase difference of, $$\Gamma(\lambda) = 2\pi \frac{\Delta n(\lambda) d}{\lambda} \quad (1)$$

where λ is the free-space wavelength of the incident light and Δn is the birefringence, which is a function of wavelength due to dispersion. This phase delay represents a wavelength dependent change in the state-of-polarization. Light exiting a waveplate oriented at π/4 with respect to the input polarization is elliptically polarized with major axis parallel (or perpendicular) to the input polarization. The optic axis of a binary state FLC having tilt angle of 22.5° (π/8) is rotatable between ±π/4. Assuming an orientation or rotation of π/4, the Jones vector for light exiting the retarder is given by, $$E(\lambda) = E(\lambda) \begin{vmatrix} \cos[\Gamma(\lambda)/2] \\ i\sin[\Gamma(\lambda)/2] \end{vmatrix} \quad (2)$$

where E(λ) is the amplitude of the linearly polarized optical field incident on the birefringent element. The wavelength dependent ellipticity can be analyzed by interference at the exit polarizer, producing a wavelength dependent optical transmission. The transmission spectrum resulting from the single-stage, using parallel or crossed analyzing polarizers, is given by, $$T(\lambda) = \begin{cases} \cos^2\left[\dfrac{\pi(m+1)\lambda_o}{\lambda}\right] & \text{PARALLEL} \\ \sin^2\left[\dfrac{\pi(m+\frac{1}{2})\lambda_o}{\lambda}\right] & \text{CROSSED} \end{cases} \quad (3)$$

where the waveplate is assumed to be an m-order (m=0,1, . . . ) full-wave retarder at design wavelength $\lambda_0$ (with parallel polarizers), or an m-order half-wave retarder at $\lambda_0$ (with crossed polarizers). This corresponds to the $(m+1)^{th}$ maximum in transmission at $\lambda_0$. The preference for an orientation of $\pm\pi/4$ is clear in the above equations, as it produces two equal amplitude waves, which generate pure sinusoidal transmission spectra. For parallel polarizers, interference of these waves theoretically produces 100% transmission for wavelengths that exit the birefringent element with field components in phase. Theoretical nulls in transmission occur for wavelengths that exit the birefringent element with field components out of phase. The converse is true for the case of crossed polarizers. The above result is based on optimizing the spectral contrast ratio (SCR). The SCR is the ratio of the mean transmission at peak wavelengths to the mean transmission at null wavelengths over the spectral band in which the filter stage functions. Using the ideal transmission function of Equation 3, the SCR tends toward infinity. In practice, stray light from non-ideal polarizers and scattering from defects in the birefringent elements typically limits the SCR. Using active FLC cells, a slightly non-uniform director distribution and scattering from defects usually limits the SCR to 30 db, depending upon the device thickness. This represents the theoretically ideal transmission, or pure spectrum, in which the SCR is limited only by component non idealities. In designing an FLC PIF with multiple active FLC cells, the polarization effects associated with the switching scheme limit the number of pure outputs to some fraction of the $2^N$ available switching states (i.e., combinations of optic axes orientations). This can best be illustrated by considering a specific example, referring to FIG. 2, of an all-FLC filter stage (20) that contains three active FLC elements. A three-FLC filter stage is significant in that it contains the minimum number of elements required to generate all distinct transmission outputs. The results of the analysis can then be generalized to an N-FLC filter stage. In addition, this example illustrates the requirements on FLC layer thickness for uniqueness of spectral output.

Figure 2:
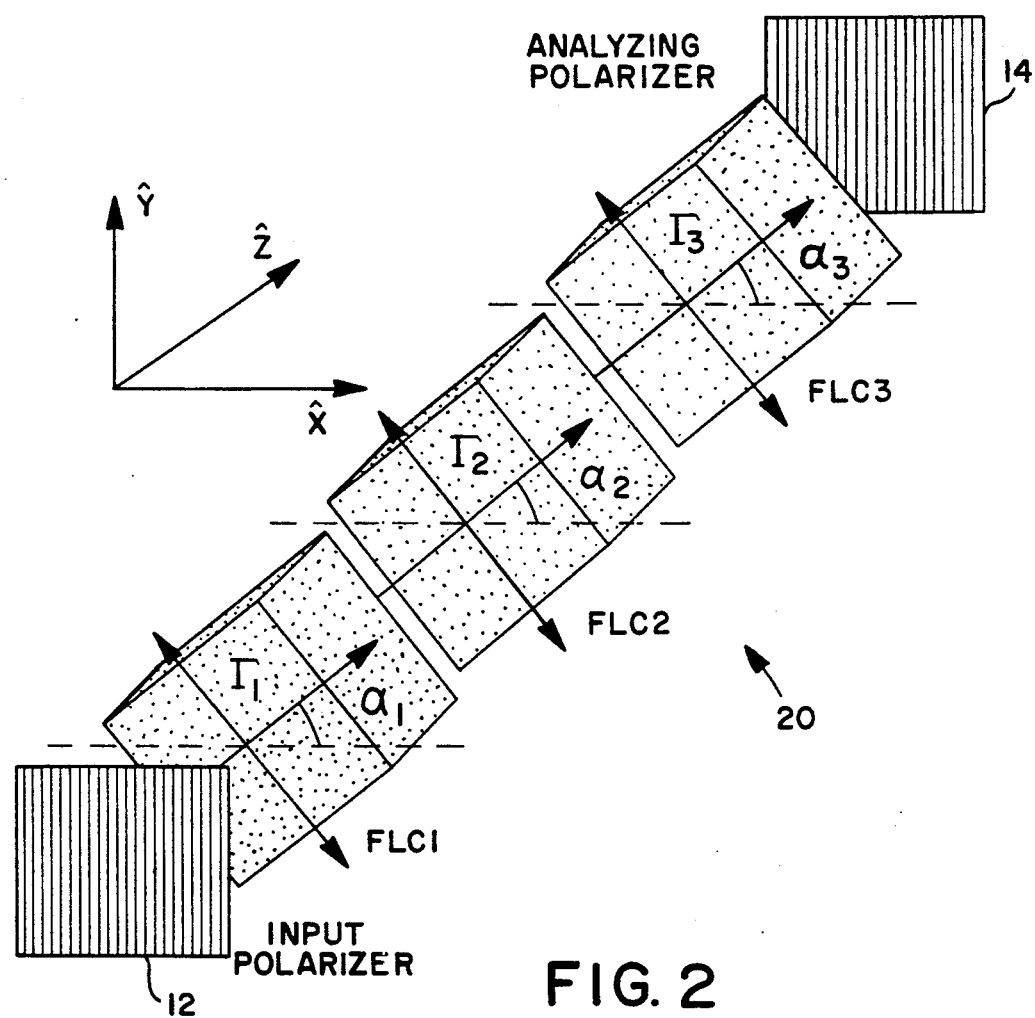
FIG. 2 is a schematic diagram of a single-stage of a polarization interference filter having three binary state CSLC cells.

The filter stage illustrated in FIG. 2 consists of parallel input (12) and exit (14) polarizers, and contains three active FLC retarders (FLC1–FLC3). Each of the active waveplates can be independently switched between director orientations of 0 or π/4; In this case, referring to FIG. 1, $\Theta_0=0$, $\Theta_i=\pi/2$, and, $\alpha=\pi/8$. Because each of the FLC devices switches between two stable states, a particular switched state (combination of switching states of individual cells) of the filter can be represented by a binary number. A state of (011), for example, corresponds to molecular director angles of $\alpha_2=0$, $\alpha_2\pi/4$, and, $\alpha_3=\pi/4$. In order to determine each output of the filter stage, Jones calculus is employed. The optical field transmitted by the filter is given by the matrix equation, $$E'(\lambda,\Gamma,\alpha) = P_X W_N(\Gamma_N,\alpha_N) \ldots W_2(\Gamma_2, \alpha_2) W_1(\Gamma_1,\alpha_1) P_X E(\lambda), \quad (4)$$

where $E(\lambda)$ and $E'(\lambda,\Gamma,\alpha)$ are the column matrices giving the incident and transmitted complex cartesian optical field components, respectively. Also, $\Gamma$ and $\alpha$ are the vectors giving the retardation and orientation of the waveplates, respectively, $$\Gamma=(\Gamma_1, \Gamma_2, \ldots \Gamma_N), \text{ and, } \alpha=(\alpha_1, \alpha_2, \ldots \alpha_N). \quad (5)$$

The matrix, $P_x$, corresponds to an x-oriented polarizer given by, $$P_x = \begin{vmatrix} 1 & 0 \\ 0 & 0 \end{vmatrix} \quad (6)$$

The general matrix for a waveplate with retardation $\Gamma_i$ and orientation $\alpha_i$, is given by, $$W(\Gamma_i,\alpha_i) = \begin{pmatrix} \cos[\Gamma_i(\lambda)/2] - i\cos[2\alpha_i]\sin[\Gamma_i(\lambda)/2] & -i\sin[2\alpha_i]\sin[\Gamma_i(\lambda)/2] \\ -i\sin[2\alpha_i]\sin[\Gamma_i(\lambda)/2] & \cos[\Gamma_i(\lambda)/2] + i\cos[2\alpha_i]\sin[\Gamma_i(\lambda)/2] \end{pmatrix} \quad (7)$$

This matrix reduces to two matrices representing the two director orientations corresponding to unswitched $(\alpha_i=0)$ and switched states $(\alpha_i=\pi/4)$, respectively, $$W(\Gamma_i,0) = \begin{vmatrix} e^{-i\Gamma_i(\lambda)/2} & 0 \\ 0 & e^{i\Gamma_i(\lambda)/2} \end{vmatrix} \text{ UNSWITCHED} \quad (8)$$

and, $$W(\Gamma_i,\pi/4) = \begin{vmatrix} \cos[\Gamma_i(\lambda)/2] & -i\sin[\Gamma_i(\lambda)/2] \\ -i\sin[\Gamma_i(\lambda)/2] & \cos[\Gamma_i(\lambda)/2] \end{vmatrix} \text{ SWITCHED} \quad (9)$$

Note that absolute phase factors are neglected in Equations 7–9, as only the relative phase is of consequence in producing an intensity transmission function for a polarization interference filter. A generalized output transmission function can be derived by substituting the matrices of Equations 7 into Equation 4, giving an expression for the output field that includes the effect of N retarders with arbitrary retardation and orientation. However, the transmission function can be obtained more directly using superposition with Equations 8 and 9. The transmission function for the three FLC case, given by $T(\Gamma,\alpha)=|E'/E|^2$, can be simplified to the following form, which contains all of the $2^N(=8)$ outputs, $$T(\alpha,\Gamma) = \cos^2[2\alpha_1]\cos^2[2\alpha_2]\cos^2[2\alpha_3] + \quad (10)$$

-continued $$\sin^2[2\alpha_1]\cos^2[2\alpha_2]\cos^2[2\alpha_3]\cos^2\left(\frac{\Gamma_1}{2}\right)+$$

$$\cos^2[2\alpha_1]\sin^2[2\alpha_2]\cos^2[2\alpha_3]\cos^2\left(\frac{\Gamma_2}{2}\right)+$$

$$\cos^2[2\alpha_1]\cos^2[2\alpha_2]\sin^2[2\alpha_3]\sin^2\left(\frac{\Gamma_3}{2}\right)+$$

$$\sin^2[2\alpha_1]\sin^2[2\alpha_2]\cos^2[2\alpha_3]\cos^2\left(\frac{\Gamma_1+\Gamma_2}{2}\right)+$$

$$\cos^2[2\alpha_1]\sin^2[2\alpha_2]\sin^2[2\alpha_3]\cos^2\left(\frac{\Gamma_2+\Gamma_3}{2}\right)+$$

$$\sin^2[2\alpha_1]\cos^2[2\alpha_2]\sin^2[2\alpha_3]\left\{\cos^2\left(\frac{\Gamma_1+\Gamma_3}{2}\right)+\right.$$

$$\left.\sin^2\Gamma_2/2\sin\Gamma_1\sin\Gamma_3\right\}+$$

$$\sin^2[2\alpha_1]\sin^2[2\alpha_2]\sin^2[2\alpha_3]\cos^3\left(\frac{\Gamma_1+\Gamma_2+\Gamma_3}{2}\right).$$

The coefficients preceding each spectral output, which depend upon the orientations of the waveplates, are only non-zero for the single switched state coinciding with that particular spectrum. The following gives each of the output transmission functions for the three-FLC stage, along with the corresponding binary switching representation, $$T(\alpha,\Gamma) = \quad (11)$$

| | |
|---|---|
| 1 | (000) |
| $\cos^2[\Gamma_1/2]$ | (100) |
| $\cos^2[\Gamma_2/2]$ | (010) |
| $\cos^2[\Gamma_3/2]$ | (001) |
| $\cos^2\left[\frac{\Gamma_1+\Gamma_2}{2}\right]$ | (110) |
| $\cos^2\left[\frac{\Gamma_2+\Gamma_3}{2}\right]$ | (011) |
| $\cos^2\left[\frac{\Gamma_1+\Gamma_3}{2}\right]+\sin^2\Gamma_2/2\sin\Gamma_1\sin\Gamma_3$ | (101) |

For the three-FLC stage with parallel polarizers, the 8 outputs consist of the source spectrum, 6 pure spectra, and 1 non-pure spectrum. Obviously, switching all of the FLC's (111) produces a pure spectrum determined by the sum of the waveplate retardations. One or more unswitched FLCs preceding one or more switched FLC's (001,011) generate pure spectra, as the unswitched FLCs produce no change in the state of the input polarization. Also, one or more switched FLCs preceding one or more unswitched FLCs (100,110) also generate pure spectra, even though the light entering the unswitched FLCs is in general elliptically polarized. Consequently, there is a change in the state-of-polarization due to the unswitched device(s). However, because the unswitched FLCs is oriented along the exit polarizer, this change in polarization represents an exchange between elliptical and $\pm\pi/4$ oriented linear polarization, determined by the retardation. Therefore, the $S_1$ component of the Stokes vector, which determines the output transmission, is unchanged The state (010) is a combination of both of these cases, and is therefore also pure. The remaining state, (101), corresponds to one or more unswitched FLCs bounded by one or more switched FLCs. Here, a change in the state-of-polarization induced by the unswitched FLCs, preceding the switched FLCs, produces a term which is additive with the pure transmission term. In general, this additive term produces a SCR which is limited by polarization effects and the output is thus not pure as defined herein. Consequently, this non-pure output is, in general, not preferred for applications requiring a high degree of spectral discrimination.

The various output states, determined by the analysis of the 3-FLC PIF, can be generalized to a filter stage containing N FLCs. In the more general case, one or more unswitched FLCs bounded by one or more switched FLCs produces a non-pure output spectrum. In the non-pure outputs the additive transmission term results in a polarization limited SCR. In a stage containing several FLCs, this non-ideal (101) sequence may occur in several of the $2^N$ possible states, often in more than one position in the stage. The binary contracted representation for switched states which produce pure spectra are, independent of the number N of FLC's, (1), (01), (10), and, (010). Again, the output (0) results in full transmission of the source spectrum for parallel polarizers, and a null in transmission for crossed polarizers. Though this does not represent a filtering operation, it is necessary in certain applications to have either a dark state, or one in which the source spectrum can be transmitted. The number of occurrences of the four sequences which yield pure spectra gives the number of useful filtering operations. The remaining terms contain one or more occurrences of the sequence (101).

The transmission function for a particular output state, generalized to the case of an N-FLC PIF stage, can be written in a separable form as, $$T(\Gamma,\alpha)=T_P(\Gamma,\alpha)+T_E(\Gamma,\alpha), \quad (12)$$

where the first term, $T_P(\Gamma,\alpha)$, represents the desired pure spectrum, and $T_E(\Gamma,\alpha)$ is a non-ideal additive term, which is only non-zero for one or more occurrences of the (101) sequence, $$T_P(\Gamma,\alpha) = \cos^2\left[\frac{1}{2}\sum_{i=1}^{N}\Gamma_i\delta(\alpha_i-\pi/4)\right]. \quad (13)$$

The additive term, $T_E(\Gamma,\alpha)$, cannot be generalized to the N FLC stage, as the (101) sequence may occur in several places in the stage for a particular state. The number of pure output spectra, $N_P$, from a stage containing only N FLCs, is given by, $$N_P = \sum_{n=1}^{N} n = \frac{N(N+1)}{2} \quad (14)$$

Thus, of the total number of spectra, $(2^N-1)$, excluding the (0) output), the percentage that are pure is given by, $$P = \frac{N(N + 1)}{2(2^N - 1)}. \quad (15)$$

For the case N=2, 100% of the states are pure, while 50% are pure for N=5, which corresponds to 15 pure output spectra.

In the previous analysis, a relation for the maximum number of pure spectra for an all-FLC filter stage was given. However, each of the states given in Equation 13 for the 3-FLC case do not necessarily represent unique spectra. In order to make most efficient use of the FLC devices, it is necessary that each of the N(N+1)/2 pure spectra be unique. In an all FLC stage, this requires that the retardation of each of the FLC layers be unique, and depending upon the switching scheme, that the various sums or differences in retardation be unique. By examining Equation 13, for example, it can be seen that three FLCs with equal retardation produce a total of 3 unique output spectra. In general, an N-FLC PIF stage, which uses FLCs with identical thickness, produces only N unique output spectra.

Referring again to the filter of FIG. 2, consider the geometric series as a particular ratio of FLC thicknesses in a single-stage filter design such that ($\Gamma_1 = \Gamma_0$, $\Gamma_2 = 2\Gamma_0$, $\Gamma_3 = 4\Gamma_0$), where $\Gamma_0$ is an arbitrary FLC retardation. This selection of FLC thicknesses produces seven unique output spectra (excluding (0)), corresponding to a linear shift in retardation ($\Gamma_0, 2\Gamma_0, 3\Gamma_0, \ldots 7\Gamma_0$), with the spectrum resulting from the $5\Gamma_0$ retardation being a (101) state and non-pure.

The insertion (of one or more) passive retarders, i.e., fixed birefringent elements in an FLC PIF design can result in filters with useful properties for the following reasons. The passive waveplate, oriented at $\pm\pi/4$ generates a spectrum other than the source spectrum in the (0) state which simply increases the number of pure output spectra by 1. More importantly, a bias retardation is often required to produce a higher resolution than can be achieved in practice using FLCs alone (due to FLC layer thickness limitations and required voltages). In this instance, the FLCs are used to augment the retardation of the passive element when switched, thereby shifting the output spectrum. An advantage of this is that thick FLC cells are not required to generate a high-order spectrum.

As an example, the number of pure output spectra of an FLC PIF are determined for a single-stage containing parallel (or crossed) polarizers with a single passive retarder oriented at angle $\pm\pi/4$ with respect to the input polarization, and N FLC cells. This analysis assumes that the FLCs can be switched between orientations of 0 or $\pi/4$ by reversing the sign of the applied electric field. The outputs from the stage can be given by a binary representation, in which fixed birefringent element is always represented by a (1) in the binary switching representation. The number of pure output spectra for a particular N-FLC filter stage is a function of the position of the passive waveplate in the stage. As noted above, the presence of a (101) sequence results in a non-pure, non-preferred output. All combinations of switched states which do not contain the (101) sequence result in pure, preferred outputs. Table 1 lists the optimal positions of a fixed birefringent element in a stage having N FLCs. For example, with N=5, 6 pure output spectra result with the passive element in the first or last position in sequence in the stage. However, by placing the passive element in either the third or fourth position, twelve pure output spectra result. For the number of FLCs (N=1,2,3,4,5), the results of this analysis indicate that, with the passive element placed in the optimum position as listed in spectra which result is 2,4,6, respectively. The optimal positions for fixed birefringent elements are the centermost positions in the series of FLC cells. Table 2 lists the number of pure outputs as a function of N for stages having one optimally positioned fixed birefringent element. Thus, referring to Equation 15, for N<3, more pure spectra result when a fixed birefringent element is included in a filter stage, while for N>3 more pure spectra are produced by an all-FLC filter stage.

TABLE 1

Optimal positions for fixed birefringent elements in a PIF stage to increase number of pure spectra

| Number of Discrete FLS's/Stage | Position of[1] Birefringent Element in Stage | Representation of Elememt Order in Stage |
|---|---|---|
| 1 | $1^{st}$ or $2^{nd}$ [2] | B/F\|B/F [3] |
| 2 | $2^{nd}$ | F\|B\|F |
| 3 | $2^{nd}$ or $3^{rd}$ | F\|B/F\|B/F\|F |
| 4 | $3^{rd}$ | F\|F\|B\|F\|F |
| 5 | $3^{rd}$ or $4^{th}$ | F\|F\|B/F\|B/F\|F\|F |
| 6 | $4^{th}$ | F\|F\|F\|B\|F\|F\|F |
| 7 | $4^{th}$ or $5^{th}$ | F\|F\|F\|B/F\|B/F\|F\|F\|F |
| 8 | $5^{th}$ | F\|F\|F\|F\|B\|F\|F\|F\|F |
| N (even) | $(N/2 + 1)^{th}$ | |
| N (odd) | $\left(\frac{N+1}{2}\right)^{th}$ or $\left(\frac{N+3}{2}\right)^{th}$ | |

[1] Since the optimal positioning is symmetric within a stage, the position can be determined relative to the entrance or exit polarizer.
[2] For N = 1, the order of the elements has no effect.
[3] B = fixed birefringent element and F = FLC cell.

TABLE 2

The number of pure outputs for the combinations of N binary FLCs with one birefringent element[1] in a filter stage

| N | Number of pure outputs[2] ($P_N$) | Maximum number of outputs ($2^N$) |
|---|---|---|
| 2 | 2 | 2 |
| | 4 | 4 |
| 3 | 6 | 8 |
| 4 | 9 | 16 |
| 5 | 12 | 32 |
| 6 | 16 | 64 |
| 7 | 20 | 128 |
| 8 | 25 | 256 |
| 9 | 30 | $2^9$ |
| 10 | 36 | $2^{10}$ |
| 11 | 42 | $2^{11}$ |
| 12 | 49 | $2^{12}$ |
| 14 | 64 | $2^{14}$ |
| 15 | 72 | $2^{15}$ |

[1] The birefringent element is optimally positioned in the stage as listed in Table 1.
[2] Excludes the (101) switching combination. Can be calculated for $N_{even}$ using $P_N = 2(1 + 2 + \ldots + N/2) + N/2 + 1$ and for $N_{odd}$ using $P_N = 2(1 + 2 + \ldots + (N + 1)/2)$.

While in all FLC filter stage, the retardation of all elements (and possibly their sums and/or differences) must be unique, this requirement is relaxed for a filter stage having a fixed birefringent element in the stage which is not the first or last element in the stage. The FLCs on one side of the fixed birefringent must have retardation different from those FLC on the other side of the fixed element. The positioning of the birefringent element is a more stringent limitation on the number of pure outputs than the general requirement for elements of different retardation. Any outputs that would not be unique, because of FLC cells on the same side of the birefringent element having the same retardation, are excluded as non-pure by the positioning of the fixed birefringent element.

In practice, most applications require higher selectivity than that provided by a pure sinusoidal transmission function. Consequently, it is necessary to cascade stages to increase the finesse to obtain higher spectral resolution. A filter may include passive PIF stages (or any passive filter), and PIF stages with one or more FLC devices. As noted above, the output of a multiple-stage PIF is given by the product of the transmission spectra of the individual stages. An increase in finesse is accomplished by designing filter stages which produce a coincident transmission maximum (the desired output center wavelength), with complementary blocking characteristics. The design of a filter depends strongly upon the nature of the filtered source and the performance specifications mandated by the particular application. For this reason, it becomes difficult to quantitatively characterize a filter transmission function. Often, performance of a multiple-stage filter is determined by a spectral-signal-to-noise-ratio (SSNR) measurement. This is given as the ratio of the spectrally integrated transmission in the full-width of the information band, to the integrated transmission in the band over which the filter must block. A more accurate SSNR can be obtained by weighing the transmission function by the specific source power spectrum, if known. While SSNR constraints vary, depending upon the application, it is usually desirable to optimize this parameter, (as spectral purity is usually the desired goal) while minimizing the number of FLC devices. Such spectra are generated most effectively by PIF stages producing pure spectra, as described above. An exemplary analysis is for the specific case of a tunable Lyot-type filter using binary SSFLC cells. As above, the focus of the optimization analysis is to obtain a maximum number of pure wavelength bands, while minimizing the number of active FLCs.

A series of SSFLC cells is useful for discretely shifting the transmission spectrum of a single-stage filter. However, the blocking bandwidth of such a structure is quite limited, due to the sinusoidal nature of the transmission function. A filter stage is therefore used typically as a building block for multiple-stage filters that generate greater spectral selectivity. A basic principle behind such a scheme is that each filter stage exhibits a common transmission maximum, centered at a selected information wavelength band, while producing complementary blocking characteristics. The transmission function of the multiple-stage filter, given by the product of the individual stage transmission functions, achieves enhanced selectivity with each additional filter stage. Selectivity, or finesse, is the number of information bandwidths in a blocking bandwidth of the overall filter. This is typically calculated as the ratio of spectral period, or free-spectral-range (FSR), to full-width at half-maximum (FWHM) of the information band. The finesse figure-of-merit is limited in describing filter performance, being based solely on the spectral periodicity of the transmission function. The finesse implicitly assumes adequate blocking throughout the spectral period, which is a measure of spectral signal-to-noise-ratio (SSNR). The SSNR can be calculated as the ratio of integrated transmission in the FWHM to that over the blocking bandwidth. A more accurate calculation is obtained with a knowledge of the illuminating source spectrum. Thus, a more accurate figure-of-merit is the product of the finesse and SSNR, both of which improve with increased number of stages. An additional characteristic figure-of-merit neglected in this calculation, which decreases with an increased number of stages, is the overall throughput. This is determined by the clear aperture (independent of number of stages), the field-of-view, and the on-axis transmission. The throughput advantage of birefringent filters is well-documented, predicated on the use of large area widefield retarders, and lowloss high-extinction ratio polarizer.

The design for a birefringent multiple-stage filter maximizes the product of SSNR and finesse, per number of stages. The design is based on a geometric progression of fixed birefringent element thickness ratios in the filter, corresponding to a sequential halving of the transmission function period as in a conventional Lyot filter. The overall transmission of a Lyot filter is characterized by a spectrally replicated sinc function. The benefits of the Lyot design can best be understood by considering only the stages with the thinnest and thickest birefringent elements in an M-stage filter implementation. The stage with the thinnest element determines the spectral period of the filter transmission function (i.e., free-spectral-range (FSR)), as this stage exhibits the lowest resolution. Conversely, the stage with the thickest element determines the resolution (full-width-at-half-maximum (FWHM)), of the filter as this stage gives the finest spectral resolution. Within a given FSR, there are a total of $2^{M-1}$ transmission maxima of the high resolution stage. The geometric sequence produces optimum finesse and blocking per number of stages by generating a transmission null at all but one of the $2^{M-1}$ transmission maxima. While this minimizes the number of stages for a particular finesse, the side-lobe amplitude due to the characteristic sinc function is still quite large. For many applications, the classic Lyot transmission function provides inadequate out-of-band rejection. For example, commercial broadband spectrophotometer systems require an integrated out-of-band transmission of <0.1%. This is a particularly difficult specification to satisfy, as the required finesse is typically 200–300. Consequently, additional filter stages are often required to enhance the out-of-band rejection. This may involve repetition of filter stages, or use of filter stages conforming to an arithmetic series, or both. However, such alternate filter designs can be decomposed into a basic Lyot geometry filter with additional stages. For this reason, the analysis of multiple-stage discrete FLC PIF is conducted for the case of a classic Lyot filter.

A binary tuning Lyot filter having SSFLCs as tuning elements has been described Sharp et al. (1990) Opt. Lett. 15:523. The filter contained three stages having a Lyot geometry and a series of synchronously switched SSFLC devices, that allowed switching between two broad bands in the visible. Each stage contained a passive birefringent element and one or more active SSFLC devices. The passive structure, in the absence of SSFLCs, comprised a Lyot filter with 1,2 and 4 waves of retardation at 460 nm. The active tuning elements, when switched, were used to augment the retardation of each stage, shifting the transmission maximum from blue (465 nm) to red (650 nm) bands. To maintain the Lyot geometry, the thicknesses of FLC layers in each stage were also doubled. The filter demonstrated did not, however, employ cells in which the SSFLC layer thickness increased to achieve the geometric sequence. Rather, a geometrically increasing number of identical SSFLC active devices was used to achieve the Lyot geometry. Thus, a total of seven devices were required to tune the three stage filter, to give only two output spectra. Alternatively, a two-band Lyot filter having only a single device per stage, can be achieved by using SSFLC layer thickness modulation. Often, however, the geometric sequence requires FLC device thicknesses which are beyond the operational limits of the surface stabilization technique ($\sim 0.5$ μm–10 μm) and/or the reasonable switching voltages that can be used. Thus, even larger numbers of FLC cells may be required to achieve the desired geometry. In addition, a requirement for multiple output bands in a multiple stage Lyot-type filter may increase the number of SSFLCs to a prohibitive level. In the following analysis, a discrete tuning filter which substantially retains the Lyot-type filter outputs by utilizing existing non-Lyot orders in order to minimize the number of active elements required is described.

Consider an FLC PIF Lyot-geometry filter that tunes between a series of Q wavelength bands which span an optical bandwidth of $\Delta\lambda$. Due to the periodicity of a birefringent filter spectrum, a passive band-pass filter is assumed to produce a transmission window isolating a single FSR. The transmission function for an M-stage passive Lyot filter, coinciding with an FLC Lyot filter with all of the devices in the unswitched state, can be written as, $$T(\lambda) = \prod_{i=1}^{M} \cos^2\left(\frac{\pi m 2^{i-1} \lambda_o}{\lambda}\right) \tag{16}$$

where the first stage is arbitrarily taken to be that with the thinnest birefringent element, while the $M^{th}$ stage is that with the thickest element (as noted above, the order of stages in a PIF does not affect transmission outputs). The first stage birefringent element is an m-full wave retarder at design wavelength $\lambda_0$, and $\lambda$ is the incident free-space wavelength. The $M^{th}$ stage contains a birefringent element with $m2^{M-1}$ full waves of retardation. Efficient use of the filter stages requires that the Lyot filter FSR not be excessively larger than $\Delta\lambda$. Arbitrarily, consider the design wavelength, $\lambda_0$, to coincide with the extreme blue output wavelength band of the spectral window. The SSFLC's therefore step the filter peak toward longer wavelengths through the Q bands. The transmission function for the first stage of the passive filter can be written as, $$T_1(\lambda) = \cos^2\left[\frac{\pi m \lambda_o}{\lambda}\right]. \tag{17}$$

In this design, the FSR is given by the first stage transmission function as, $$\Delta\lambda = \frac{\lambda_o/m}{1 - 1/m}. \tag{18}$$

For large order ($m \gg 1$), this simplifies to $\Delta\lambda = \lambda_0/m$. The $M^{th}$ stage transmission function is given by, $$T_M(\lambda) = \cos^2\left|\frac{\pi m 2^{M-1} \lambda_o}{\lambda}\right|. \tag{19}$$

The $M^{th}$ stage transmission function of the passive filter exhibits $2^{M-1}$ transmission maxima within an FSR at wavelengths, $$\lambda_j = \frac{\lambda_o}{1 - \left|\frac{j}{m2^{M-1}}\right|^2}. \tag{20}$$

where ($j=0, 1 \ldots [2^{M-1}-1]$). Equation 19 gives the wavelengths at the half-maximum in transmission, the difference of which is the FWHM, $$\delta\lambda = \frac{\lambda_o/(m2^{M-1})}{1 + \left|\frac{1}{4m2^{M-1}}\right|^2}. \tag{21}$$

where again, the expression is simplified assuming large order, $\delta\lambda = \lambda_0/m2^M$. The ratio of the above equations gives the finesse of the filter as, $F=2^M$. Consider a design in which the SSFLC devices step the transmission peak through an FSR in discrete increments of 2FWHM. That is, the first null of a particular wavelength band coincides with the first null of adjacent bands. This is a criteria for adequate separation of channels in wavelength division multiplexing (WDM) systems. It also serves to introduce a novel design which minimizes the number of SSFLCs for a particular number of output channels. Based on this design, there are a total of $2^{M-1}$ distinct bands within an FSR. In order to address each of the j bands, a specific retardation must be added to each of the i stages. The transmission function of Equation 16 can be rewritten for this design as, $$T(\lambda_j) = \prod_{i=1}^{M} \cos^2\left(\frac{\pi m 2^{i-1} \lambda_o}{\lambda} + \Gamma_{ij}(\lambda)/2\right), \tag{22}$$

where $\Gamma_{ij}(\lambda)$ is the FLC retardation added to the $i^{th}$ stage for output wavelength, $\lambda_j$. The additional retardation required in the $i^{th}$ stage to maintain the Lyot design for output wavelength $\lambda_j$ is given by Equation 20, $$\Gamma_{ij}(\lambda) = 2\pi \frac{\lambda_j}{\lambda} \frac{j}{2^{M-i}}. \tag{23}$$

This equation indicates that the $M^{th}$ stage requires full-wave incremental steps in retardation, the $(M-1)^{st}$ stage requires steps which are half-wave, and so-on. This results from the requirement that the filter switch between each of the $2^{M-1}$ orders of the high resolution stage. Based on these results, an incremental scan through an FSR consisting of $2^{M-1}$ wavelengths requires a total of $M2^{M-1}$ SSFLC states. This includes the unswitched state, corresponding to transmission of the passive stage spectrum. Each of the j bands requires a distinct switched state in each of the filter stages. The number of FLCs needed to provide the required number of states is given in the text above Table 1.

Simplification of the previous design can be accomplished by utilizing the non-Lyot orders of the passive filter. For a filter of high order, (m>>1), the change in the characteristics of each stage transmission function can be considered small with the number of full-waves required for an FSR of tuning. That is, the departure from the ideal geometrical thickness ratio in using the passive orders within an FSR can be considered small. The resulting spectral peak/null misalignment that degrades the SSNR of the filter structure can be considered negligible. This assumption predicts that full-wave retardations are of no consequence, since the change in periodicity is neglected. The high-order assumption allows the use of existing non-Lyot orders within an FSR of each stage which are separated by full-waves of retardation. Thus, the sequence of full-waveshifts required for the $M^{th}$ stage to maintain the Lyot geometry can be adequately achieved with a passive stage. The $M^{th}$ stage therefore acts as a passive pre-filter to generate a spectral comb function. The $(M-1)^{st}$ passive stage exhibits maxima at half of the $2^{M-1}$ maxima of the $M^{th}$ stage. The remaining maxima can be addressed with a single half-wave of retardation. Therefore, only two switched states are required for this stage. A scan through the j bands therefore requires a sequence of half-wave shifts and resets. In general, the design requires a total number of output states in the $i^{th}$ (i=1—M) stage of $2^{M-i}$, including the passive state.

Figure 3:
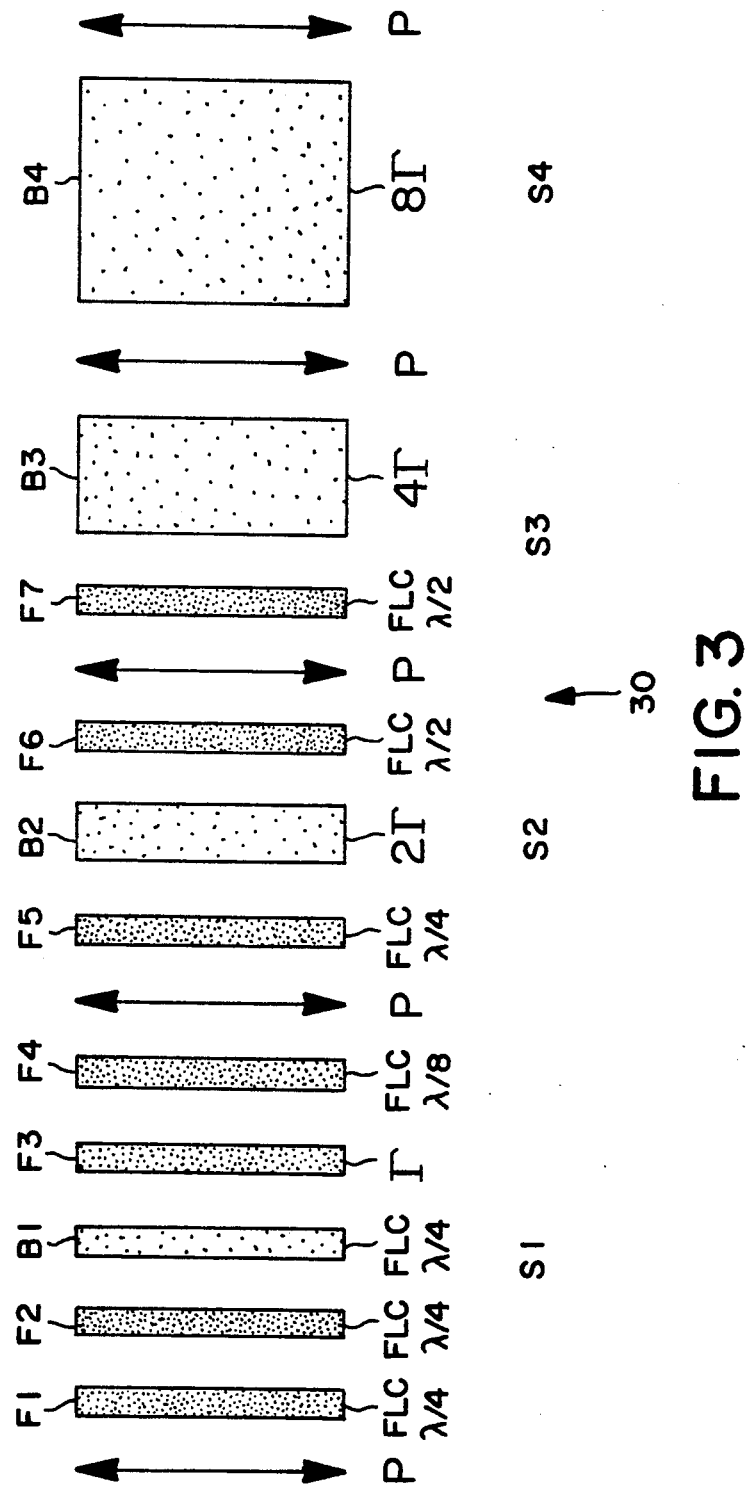
FIG. 3 is a schematic diagram of a four-stage discretely tuning polarization interference filter optimized to generate 8 pure output spectra with a minimum number of FLC cells.

A comparison between an optimized FLC filter of this invention with the Lyot-type FLC filters previously described, illustrates the practical benefits of the optimization techniques disclosed herein. Consider the specific example of a four-stage Lyot filter which discretely tunes through 8 bands within an FSR. A non-optimized Lyot-type filter employing FLCs of the same thickness requires 15 FLC devices for each output, due to the geometrical increase in the number of devices in each stage. With this design, a total of 105 FLC devices are required for 8 output wavelengths. If FLC thickness modulation is used but not the single and multiple-stage switching optimization described herein, 4 FLC devices are required for each additional wavelength. This requires a total of 28 devices in order to achieve maxima at the 8 output bands. Both non-optimized designs require considerably more active elements than desired output bands. FIG. 3 presents an optimized 8-channel (8 wavelength) FLC PIF design which embodies FLC thickness modulation, switching order optimization and the use of non-Lyot orders to obtain a 4 stage Lyot-type output employing only 7 total FLC cells. The four-stage filter (30) of FIG. 3 has 4 binary state FLCs in the first stage, 2 binary state FLCs in the second stage, 1 binary state FLC device in the third stage, and a fourth stage containing only a fixed birefringent element (B4).

Each of stages 1, 2, 3 and 4 are bounded by parallel polarizers (P1–P4) and stages 1, 2 and 3 contain 1 passive retarder (B1–B3, respectively) in addition to the FLCs. The retardance of the fixed retarders B1–B4, increases in the geometric progression $\Gamma$, $2\Gamma$, $4\Gamma$ and $8\Gamma$.

The $M^{th}$ stage (i=M) [S4] contains only a fixed retarder of $8\Gamma$. To obtain an 8 channel output, the $1^{st}$ stage S1 of the filter must be capable of generating 8 pure outputs. This requires at least 4 FLCs (maximum number of pure outputs =9, see Table 2). The $2^{nd}$ stage, S2 must be capable of switching between 4 states and thus requires 2 FLCs (maximum of 4 pure outputs, see Table 2) S3 requires 2 switching states which can be accomplished with a single FLC.

With respect to the order of elements in the filter stages of filter (30), stage S2 must be optimized to allow all four possible pure outputs. The birefringent element B2 is positioned between the two FLCs F5 and F6 and $\Gamma_{F5}\neq\Gamma_{F6}$. The four FLCs of the S1 stage can generate a maximum of 9 outputs, if B1 is in the optimal position in the center of the stage with 2 FLCs on either side. Since only 8 outputs are needed, it is not necessary to position B1 in the optimal position. The fixed birefringent element B1 can be placed in either of positions 2, 3 or 4 (it is in position 4 in the figure) to generate 8 pure outputs. In both S1 and S2 the retardation of the elements on one side of the fixed retarder are different from those on the other to insure that all pure output are unique. The retardations of the FLC cells $F_1 \rightarrow F_7$ are chosen to give an FSR of 20 nm centered at 550 nm with the low order retarder giving m=28 at 540 nm. The untuned filter produces maxima at 540 nm and 560 nm, defining the spectral window over which the filter is tuned.

Figure 4A:
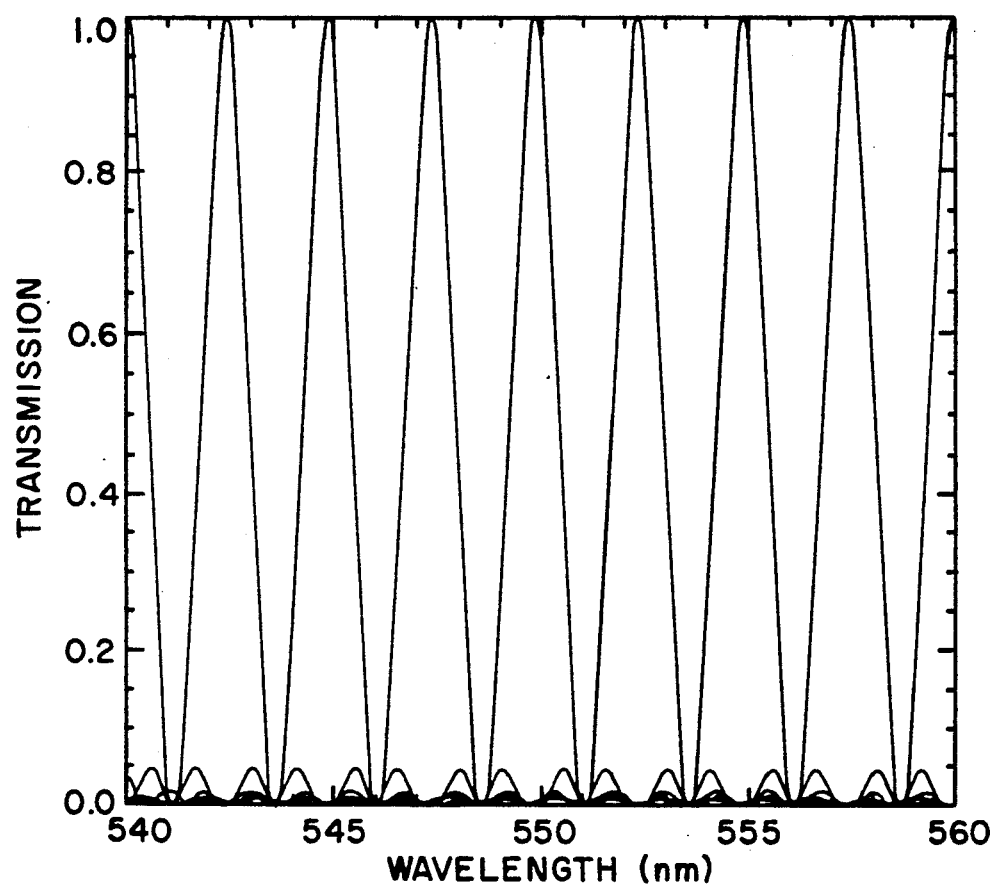
FIG. 4(a-b) compares computer modelled spectra of an ideal Lyot-filter with 8 output spectra (a) with that of the four-stage filter of FIG. 3(b).
Figure 4B:
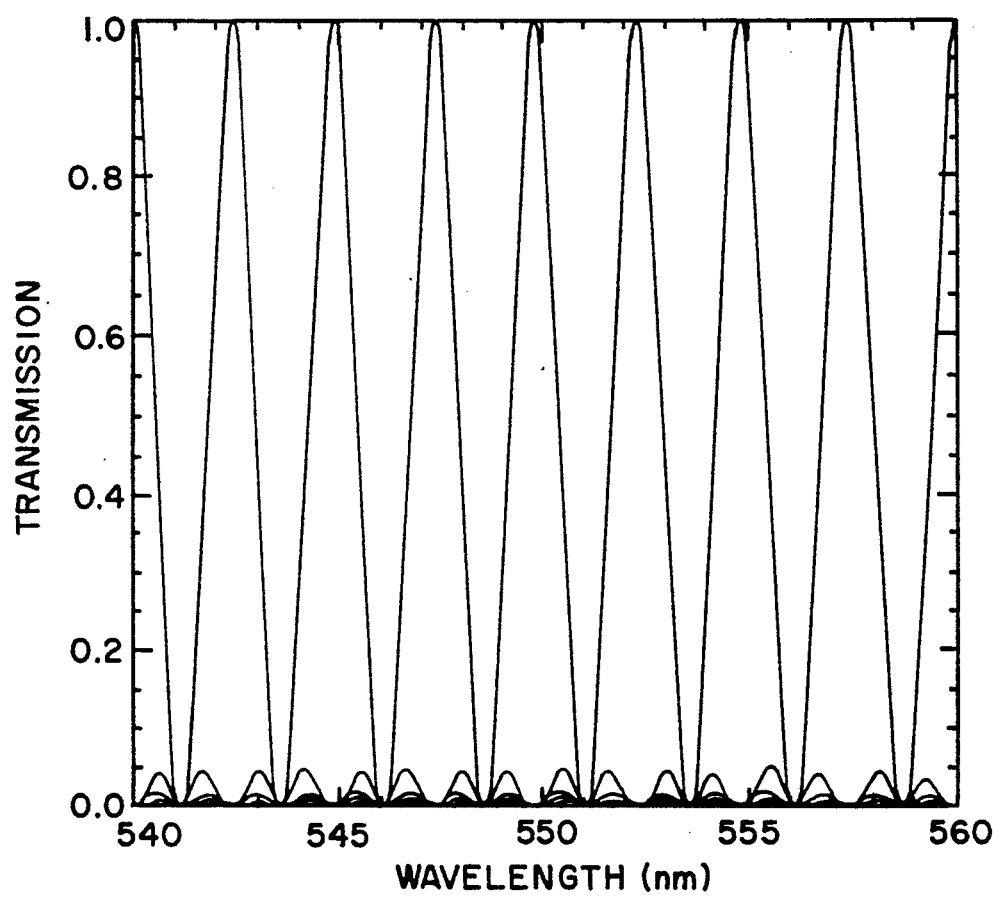

The performance of the filter of FIG. 3 was assessed using a computer model for the transmission function. FIG. 4a and b, compare the calculated output spectra of a Lyot-geometry filter which maintains the geometric sequence (a) with that of the filter of FIG. 3(b). FIG. 4a and b show each of the 8 output spectra within an FSR for the Lyot-geometry (a) and optimized filter using non-Lyot orders (b). The increase inside-lobe transmission due to the simplified design is almost undetectable. Note that the retardation of the FLCs correspond to the design wavelength at the center of the FSR, 550 nm.

Figure 5:
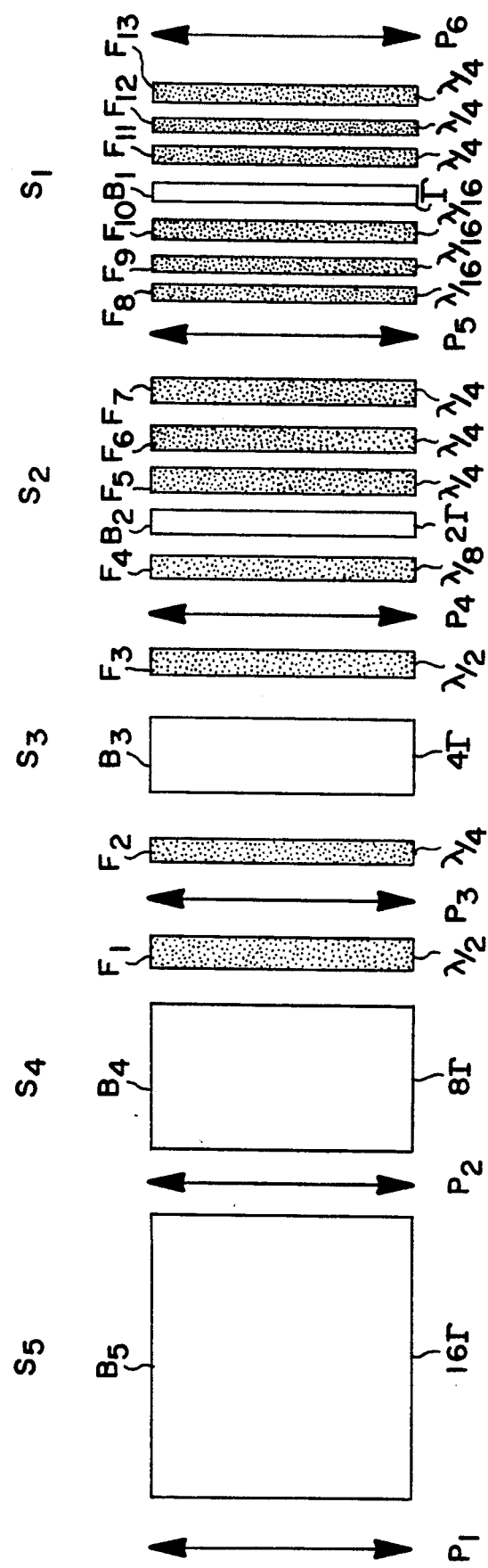
FIG. 5 is a schematic diagram of a five-stage discretely tuning polarization interference filter which illustrates optimizations of this invention.

FIG. 5 illustrates a 5-stage filter employing the optimizing design described above. Each of the stages contains a fixed birefringent element and those elements increase in thickness in a geometric progression $\Gamma$, $2\Gamma$, $4\Gamma$, $8\Gamma$, $16\Gamma$. The filter has 16 output spectra. As shown in FIG. 5, the order of stages need not increase in thickness in order along the light path through the filter. In the filter of FIG. 5, the order of stages is arbitrary with the thickest stage first and the thinnest stage last. The thickest stage (S5) contains only a birefringent element ($16\Gamma$). The number of outputs $P_i$ required for a stage, decreases as the thickness of the stage (defined by the thickness of the fixed birefringent element) increases. ($P_i=2^{M-i}$; 16 for S1, 8 for S2, 4 for S3, 2 for S4 and 1 for S5). The thinnest stage (S1) contains 6 binary state FLC cells which, on optimal placement of the birefringent element, can be switched to give a maximum of 16 pure outputs. S2 requires 4 FLCs, which give a maximum of 9 pure outputs of which only 8 are required. S3 requires 2 FLCs for 4 outputs, while S2 requires only a single binary state FLC.

The order of element in S1 and S3 is critical to achieve maximum pure outputs. S2 need not be fully optimized since only 8 pure outputs are needed. The retardations of FLCs on one side of the fixed birefringent element are different from those on the other side of the fixed birefringent element to insure that the pure outputs are also unique. The filter of FIG. 5 is an extension of the filter of FIG. 3, with the addition of the 6 FLC thinnest stage S . By analogy, a 6-stage, 32 channel (transmission output) filter can be designed by extension from the filter of FIG. 5 by adding a $6^{th}$ stage having 10 binary FLCs. The fixed birefringent elements in the filter would increase in thickness $\Gamma$, $2\Gamma$, $4\Gamma$, $8\Gamma$, $16\Gamma$, $32\Gamma$ to maintain Lyot-type geometry. It should be noted that the FLC thicknesses required for a particular filtering application may be larger or smaller than are currently practical. To achieve such thicknesses, two or more FLCs can be switched synchrously so that their retardations add or subtract.

Figure 6:
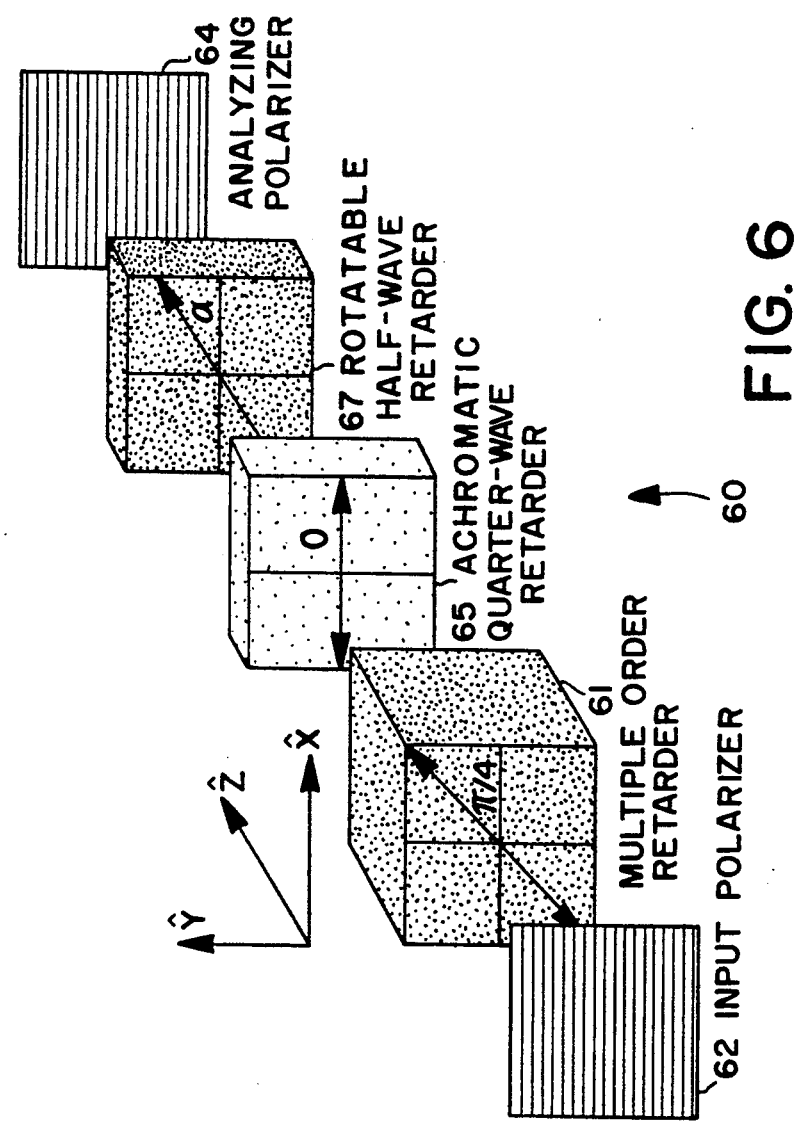
FIG. 6 is a schematic diagram of a single-stage continuously tunable polarization filter having an analog CSLC half-waveplate variable retarder

Continuously tunable optical filters have many applications including spectrometry, multi-spectral scene analysis and remote detection. Continuously tuning single and multiple-stage polarization interference filters (PIFs), i.e., birefringent filters have been implemented using rapidly tuning analog chiral smectic liquid crystal cells (see U.S. Ser. No. 07/522,215 and WO 91/06888). FIG. 6 illustrates a single stage of a continuously tunable CSLC PIF (60) bound by input (62) and exit (64) polarizers which define the stage. A stage contains a fixed birefringent element (61) an achromatic quarter-wave retarder (i.e., an achromatic quarter-waveplate (65) and an analog CSFLC rotatable half-wave retarder (67) as has been described in U.S. Ser. No. 07/522,215 and WO 91/06888. The filter of FIG. 6 has been implemented using a chiral smectic A electroclinic liquid crystal cell as the rotatable half-wave retarder (67).

The tuning of the filter of FIG. 6 through a free spectral range (FSR) with a single CSLC device can be limited, due to limitations in tilt angle of currently available chiral smectic A LC materials. Tuning is also limited, particularly for larger tuning bandwidths because of achromaticity in the analog CSLC cell. For example, a single FLC cell designed to be a half-wave retarder at 540 nm functions as a three-quarter-wave retarder at 425 nm and as a quarter-wave retarder at 900 nm. It has been found, as described herein below, that multiple active CSLC cells (all analog CSLCs or combinations of discrete and analog CSLCs) can be used to obtain a full FSR of tuning and to compensate for chromatic effects for broad band operation.

Mueller/Stokes methods are used herein to derive the transmission functions for an ideal stage, tuned with a passive achromatic quarter-wave retarder (65) and a rotatable achromatic half-wave retarder (67), and for a stage in which the half-wave retarder is chromatic. Results illustrate filter performance degradation for a chromatic deviation from the ideal half-wave retardation. Given a chromatic half-wave tuner, the analysis herein also determines the dependence of transmission on tuner orientation and required polarization rotation. The increased tilt angle required to overcome the loss in rotary capability for complete tunability is also examined.

Following the single element tuner analysis, a dual element tuner is considered. The use of a dual-element tuner is shown to both decrease the requirements on waveplate tilt range by a factor of two, and to enhance the PIF tuning range by compensating for CSLC chromatic effects. The method of chromaticity compensation is introduced and the ideal orientations of the tuner elements are derived as a function of the peak output wavelength. The optimization is achieved by separating the transmission function into an ideal term and a chromatic transmission error term. The ideal element orientations are based on minimizing the chromatic transmission contribution at critical wavelengths. In the initial analysis, the tuner waveplate orientations are not constrained by the range of tilt angles accessible with currently available CSLC materials. (While there is no known theoretical limit to the tilt angles that can be obtained in a SmA* material, only a very few materials having maximum tilt angles of 22.5° have been reported.) In any event, this analysis serves to illustrate optimum absolute waveplate orientations (which determines the chromatic error) as a function of the difference orientation (which determines the ideal peak output wavelength). Finally, given the practical constraints of analog SSFLC tilts, tuning schemes are generated herein that approximate the ideal tuning function. Two dual-SSFLC filter stages are analyzed, as well as a filter stage requiring three SSFLC's. A single-stage filter is experimentally demonstrated and analyzed in detail using the optimum three-CSLC tuner. The performance is compared to that predicted by simulation. Based on this design, a four-stage Lyot filter is demonstrated that tunes continuously from 480 nm to 610 nm. This tuning range is not limited by chromatic effects, and it corresponds to the filter FSR.

The following analysis utilizes Mueller/Stokes methods to represent the function of each element in the ideal operation of a single continuously tunable filter stage. This analysis assumes that light is normally incident on each of the components of the filter. The matrix equation relating the input Stokes vector, $S_i(\lambda)$, to the output vector $S'(\lambda,\alpha)$, for the filter stage of FIG. 5 is, $$S'(\lambda,\alpha) = P_x Q(\lambda,\alpha) A B(\lambda) P_x S_i(\lambda), \quad (25)$$

where $\alpha$ represents the orientation of the half-wave tuner. The Mueller matrices describing each of the filter components in the above equation are given as follows. The incident light is first linearly polarized with an X oriented polarizer given by the Mueller matrix, $$P_x = \tfrac{1}{2}\begin{vmatrix} 1 & 1 & 0 & 0 \\ 1 & 1 & 0 & 0 \\ 0 & 0 & 0 & 0 \\ 0 & 0 & 0 & 0 \end{vmatrix} \quad (26)$$

The above represents an ideal linear polarizer, with 100% transmission along the transmitting axis and a null in transmission along the blocking axis for all wavelengths. Taking the input Stokes vector to correspond to a polarized field with unity power spectral density, the Stokes vector for light entering the birefringent element is given by multiplying $S_i(\lambda)$ by Equation 26, $$S_P(\lambda) = P_x S_i(\lambda) = \begin{vmatrix} 1 \\ 1 \\ 0 \\ 0 \end{vmatrix} \quad (27)$$

Assuming an $\hat{X}$ polarized input, the factor of $\tfrac{1}{2}$ resulting for an unpolarized input can be neglected. For an input with unity power spectral density, $S'(\lambda,\alpha)$ represents the intensity transmission function for the filter stage. As in conventional fixed wavelength Lyot filters, the light then passes through a multiple-order birefringent retarder $B(\lambda)$, with retardation $\Gamma(\lambda)$, and orientation $\pi/4$, $$B(\lambda) = \begin{bmatrix} 1 & 0 & 0 & 0 \\ 0 & \cos\Gamma(\lambda) & 0 & -\sin\Gamma(\lambda) \\ 0 & 0 & 1 & 0 \\ 0 & \sin\Gamma(\lambda) & 0 & \cos\Gamma(\lambda) \end{bmatrix}. \quad (28)$$

where losses due to absorption, Fresnel reflections and interferometric effects are neglected in this analysis. In practice, antireflection coatings are used to both decrease Fresnel losses, and to avoid degradation in performance due to multiple passes through retarders. The retardation of the birefringent element, neglecting dispersion of the birefringence, can be written as $$\Gamma(\lambda) = \frac{2\pi m \lambda_d}{\lambda}, \quad (29)$$

where the waveplate is an $(m-1)$ order $(m=1,2,\ldots)$ full-wave retarder at the filter design wavelength, $\lambda_d$, and $\lambda$ is the incident free-space wavelength. The input polarization is rotated about B through a wavelength dependent angle, $\Gamma$. The output polarizations are therefore distributed in the $S_1$-$S_3$ plane according to wavelength. The ellipticity at a particular wavelength is given by $\Gamma(\lambda)$, as represented by the output (o). The Stokes vector for light exiting the birefringent element is given by multiplication of the Stokes vector of Equation 27 by the matrix of Equation 28, $$S_B(\lambda) = \begin{pmatrix} 1 \\ \cos\Gamma \\ 0 \\ \sin\Gamma \end{pmatrix}. \quad (30)$$

The above shows that all elliptical polarizations have major axes either parallel or perpendicular to the input polarization ($S_2=0$). Note that integer (n) multiple rotations by $(2\pi n + \Gamma)$, of the polarization about $\hat{B}$ represent wavelengths which are separated by an FSR of the filter stage.

The elliptical light then passes through an $\hat{X}$ oriented achromatic quarter-wave retarder. Assuming ideal quarter-wave retardation throughout the filter FSR, the Mueller matrix is given by, $$A = \begin{vmatrix} 1 & 0 & 0 & 0 \\ 0 & 1 & 0 & 0 \\ 0 & 0 & 0 & 1 \\ 0 & 0 & -1 & 0 \end{vmatrix} \quad (31)$$

As mentioned previously, the achromatic quarter-waveplate analyzes the ellipticity of light exiting the birefringent element. Multiplying the Stokes vector of Equation 30 by the Mueller matrix of Equation 31 produces the following Stokes vector, $$S_A(\lambda) = \begin{vmatrix} 1 \\ \cos\Gamma \\ \sin\Gamma \\ 0 \end{vmatrix} \quad (32)$$

The input polarization to the achromatic quarter-wave retarder is rotated about the retarder optic axis and the resulting polarizations are then linear states with wavelength dependent orientation angle, $\Gamma$. Note that the ellipticity, given by $S_3$ of the Stokes vector, is in general zero since the light is linearly polarized at all wavelengths.

Tuning a stage requires a rotation of an achromatic half-wave retarder to select a desired wavelength. A generalized tuner is represented here since several types of tuning structures are analyzed below. These results simplify the derivation of transmission functions, particularly in the case of tuners consisting of multiple active elements. The elements of the Mueller matrix are written in a general form, with elements, $q_{ij}$. Multiplying this general Mueller matrix by the Stokes vector of Equation 32 gives, $$S_Q(\lambda,\alpha) = \begin{pmatrix} q_{11} + q_{12}\cos\Gamma + q_{13}\sin\Gamma \\ q_{21} + q_{22}\cos\Gamma + q_{23}\sin\Gamma \\ q_{31} + q_{32}\cos\Gamma + q_{33}\sin\Gamma \\ q_{41} + q_{42}\cos\Gamma + q_{43}\sin\Gamma \end{pmatrix}, \quad (33)$$

where $\alpha$ is a vector giving the orientations of each of the retarders comprising the tuning structure with respect to the $\hat{X}$-axis. The above is simplified by noting that in general the tuner consists only of uniaxial layers with their optic axis contained in the plane of the aperture of the cell, $$q_{11} = 1 \quad (34)$$
$$q_{12} = q_{13} = q_{21} = q_{31} = q_{41} = 0.$$

The Stokes vector therefore simplifies to, $$S_Q(\lambda,\alpha) = \begin{pmatrix} 1 \\ q_{22}\cos\Gamma + q_{23}\sin\Gamma \\ q_{32}\cos\Gamma + q_{33}\sin\Gamma \\ q_{42}\cos\Gamma + q_{43}\sin\Gamma \end{pmatrix}. \quad (35)$$

Ideally, the active element consists of a single rotatable half-wave retarder which is completely achromatic over the tuning bandwidth. Under this assumption, the Mueller matrix for the tuner element with orientation $\alpha$ is given by the reflection matrix, $$Q(\alpha) = \begin{bmatrix} 1 & 0 & 0 & 0 \\ 0 & \cos[4\alpha] & \sin[4\alpha] & 0 \\ 0 & \sin[4\alpha] & -\cos[4\alpha] & 0 \\ 0 & 0 & 0 & 1 \end{bmatrix}. \quad (36)$$

Using the ideal tuner, the elements substituted into the generalized Stokes vector of Equation 35 are, $$\begin{aligned} q_{22} &= \cos[4\alpha] \\ q_{23} &= \sin[4\alpha] \\ q_{32} &= \sin[4\alpha] \\ q_{33} &= -\cos[4\alpha] \\ q_{42} &= 0 \\ q_{43} &= 0. \end{aligned} \quad (37)$$

The Stokes vector for light exiting the achromatic half-wave tuner is given by Equation 35 as, $$S_O(\lambda,\alpha) = \begin{pmatrix} 1 \\ \cos[\Gamma - 4\alpha] \\ -\sin[\Gamma - 4\alpha] \\ 0 \end{pmatrix} \quad (38)$$

The minus sign in $S_2$ results from the polarization reflection by the half-wave retarder. Most importantly, a phase shift of $4\alpha$ is induced in the arguments of both $S_1$ and $S_2$. For a Lyot filter, the component retained by the exit polarizer is $S_1$, while the $S_2$ component gives the output of a filter with crossed polarizers. Multiplication by the exit polarizer matrix produces the output Stokes vector corresponding to the ideal filter transmission function, $$T_f(\lambda,\alpha) = \cos^2(\Gamma/2 - 2\alpha). \quad (39)$$

The above expression shows that the effect of the two achromatic tuner elements is a wavelength independent phase shift of the transmission, given by twice the tilt of the half-waveplate, $\alpha$. Tuning the ideal transmission function through an FSR ($-\text{FSR}/2 \rightarrow \text{FSR}/2$) centered at the design wavelength requires that the waveplate rotate through a total angle of $\pi/2$. For an ideal achromatic half-waveplate, the wavelength of maximum transmission is given by solving for the argument of Equation 39 for the condition of unity transmission. The effect of the tuner is to phase shift the $(m-1)$ order maximum of the transmission function away from the design wavelength, $\lambda_d$. The wavelength of peak transmission is obtained by solving the equation, $$(\Gamma/2 - 2\alpha) = \pi m \quad (40)$$

using Equation 29. The result gives the peak output wavelength, $\lambda_M$, as a function of the orientation of the half-waveplate, $$\lambda_M(\alpha) = \frac{\lambda_d}{1 + [2\alpha/\pi m]} \quad (41)$$

Alternatively, the half-waveplate angle required to obtain maximum transmission at the wavelength, $\lambda_M$, is given by $$\alpha(\lambda_M) = \frac{\pi m}{2}(\lambda_d/\lambda_M - 1) \quad (42)$$

The wavelengths of transmission nulls adjacent to $\lambda_M$ are given by, $$\lambda_M(\alpha) = \frac{\lambda_d}{1 + 1/2m + [2\alpha/\pi m]} \quad (43)$$

An FSR of tuning centered at the design wavelength requires that the half-wave retarder be rotated through $\alpha = (-\pi/4 \rightarrow \pi/4)$. Substituting these orientations into Equation 4.17 gives the wavelengths of extreme long and short wavelength tuning, respectively. The difference of these wavelengths gives the FSR, $$\Delta\lambda = \frac{\lambda_d/m}{1 + 1/m^2} \quad (44)$$

For moderately high order ($m > 10$), Equation 44 reduces to, $\Delta\lambda = \lambda_d/m$.

In a multiple-stage Lyot filter implementation, the $(m-1)$ order stage corresponds to the filter stage with the broadest tuning band. Based on Equation 39, the transmission function for an N-stage tunable Lyot filter can be written as, $$T(\lambda,\phi) = \prod_{i=1}^{N} \cos^2\left\{\frac{\pi m 2^{i-1}\lambda_d}{\lambda} - \phi_i\right\} \quad (45)$$

where $\phi_i$ is the phase shift induced by the tuner of the $i^{th}$ stage for a particular output wavelength. In the above equation, $i=1$ corresponds to the lowest order stage, which determines the FSR, while $i=N$ corresponds to the highest order stage, which determines the filter resolution. The actual order in which the filter stages appear along the direction of propagation is arbitrary. The phase shift required for each stage, in order to maintain the lyot design, is obtained using Equations 39 and 45, $$\phi_i = 2\alpha 2^{i-1} \quad (46)$$

The above equation shows that the phase shift required in each stage for a Lyot spectrum centered at wavelength $\lambda_M$ (given by Equation 41, increases geometrically with the thickness of the birefringent element. However, an FSR of tuning in general requires only a $\pi/2$ rotation of the half-wave retarder. Since rotation beyond this range is redundant, a reset mode is equivalent to continuous rotation. This describes the tuning scheme required for the CSLC Lyot filter. Thus, scanning the Lyot filter through an entire FSR requires a single scan by the first stage, two scans by the second stage, four scans by the third stage, and so on. The total time required to perform a complete scan is therefore proportional to $2^{N-1}$. Physically, there are $2^{i-1}$ transmission maxima of the $i^{th}$ stage within an FSR of the filter. A full scan requires a series of $2^{i-1}$ scans, and $2^{i-2}$ resets, utilizing each of the spectral orders in an FSR.

The ideal operation of the Lyot filter requires accurate relative orientations of the achromatic half-wave elements in each stage in order to obtain proper spectral alignment of the overall transmission function. For ideal achromatic elements, the required orientations of the liquid crystal directors are given by Equation 46, with appropriate resets for rotations exceeding $\pm\pi/4$. If, however, the half-wave retarder is chromatic, then the orientation also depends upon the chromaticity of the active element. In the event that the achromatic assumption is invalid, the full FSR of tuning is not achieved with $\pi/2$ of rotation. The following analysis pertains to a filter which utilizes a chromatic half-wave retarder, with an ideal achromatic quarter-wave retarder, illustrating performance degradation as a function of filter operating bandwidth.

Consider the use of a rotatable single-layer chromatic half-wave retarder as the tuning element for the filter stage described previously. Here we assume that the passive quarter-wave retarder functions ideally. The filter is assumed to tune through a band centered at the design wavelength, $\lambda_d$. It is therefore assumed that the retardation of the tuner is identically $\pi$ at this wavelength, giving, $$\Gamma(\lambda) = \pi + \delta(\lambda) \quad (47)$$

where $\delta(\lambda)$ represents the deviation from the ideal retardation with wavelength. Substituting this expression and the waveplate orientation $\alpha$ into the general Mueller matrix for a retarder yields, $$q_{22} = \sin^2[\delta/2] + \cos[4\alpha]\cos^2[\delta/2]$$
$$q_{23} = \cos^2[\delta/2]\sin[4\alpha]$$
$$q_{32} = \cos^2[\delta/2]\sin[4\alpha]$$
$$q_{33} = \sin^2[\delta/2] - \cos[4\alpha]\cos^2[\delta/2]$$
$$q_{42} = -\sin[\delta]\sin[2\alpha]$$
$$q_{43} = \sin[\delta]\cos[2\alpha].$$
(48)

Substituting these elements into the general Stokes vector of Equation 35 for light exiting the tuner gives, $$S_Q(\lambda,\alpha) = \begin{pmatrix} 1 \\ \cos[\Gamma - 4\alpha] - 2\sin^2[\delta/2]\sin[2\alpha]\sin[\Gamma - 2\alpha] \\ -\sin[\Gamma - 4\alpha] + 2\sin^2[\delta/2]\cos[2\alpha]\sin[\Gamma - 2\alpha] \\ \sin[\delta]\sin[\Gamma - 2\alpha] \end{pmatrix}$$
(49)

The elements $S_1$ and $S_2$ of the Stokes vector have been written as a sum which includes the ideal terms, given by the Stokes vector of Equation 38, and an additive term due to the chromaticity of the waveplate. Note the presence of an ellipticity term, $S_3$, which vanishes in the case of a chromaticity. As the waveplate retardation deviates from $\pi$, the increase in induced ellipticity is accompanied by a decrease in rotary efficiency. The rotary efficiency is given as the ratio of actual polarization rotation to that predicted for an ideal half-wave retarder. The increase in ellipticity is representative of an increased tendency for the retarder to behave as a quarter-wave retarder. As the deviation in retardation persists, the rotary efficiency approaches the 50% value associated with a quarter-wave retarder. The induced ellipticity depends also upon the angle through which the polarization must be rotated. The reduction in rotary efficiency is manifested in the diminishing magnitudes of linear polarizations, $S_1$ and $S_2$, as given by the Stokes vector. The increased chromaticity in the resulting transmission function results in a decrease in transmission at the desired peak output wavelength and an increase in the null transmission. The latter is of greatest concern, since it most impacts the spectral contrast ratio.

Multiplying the Stokes vector of Equation 49 by the matrix for the analyzing polarizer gives the output intensity transmission function in separate form, $$T(\lambda,\alpha) = T_I(\lambda,\alpha) + T_E(\lambda,\alpha)$$
(50)

where $$T_I(\lambda,\alpha) = \cos^2[\Gamma/2 - 2\alpha]$$
(51)

and $$T_E(\lambda,\alpha) = -\sin^2[\delta/2] \sin[2\alpha] \sin[\Gamma - 2\alpha]$$
(52)

The expression $T_I(\lambda,\alpha)$ is the ideal intensity transmission function derived previously and $T_E(\lambda,\alpha)$ is the chromatic intensity transmission function.

The chromatic expression, $T_E(\lambda,\alpha)$, consists of three multiplicative terms, each with specific characteristics. There is a dependence on deviation from the ideal $\pi$ retardation, which is to lowest order a quadratic function of $[\delta/2]$. The second term depends linearly (to lowest order) on the waveplate orientation, $\alpha$. This term shows that the ideal transmission function results for the orientation, $\alpha = 0$, regardless of tuner retardation. As the waveplate angle, $\alpha$, deviates from zero tilt, this symmetry is broken, resulting in a chromatic error term.

The last term in the chromatic intensity transmission function reflects the dependence on the angle through which the polarization must be rotated. Tuning by $\pm FSR/2$ requires the largest polarization rotation, and hence produces the most degraded transmission function. This is due not only to the fact that the wavelengths residing at these polarization angles exhibit the largest chromatic effects, but also because the maximum polarization rotation of $\pm \pi/2$ is required.

As discussed above, one of the effects of tuner chromaticity is the reduction in rotary efficiency, at the additional expense of an increased ellipticity. A consequence of this fact is that a rotation of $\pm \pi/4$ is inadequate for tuning the filter through an FSR. Therefore, narrow wavelength gaps exist in the tuning, unless a rotation exceeding $\pi/2$ is used. The rotation required to obtain a particular peak transmitted wavelength, $\lambda_M$. The result is given by, $$\alpha(\lambda_m) = \alpha_I(\lambda_M) - \epsilon(\lambda_M)$$
(53)

where $\alpha_I(\lambda_M)$ is the ideal orientation given by Equation 4.18, and $\epsilon(\lambda_M)$ is a chromatic correction given by, $$\epsilon(\lambda_M) = \tfrac{1}{4}[\tan^{-1}[\eta_1(\lambda_M) \pm \cos^{-1}[\eta_2(\lambda_M)]].$$
(54)

The expressions for $\eta_1$ and $\eta_2$ are given by $$\eta_1(\lambda) = \frac{-2\kappa\tan\left[\dfrac{\delta}{2}\right]}{1 - \kappa^2\tan^2\left[\dfrac{\delta}{2}\right]}$$
(55)

and $$\eta_2(\lambda) = \frac{2\tan^2[\delta/2](\kappa\cos[\Gamma] - \tan[\delta/2]\sin[\Gamma])^2}{1 + \kappa^2\tan^2[\delta/2]}$$
(56)

where, $$\kappa = \frac{\partial \delta}{\partial \lambda} \bigg/ \frac{\partial \Gamma}{\partial \lambda}.$$
(57)

Differentiating Equation 29 gives $$\frac{\partial \Gamma}{\partial \lambda} = \frac{-2\pi m \lambda_d}{\lambda^2},$$
(58)

By selecting the waveplate thickness to provide a retardation of $\pi$ at the design wavelength, $\lambda_1$, the liquid crystal retardation is given by, $$\Gamma_R(\lambda) = \pi \frac{\lambda}{\lambda_d} \left[ \frac{\lambda_d^2 - \lambda^{*2}}{\lambda^2 - \lambda^{*2}} \right].$$
(59)

This expression includes the effect of FLC birefringence dispersion, $\Delta n(\lambda)$, using the model of Wu. Differentiating Equation 58 gives, $$\frac{\partial \delta}{\partial \lambda} = \frac{-\pi(\lambda_d^2 - \lambda^{*2})(\lambda^2 + \lambda^{*2})}{\lambda_d(\lambda^2 - \lambda^{*2})^2}. \quad (60)$$

Inserting the results of the differentiation into Equation 56 gives, $$\kappa(\lambda) = \frac{(1 - [\lambda^*/\lambda_d]^2)(1 + [\lambda^*/\lambda]^2)}{2m(1 - [\lambda^*/\lambda]^2)^2} \quad (61)$$

Figure 7:
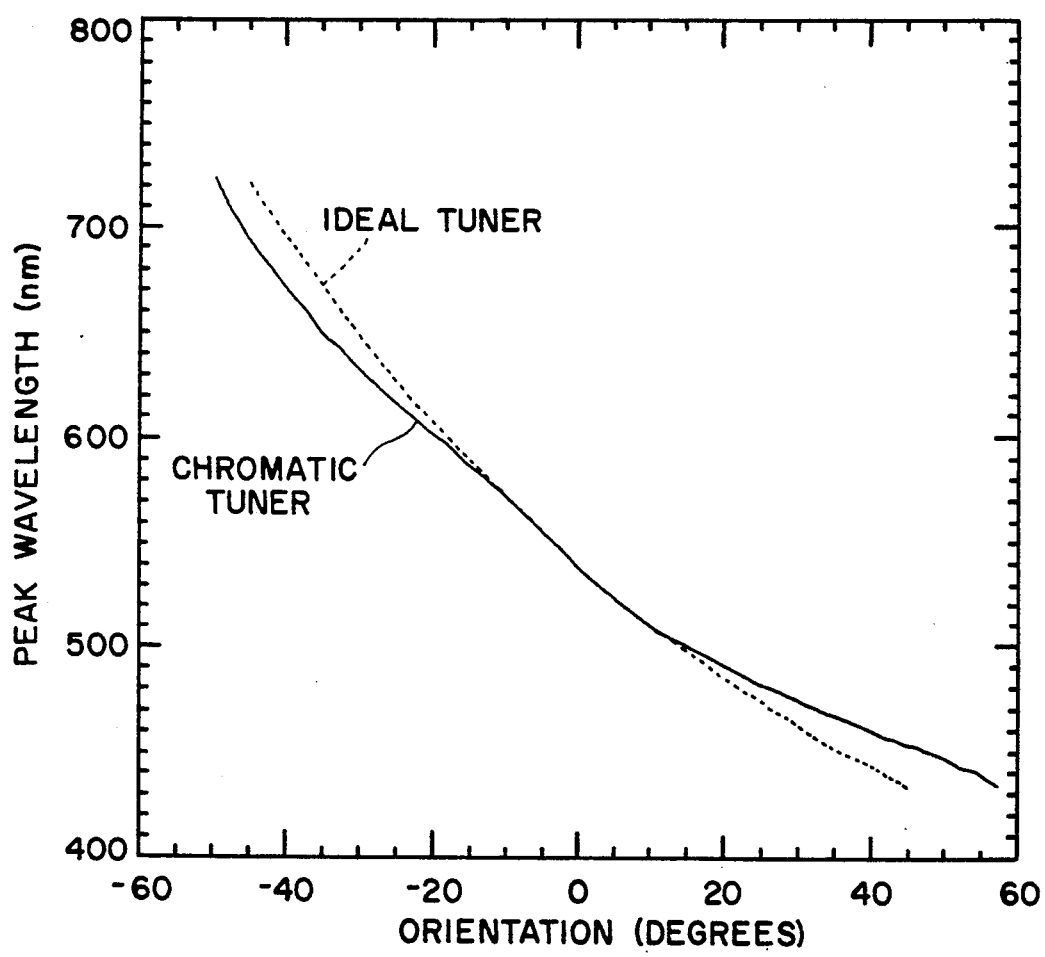
FIG. 7 is a graph illustrating the theoretical peak output wavelength for achromatic (dotted line) and chromatic (solid line) tuners as a function of orientation $\alpha$.

FIG. 7 shows the peak output wavelength as a function of the tuner orientation, $\alpha$, for a particular example of a single-stage filter with $m=2$ at 540 nm. The FSR of this filter, using a dispersionless birefringent element, is 288 nm (432 nm→720 nm). Using the model for CSLC birefringence, with a retardation of $\pi$ at 540 nm, an additional rotation of 20% is required to achieve a full FSR of tuning. FIG. 7 shows the peak output wavelength for achromatic (dotted line) and chromatic (solid line) tuners as a function of orientation for this particular example.

Figure 8:
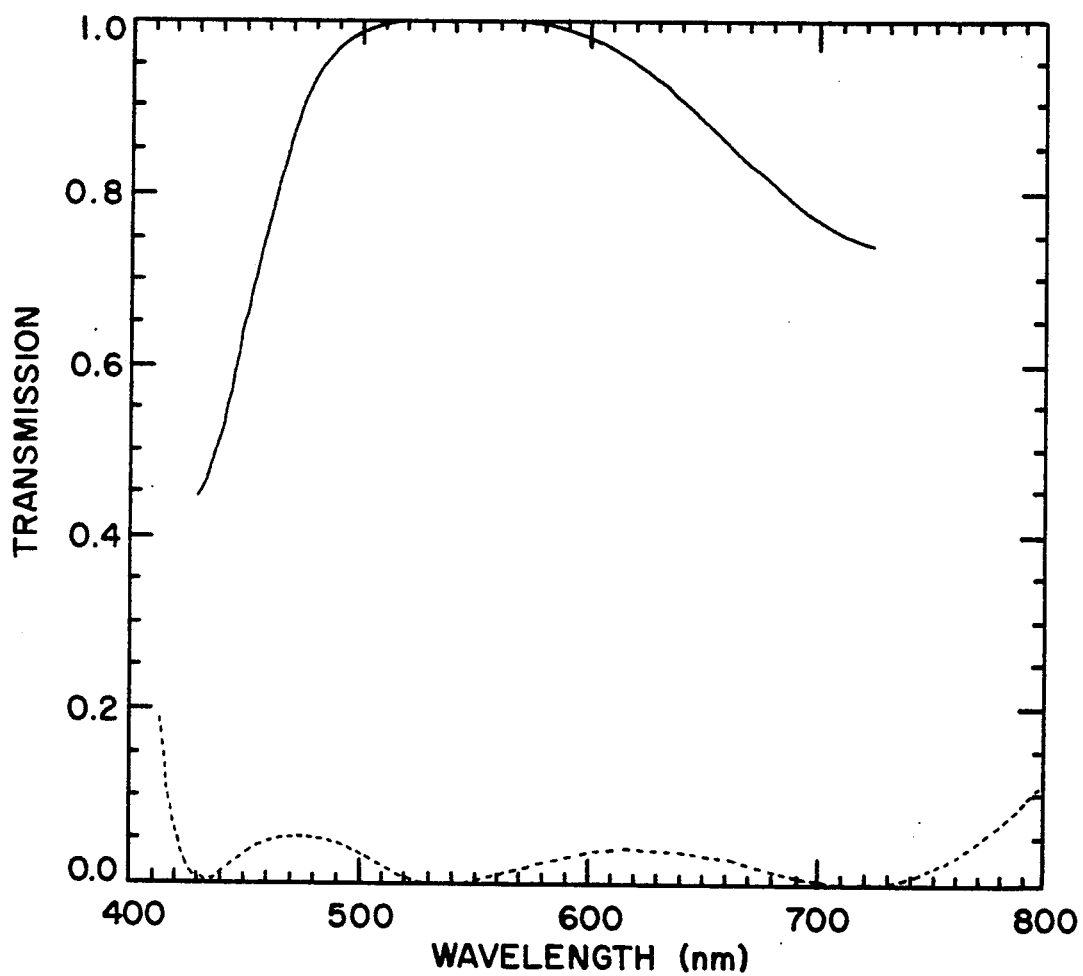
FIG. 8 is a graph illustrating the theoretical peak (solid line) and null (dotted line) transmission for tuning throughout an FSR for the filter using a single element tuner.

While chromatic effects of the tuner impact the entire output spectrum, actual performance degradation depends most critically on the peak and orthogonally polarized null wavelengths. This is certainly true when the spectral-contrast-ratio (SCR) is used as the characteristic figure-of-merit. This is given as the ratio of mean transmission at peak wavelengths to the mean transmission at null wavelengths within an FSR of the filter. Neglecting the loss in rotary efficiency, the transmission at ideal peak and null wavelengths as a function of $\alpha$ is given by solving Equation 50, thus $$T(\lambda_M, \alpha) = 1 - \sin^2[2\alpha]\sin^2[\delta(\lambda_M)/2], \quad T(\lambda_N) = \sin^2 2\alpha]\sin^2[\delta(\lambda_N)/2], \quad (62)$$

where the ideal peak and null wavelengths are given by Equations 41 and 43, respectively. The maximum chromatic contribution occurs for the wavelengths requiring the largest polarization rotation, $\alpha = \pm \pi/4$, weighted by the dependence on deviation in retardation for the particular wavelength. As the peak is tuned from the design wavelength, these two terms reduce the transmission, with maximum loss occurring at $\pm$FSR/2. However, scanning a null toward the design wavelength limits the null transmission since the maximum value of $\sin^2[2\alpha]$ corresponds to a minimum of $\sin^2[\delta/2]$. However, both terms contribute to increased null transmission for operation of the filter stage over a bandwidth larger than an FSR. FIG. 8 shows the peak and null transmission for tuning throughout an FSR using the above example. The 90% transmission bandwidth for this example is 175 nm, which is roughly 60% of an FSR. The ideal null transmission results for the untuned state at 432 nm and 720 nm, and the design wavelength, 540 nm. Between these states, the null transmission increases to a maximum of 6% at 475 nm and 4% at 630. Note that the null transmission increases sharply for tuning beyond an FSR.

A significant result of the above analysis is that chromatic transmission at the peak and null wavelengths increases with increased tuning due to three factors; (1) increased chromaticity due to increased deviation from the design wavelength retardation; (2) increased dependence of analyzed polarization (degree of $S_1$ polarized light) on chromaticity with increased tilt angle, and; (3) increase in required polarization rotation. A multiple-element continuously tunable filter is now provided which has increased tuning range and which allows chromatic compensation. The use of more than one active birefringent element to tune a CSLC filter stage accomplishes two tasks: a relaxed requirement on the tilt range of individual retarders required to tune through a filter FSR, and, compensation for chromatic effects introduced by a single-element tuner. This is particularly important for filters which are operated over large FSR's. In this section, a tuner utilizing two active chromatic retarders is analyzed. Initially, chromaticity is neglected to illustrate the effect of a dual-waveplate tuner for achieving the first of the above benefits. Subsequently, a chromatic dual-waveplate tuner is analyzed, which introduces chromaticity compensation. The constraints of actual CSLC tilt angles are initially neglected in order to determine orientations that achieve minimum chromatic transmission as a function of peak output wavelength. This produces an ideal waveplate orientation function, which can be approximated with available CSLC implementations.

The analysis begins with the derivation of the Mueller matrix for the composite tuning structure. This gives the $q_{ij}$ which are substituted into Equation 35 to obtain the Stokes vector for light entering the output analyzing polarizer. The Mueller matrix for the tuner is given as, $$Q(\lambda, \alpha_1, \alpha_2) = W(\lambda, \alpha_2) W(\lambda, \alpha_1), \quad (63)$$

where $W(\lambda, \alpha_1)$, and, $W(\lambda, \alpha_2)$ are the Mueller matrices for the individual retarders. Initially, the two retarders are assumed to function achromatically. This produces the ideal Stokes vector, illustrating the ideal operation of the two waveplate tuner on the input polarization. Taking $\delta = 0$, the Mueller matrix of Equation 36 can be substituted into Equation 63, with the indicated orientations. This produces the rotation matrix, $$Q(\alpha_1, \alpha_2) = \begin{bmatrix} 1 & 0 & 0 & 0 \\ 0 & \cos[4(\alpha_1 - \alpha_2)] & \sin[4(\alpha_1 - \alpha_2)] & 0 \\ 0 & -\sin[4(\alpha_1 - \alpha_2)] & \cos[4(\alpha_1 - \alpha_2)] & 0 \\ 0 & 0 & 0 & 1 \end{bmatrix}. \quad (64)$$

which depends only upon the relative orientations $(\alpha_1 - \alpha_2)$ of the half-waveplates. In general, two half-waveplates rotate an arbitrary input polarization by twice the angle between the retarder optic axes, independent of absolute orientation. This is illustrated by rewriting the waveplate orientations as the sum of a mean orientation and a difference orientation, $$\alpha_0 = \frac{\alpha_1 + \alpha_2}{2} \text{ and, } \alpha = \frac{\alpha_1 - \alpha_2}{2}. \quad (65)$$

respectively. Substituting these relations into the above tuner matrix yields the rotation matrix, $$Q(\alpha) = \begin{bmatrix} 1 & 0 & 0 & 0 \\ 0 & \cos[8\alpha] & \sin[8\alpha] & 0 \\ 0 & -\sin[8\alpha] & \cos[8\alpha] & 0 \\ 0 & 0 & 0 & 1 \end{bmatrix}. \quad (66)$$

Thus, with ideal half-wave retarders the resulting tuner matrix represents a pure rotation that depends only on the difference angle, $2\alpha$. Using two half-wave retarders in which the optic axis are rotated in opposite directions, the effective polarization rotation is double that due to a single retarder. The Stokes vector for light exiting the tuner is given by substituting the $q_{ij}$ of Equation 60 into Equation 35, $$S_Q(\lambda,\alpha) = \begin{pmatrix} 1 \\ \cos[\Gamma - 8\alpha] \\ \sin[\Gamma - 8\alpha] \\ 0 \end{pmatrix} \quad (67)$$

This is similar to the equation resulting from the achromatic single-waveplate tuner, with positive $S_2$ due to polarization rotation rather than reflection, and a doubled phase shift due to the combination of tuning elements. The ideal transmission function is obtained by multiplying Equation 67 by the exit polarizer matrix, $$T_f(\lambda,\alpha) = \cos^2[\Gamma/2 - 4\alpha]. \quad (68)$$

This analysis shows that multiple elements can be used in order to relax the requirements on tilt angle of a single CSLC device. The above transmission function shows that each retarder must have a total tilt range of $\pi/4$ to tune through an FSR. This is within the bounds of current electroclinic materials. This result can be generalized to an arbitrary number of cascaded tuners, each with tilt opposing that of the previous element. For N identical half-wave retarders, with alternating tilt angle of magnitude $\alpha$, the induced phase shift in the transmission function is $2\alpha N$. Note that the output transmission function depends only on the relative orientation of the half-wave CSLC tuning elements. However, should the tuning bandwidth exceed the limits of achromatic behavior for the device, the transmission function becomes sensitive to the absolute waveplate orientation, $\alpha_o$. The following section shows that the proper selection of $\alpha_o$ is critical to the performance of the filter.

In the analysis of a single chromatic half-wave tuner, it was shown that there is an inherent dependence of chromatic error on filter tuning. Results using a single active element, although simple in design, significantly degrade the performance of broad tuning filters.

For a tuner that consists of two identical chromatic half-wave retarders, with retardation given by Equation 47 and orientations $\alpha_1$ and $\alpha_2$, substituting the retarder Mueller matrices into Equation 63 yields the $q_{ij}$ of the dual-waveplate tuner, $$q_{22} = \sin^4[\delta/2] + \cos^4[\delta/2]\cos[4(\alpha_1 - \alpha_2)] + \quad (69)$$
$$\sin^2[\delta/2]\cos^2[\delta/2][\cos 4\alpha_1 + \cos 4\alpha_2 - 4\sin 2\alpha_1 \sin 2\alpha_2],$$

$$q_{23} = \cos^4[\delta/2]\sin[4(\alpha_1 - \alpha_2)] +$$
$$\sin^2[\delta/2]\cos^2[\delta/2][\sin 4\alpha_1 + \sin 4\alpha_2 + 4\cos 2\alpha_1 \sin 2\alpha_2],$$

$$q_{32} = -\cos^4[\delta/2]\sin[4(\alpha_1 - \alpha_2)] +$$
$$\sin^2[\delta/2]\cos^2[\delta/2][\sin 4\alpha_1 + \sin 4\alpha_2 + 4\sin 2\alpha_1 \cos 2\alpha_2],$$

$$q_{33} = \sin^4[\delta/2] + \cos^4[\delta/2]\cos[4(\alpha_1 - \alpha_2)] -$$
$$\sin^2[\delta/2]\cos^2[\delta/2][\cos 4\alpha_1 + \cos 4\alpha_2 + 4\cos 2\alpha_1 \cos 2\alpha_2]$$

$$q_{42} = -\sin[\delta]\sin[2\alpha_2][\sin^2[\delta/2] + \cos^2[\delta/2]\cos[4\alpha_1]] +$$
$$\sin[\delta]\cos^2[\delta/2]\sin[4\alpha_1]\cos[2\alpha_2] + \sin[\delta]\cos[\delta]\sin[2\alpha_1],$$

$$q_{43} = \sin[\delta]\cos[2\alpha_2][\sin^2[\delta/2] - \cos^2[\delta/2]\cos[4\alpha_1]] -$$
$$\sin[\delta]\cos^2[\delta/2]\sin[4\alpha_1]\sin[2\alpha_2] + \sin[\delta]\cos[\delta]\cos[2\alpha_1].$$

Substituting these expressions into the generalized Stokes vector of Equation 35 gives the elements of the Stokes vector for light exiting the dual-waveplate tuner, $$S_1 = \cos[\Gamma + 4(\alpha_2 - \alpha_1)] + 2\sin^2[\delta/2]\sin[2(\alpha_2 - \alpha_1)]\sin[\Gamma + \quad (70)$$
$$2(\alpha_2 - \alpha_1)] + 2\sin^2[\delta]\cos^2(\alpha_2 - \alpha_1)\sin[2\alpha_2]\sin[\Gamma - 2\alpha_1],$$

$$S_2 = \sin[\Gamma + 4(\alpha_2 - \alpha_1)] - 2\sin^2[\delta/2]\sin[2(\alpha_2 - \alpha_1)]\cos[\Gamma +$$
$$2(\alpha_2 - \alpha_1)] + 2\sin^2[\delta]\cos^2(\alpha_2 - \alpha_1)\cos[2\alpha_2]\sin[\Gamma - 2\alpha_1],$$

$$S_3 = 2\sin[\delta]\cos[\alpha_2 - \alpha_1]\{\sin[\Gamma -$$
$$(\alpha_1 + \alpha_2)] - 2\cos^2[\delta/2]\cos[\alpha_2 - \alpha_1]\sin[\Gamma - 2\alpha_1]\}.$$

Substituting the relations for the waveplate orientations in terms of $\alpha_o$ and $\alpha$, the Stokes vector is simplified, $$S_Q(\lambda,\alpha) = \begin{pmatrix} 1 \\ \cos[\Gamma - 8\alpha] - 2\sin^2[\delta/2]\sin[4\alpha]\sin[\Gamma - 4\alpha] - \sin^2[\delta]\cos^2[2\alpha](\cos[\Gamma - 4\alpha] - \cos[\Gamma - 4\alpha_0]) \\ \sin[\Gamma - 8\alpha] + 2\sin^2[\delta/2]\sin[4\alpha]\cos[\Gamma - 4\alpha] - \sin^2[\delta]\cos^2[2\alpha](\sin[\Gamma - 4\alpha] + \sin[\Gamma - 4\alpha_0]) \\ 2\sin[\delta]\cos[2\alpha](\sin[\Gamma - 2\alpha_0] - 2\cos^2[\delta/2]\cos[2\alpha]\sin[\Gamma - 2(\alpha_0 + \alpha)]) \end{pmatrix} \quad (71)$$

Again, an ellipticity term ($S_3$) results, which vanishes when $\delta=0$. Also, the elements $S_1$ and $S_2$ are expressed in separated form as the sum of an ideal term, given by the Stokes vector of Equation 68, and an additive chromatic term. These chromatic terms are written as a sum of two expressions. The first of these is identical in form to the chromatic error due to a single-waveplate tuner. As before, the magnitude of this term increases with tuning. The second term, however, depends upon both the difference angle between the two waveplate optic axes, $\alpha$, and the mean waveplate orientation, $\alpha_o$. Unlike the ideal achromatic case, where the transmission function depends solely upon the difference angle, $\alpha$, there is an explicit dependence of the magnitude of the chromatic error term on the absolute waveplate orientation. Since tuning depends only upon relative angle, this reveals an independent parameter which in principle can be adjusted to minimize chromatic transmission. This parameter, which will soon take on more physical significance subsequently, is the basis for optimization of filter performance. As before, multiplication by the Mueller matrix for the analyzing polarizer yields the intensity transmission function. This is expressed as the sum of the ideal function and a chromatic transmission function, $$T_I(\alpha,\lambda) = \cos^2[\Gamma/2 - 4\alpha], \quad (72)$$

and $$T_E(\alpha,\alpha_0,\lambda) = -\sin^2[\delta/2]\sin[4\alpha]\sin[\Gamma - 4\alpha] + \quad (73)$$

-continued $$-1/2\sin^2[\delta]\cos^2[2\alpha](\cos[\Gamma - 4\alpha] - \cos[\Gamma - 4\alpha_0]).$$

The cancellation of chromatic transmission can be achieved by simply solving for the $\alpha_o$ that minimizes $T_E(\lambda,\alpha_o,\alpha)$, given by, $$\alpha_0(\alpha,\lambda) = \tag{74}$$

$$\Gamma/4 - 1/4\cos^{-1}\left(\cos(\Gamma - 4\alpha) + \frac{\tan[2\alpha]\sin(\Gamma - 4\alpha)}{\cos^2[\delta/2]}\right).$$

For a particular orientation, $\alpha$, this can of course only be satisfied explicitly at a single wavelength. Maximizing the spectral-contrast-ratio mandates that this condition be satisfied for the wavelength of peak transmission and the orthogonally polarized null wavelengths. It is shown subsequently that the optimized peak/null transmission conditions are simultaneously satisfied due to the symmetry of the action of the tuner.

The peak output wavelength is coupled with the waveplate chromaticity, precluding a closed-form solution for $\alpha_o(\lambda_M)$. A great deal of insight can be obtained however by ignoring the loss in rotary efficiency and satisfying the minimum chromatic transmission condition at the ideal peak output wavelength. From Equation 72, the peak output wavelength occurs for $\Gamma=(2\pi m+8\alpha)$, while that for the null wavelengths is $\Gamma=(2\pi m\pm\pi+8\alpha)$. Substituting the former expression into Equation 73 produces the following, $$T_E(\alpha,\alpha_0,\alpha) = -\sin^2[\delta/2]\sin^2[4\alpha] - \tag{75}$$

$$1/2\sin^2[\delta]\cos^2[2\alpha]\{\cos[4\alpha] - \cos[8\alpha - 4\alpha_0]\}$$

where proper selection of $\alpha_o$ allows the two chromatic terms to contribute with opposite sign. Taking $\alpha_o=(-2\alpha+n\pi/2)$ with, $n=(0,1,\ldots)$ produces, $$T_E(\alpha) = -\sin^4[\delta(\lambda_M)/2]\sin^2[4\alpha]. \tag{76}$$

where $\lambda_M$ is the ideal peak output wavelength given by Equation 72. This shows that proper selection of $\alpha_o$ produces a chromatic error term which is (to lowest order) $4^{th}$ order in $\delta/2$ at the peak output wavelength. This can be compared to the single-waveplate tuner, which exhibits a second order dependence on $\delta/2$. If the coupled equations were solved exactly, the chromatic error would theoretically be nulled at the peak wavelength so that $\alpha_o=(2\alpha+n\pi/2)$. Due to the symmetric transformations of the waveplates, ellipticity induced by the first waveplate is nearly cancelled by the second waveplate. Satisfying this condition for all outputs throughout an FSR requires active CSLC retarders with a range of tilt angle that is presently not available. However, this result illustrates that the performance of a dual-waveplate tuner with a non-zero $\alpha_o$ can exceed a tuner which is symmetrically switched about a fixed $\alpha_o$. Substituting the orientation $\alpha_o=(2\alpha+n\pi/2)$ into Equation 73 gives the general chromatic transmission function.

While it is necessary to maximize transmission at the peak output wavelength, filter performance depends more critically on transmission at null wavelengths. Certainly this is the case when the SCR is the characteristic figure-of-merit. However, the symmetry of waveplate operations on the input polarization produces simultaneous cancellation of chromaticity at peak and null wavelengths. The result is a transmission at null wavelengths of, $$T_E(\lambda_N,\alpha)=\sin^2[4\alpha]\sin^4[\delta(\lambda_N)/2] \tag{77}$$

where $\lambda_N$ represents the null wavelengths given by the ideal transmission function.

While the optimization based on peak/null wavelengths produces optimal SCR, it also minimizes chromatic error throughout the spectrum. This can be verified by choosing $\alpha_o$ to minimize the integrated absolute chromatic error throughout the spectrum. Mathematically, the minimum value of the following integral is computed for each $\alpha$, $$T_S(\alpha) = \left|\int_{FSR} T_E(\lambda,\alpha,\alpha_0)d\lambda\right|_{\alpha_0} \tag{78}$$

where $T_S(\alpha)$ is the chromatic transmission integrated over the filter FSR, for a particular $\alpha_o$. Results agree well with the optimum $\alpha_o$ predicted for minimum chromatic error at the peak wavelength.

The conditions for optimum chromaticity rejection at the peak/null output wavelength were determined above. This led to unrealizable tilt angles for a CSLC implementation, but gave insight as to the switching arrangement that the design should closely approximate. Three CSLC device filter stage designs are now presented which compensate for chromaticity effects. Two dual-CSLC device tuner designs requiring either a combination of two $\pi/8$ tilt SmA* cells or a combination of $\pi/8$ tilt SmA* and SmC* cells are provided. A third design, requiring two $\pi/16$ tilt SmA* cells and a $\pi/8$ tilt SmC* cell is also provided.

The availability of SmA* materials having $\pi/8$ tilt allows the realization of a dual-CSLC device tuner which is tunable throughout an FSR. Two designs employing $\pi/8$ tilt CSLC cells are analyzed. A comparison of a filter stage design which uses a dual-CSLC device symmetric tuner (o =constant), and a dual-CSLC device asymmetric tuner ($\alpha_o=F(\alpha)$) is given. The former design requires two $\pi/8$ tilt SmA* cells with equal and opposite tilt (or two identical cells electronically configured so that their optic axis rotate in opposite directions), while the latter requires a combination of a SmC* cell with a SmA* cell. For increase tuning speed, the SmC* cell can be replaced by a SmA* cell operated in a binary discrete-state mode.

Figure 9:
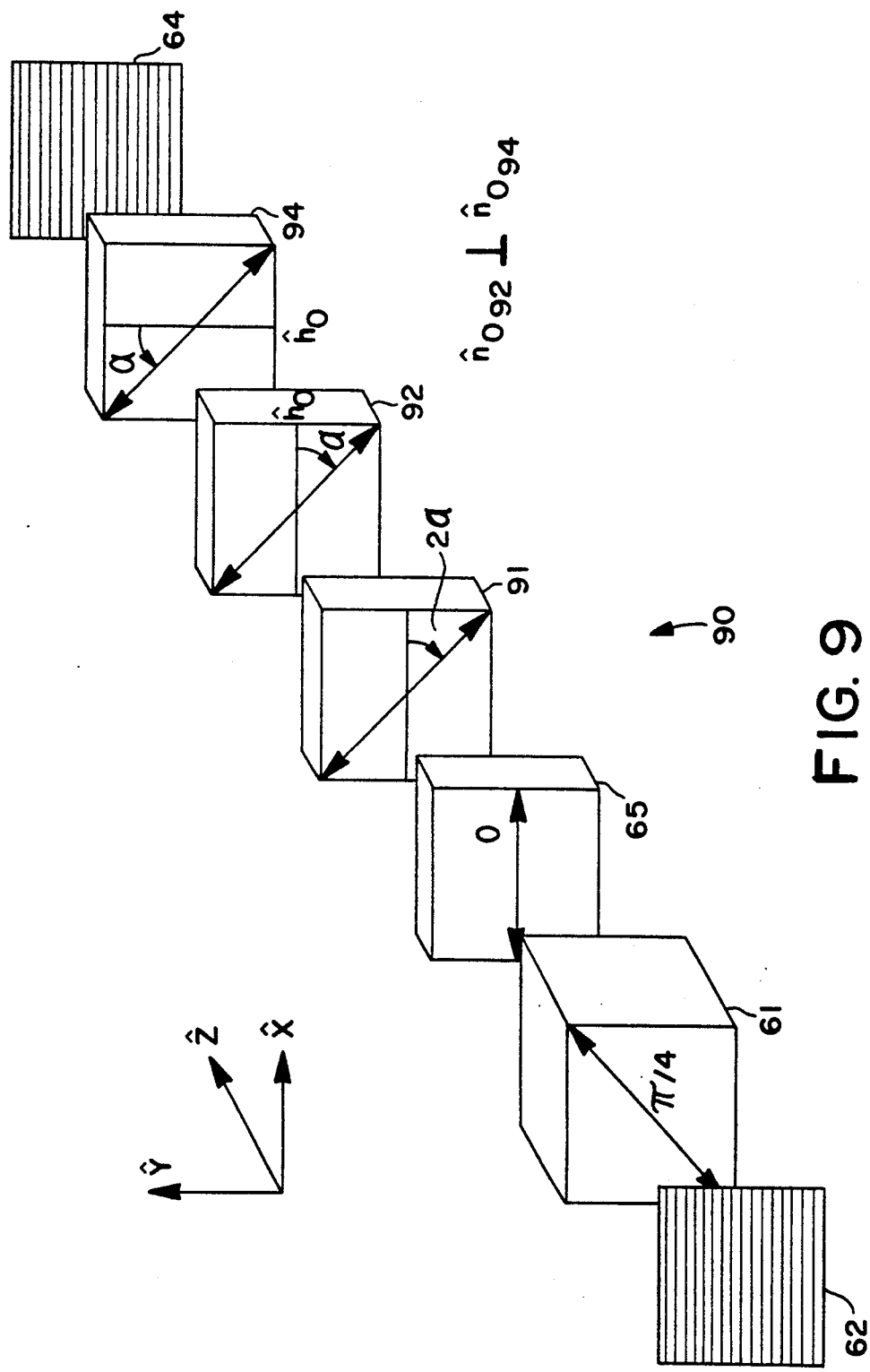
FIG. 9 is a schematic diagram of a stage of an improved continuously tunable filter of this invention.

FIG. 9 is a schematic diagram of an optimized stage of a dual CSLC device continuously tunable filter. The stage 90 birefringent element 61 oriented at 45° ($\pi/4$) to the plane of polarization of the input light. The birefringent element can be passive or active if so desired. An achromatic quarter-waveplate 65 is positioned between the birefringent element and a series of CSLC half-waveplates 92 and 94 and optionally 91. The optic axis of the quarter-waveplate is shown at 0° to the input polarization, but can also be oriented at 90° to the input polarization. The polarizers 62 and 64 are shown in one preferred relative orientation parallel but can they also be perpendicular.

Elements 92 and 94 are cascaded analog CSLCs cells, i.e., SmA* liquid crystal cells. As shown, the zero-field orientation of the optic axis ($\hat{n}_o$ of the two cells are perpendicular, i.e., the cells have crossed optic axes.

Further, the optic axes of the analog CSLC cells rotate in opposite directions. An optional element in the stage is a discretely state CSLC cell 91. This element can be between the quarter wave-plate and the series of analog CSLC cells as shown or positioned after the analog CSLC cells before the polarizers.

For optimum performance of the filter, it is necessary that the tuner shift the peak output wavelength through a band centered at the CSLC half-wave retardation wavelength. The birefringent element is selected to provide m full-waves of retardation at this design wavelength. The FSR determined by this order must be selected such that it lies within the achromatic bandwidth of the tuner. This condition depends upon the required performance over the tuning band for the particular tuner. These considerations require that the design wavelength be transmitted in the absence of tuning. Two relative waveplate orientations yield peak transmission at the design wavelength (ideally); parallel, and; crossed optic axes. For these two cases, the transmission function can be written, respectively, as, $$T_P(\alpha,\lambda) = \cos^2[\Gamma/2 - 4\alpha] - \sin^2[\delta/2]\sin[4\alpha]\sin[\Gamma - 4\alpha] + \\ -1/2\sin^2[\delta]\cos^2[2\alpha](\cos[\Gamma - 4\alpha] - \cos[\Gamma - 4\alpha_0]), \quad (79)$$

and $$T_C(\alpha,\lambda) = \cos^2[\Gamma/2 - 4\alpha] - \sin^2[\delta/2]\sin[4\alpha]\sin[\Gamma - 4\alpha] + \\ +1/2\sin^2[\delta]\sin^2[2\alpha](\cos[\Gamma - 4\alpha] + \cos[\Gamma - 4\alpha_0]), \quad (80)$$

where the parallel waveplate transmission function is obtained using, $$\alpha_1 = \alpha_0 + \alpha \\ \alpha_2 = \alpha_0 - \alpha, \quad (81)$$

and the crossed waveplate transmission function is obtained using, $$\alpha_1 = \alpha_0 + \pi/4 + \alpha \\ \alpha_2 = \alpha_0 - \pi/4 - \alpha. \quad (82)$$

By comparing these equations, it is evident that only the crossed waveplate case in general results in the ideal transmission function for $\alpha=0$. This is due to the fact that two identical retarders with axes crossed appear isotropic, while a waveplate with retardation $2(\pi+\delta)$ results with parallel waveplates. The crossed waveplate transmission has a reduced chromatic transmission with small $\alpha$. Using the crossed waveplate transmission function, the condition for maximum rejection of chromatic error at the peak/null wavelengths is again, $\alpha_0 = -2\alpha + n\pi/4$.

In the case where the tuner consists of two identical $\pi/8$ tilt angle SmA* cells with equal voltage amplitude, is static, and must therefore be selected to provide the best performance over the tuning band. The wavelengths which are polarized orthogonal to the design wavelength before entering the tuner are the furthest removed from the half-wave condition. Consequently, the greatest compensation for chromaticity is required at these wavelengths. Furthermore, the largest polarization rotation is required in order to select these wavelengths, which further compounds chromatic effects. Since the filter performs ideally for crossed waveplates at the design wavelength $\alpha=0$, it is reasonable to force the filter to perform ideally at the extreme tilt condition, $\alpha=\pm\pi/8$. Using this condition, the resulting static orientation is $\alpha_0=\pm\pi/4$. Substituting this condition into the above orientation equations gives the tuning scheme for a dual-CSLC device static $\alpha_0$ tuner, $$\alpha_1 = \pi/2 + \alpha \\ \alpha_2 = -\alpha . \quad (83)$$

This design forces ideal peak/null transmission at three wavelengths, the design wavelength and the wavelengths at ±FSR/2. This scheme maximizes SCR throughout the tuning bandwidth for the case of a dual-CSLC device tuner, symmetrically switched ($\alpha_0=0$) with crossed smectic layer normals.

The results of the static $\alpha_0$ design show that optimum performance occurs with crossed smectic layer normals which are parallel and perpendicular to the input polarization, with opposing director tilts. The benefit of crossing the waveplates is seen clearly on the Poincare' sphere, where the transformations by the tuning elements occur with opposite handedness. The second element subtracts ellipticity induced by the first element, while simultaneously doubling the polarization rotation.

The ideal condition for chromatic rejection requires an asymmetric tuning of the elements. That is, $\alpha_0$ is a dynamic function of $\alpha$. While the exact function cannot be achieved with currently available materials, an approximation to this tuning scheme is realizable. The tuner consists of a $\pi/8$ tilt SmA* cell and a binary $\pi/8$ tilt SmC* cell. By proper selection of the orientations, an approximation to the ideal $\alpha_0$ is achieved. Using the crossed waveplate transmission function, the orientations of the optic axes are given by, $$\alpha_1 = \pi/2 + \alpha \\ \alpha_2 = \pm\pi/8 . \quad (84)$$

Using these orientations an FSR of tuning is again achieved, but with improved performance over the symmetric tuner.

Figure 10:
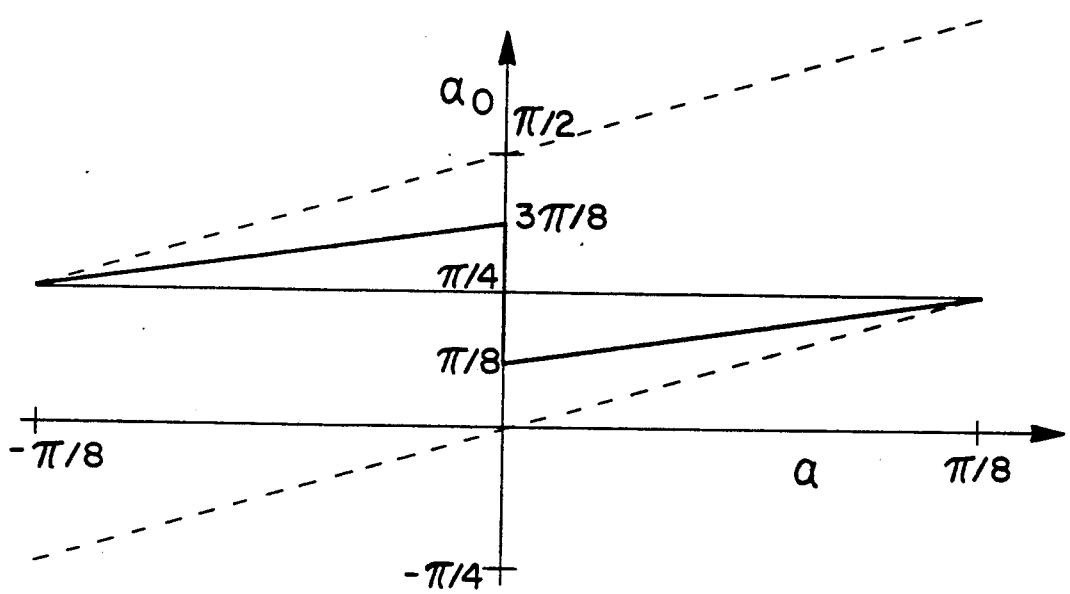
FIG. 10 is a graph illustrating the relations for $\alpha_0(\alpha)$ for three dual-element tuners. The dashed lines are the ideal orientations, the solid line corresponds to the SmC*/SmA* tuner, and the line $\alpha = \pi/4$ is the symmetric SmA* tuner.

A computer model was developed for three cases of a dual-CSLC tuner; (1) Ideal dynamic $\alpha_0(=2\alpha+n\pi/2)$; (2) Static $\alpha_0(=\pm\pi/4)$ and; (3) SmA*/SmC* dynamic $\alpha^0$. FIG. 10 shows the relationship between $\alpha_0$ and $\alpha$ for each of these tuning schemes. The dashed line represent 60 $_0(\alpha)$ for the ideal scheme given by (1). The solid line with orientation $\pi/4$ is the ideal static $\alpha_0$ scheme given by (2). Finally, the dark line gives $\alpha_0(\alpha)$ for the tuner requiring a binary and analog device.

Figure 11:
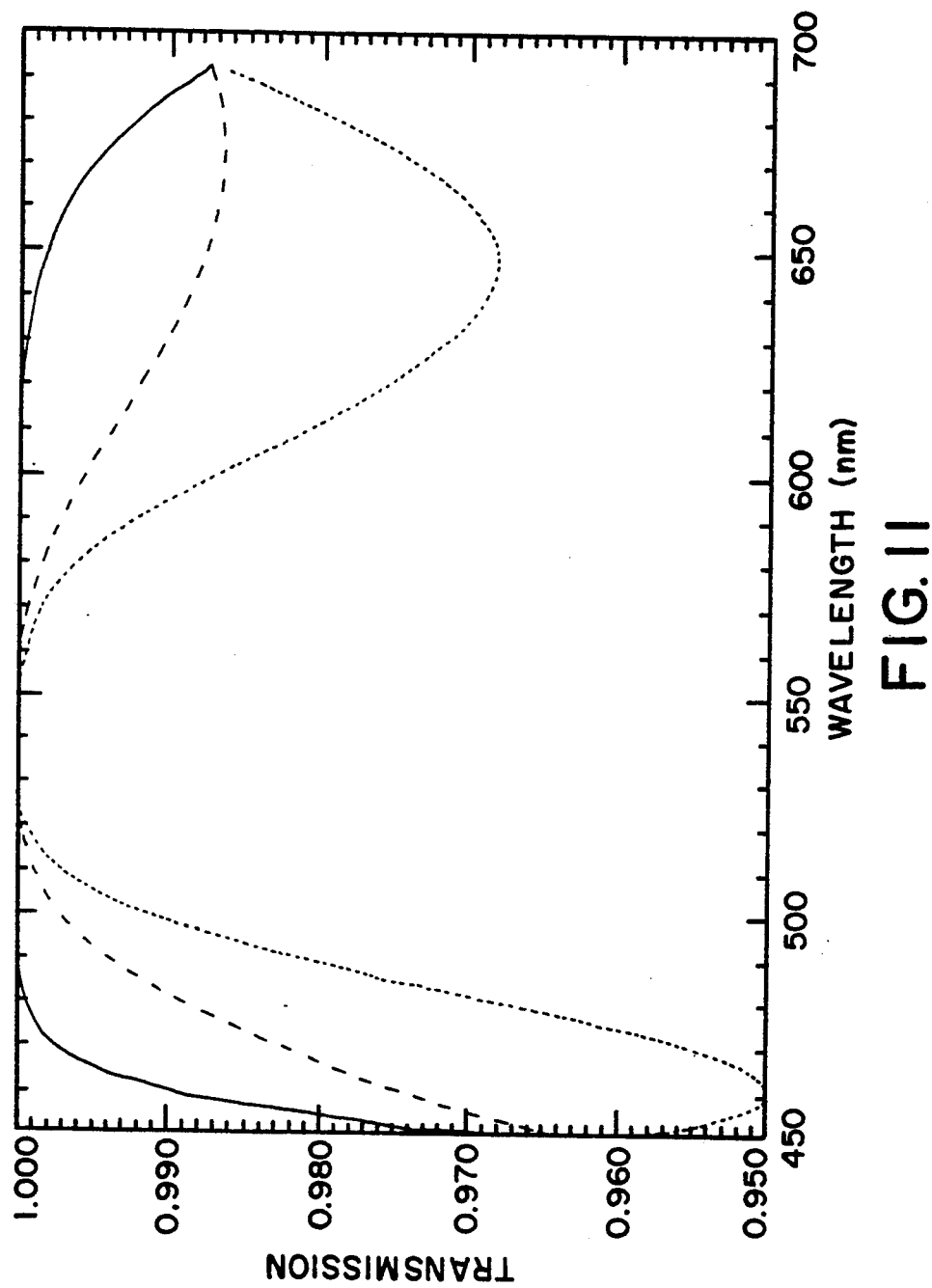
FIG. 11 is a graph illustrating theoretical peak transmission throughout an FSR of tuning for three dual-element tuners. The solid line is the ideal tuner, the dashed line is the SmA*/SmC* tuner and the dotted line is the symmetric SmA* tuner.
Figure 12:
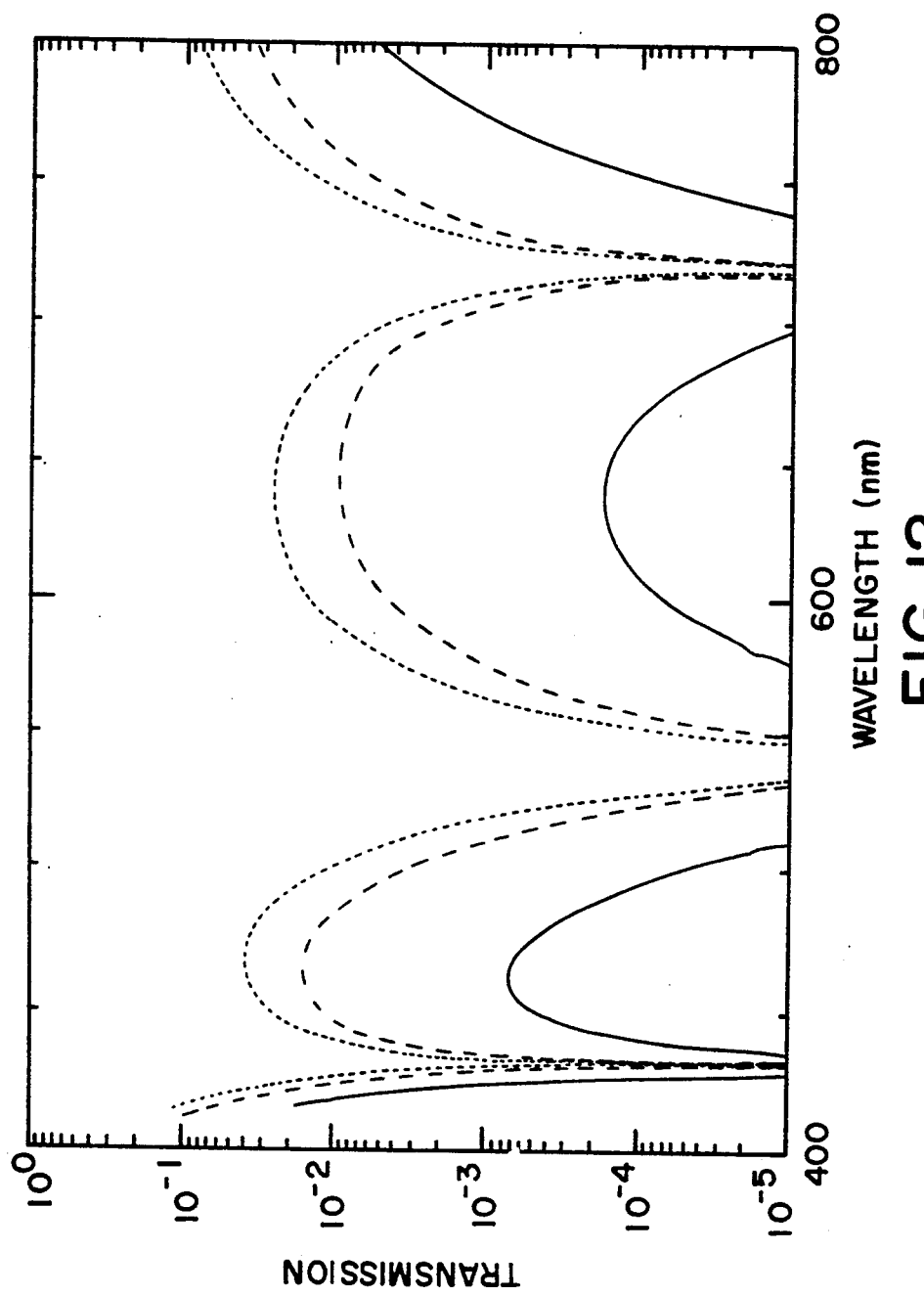
FIG. 12 is a graph illustrating theoretical null transmission throughout an FSR of tuning on a log scale for three dual-element tuner designs. The solid line is the ideal tuner, the dashed line is the SmA*/SmC* tuner and the dotted line is the symmetric SmA* tuner.

The birefringent element here, as in the previous single-element tuner example, provides two full-waves of retardation at the CSLC half-wave retardation, taken to be 540 nm. Neglecting dispersion of the birefringent element, this gives null wavelengths at 432 nm and 720 nm (±FSR/2), or an FSR of 288 nm. As before, the model neglects passive losses, such that a loss in peak transmission represents that due only to polarization effects. FIG. 11 shows the peak transmission throughout an FSR of tuning for each of the three examples. The ideal case gives nearly lossless transmission throughout the band 450–700 nm (solid line), with greater than 95% peak transmission throughout than an FSR. The SmA*/SmC* tuner provides slightly reduced transmission, while the 95% tuning bandwidth is also larger than an FSR. The static $\alpha_0$ case has transmission dips at 460 nm and 650 nm as large as 5% (dotted line). However, due to the selection of $\alpha_o$, the transmission is forced to be ideal at the extreme wavelengths Consequently, there is no significant reduction in tuning bandwidth. In general, the three designs result in high peak transmission throughout an FSR of tuning. The effect of chromaticity compensation can best be illustrated by comparison with the results of the single chromatic tuner. The 90% tuning bandwidth for the case (2) tuning scheme is greater than 300 nm, as opposed to 175 nm for the single-element chromatic tuner. However the most significant impact of the tuning scheme occurs in the performance of the null transmission. FIG. 12 shows the null transmission for each of the tuning schemes with an FSR of tuning. The ideal case produces null transmission below 0.08% throughout the tuning band, giving a mean SCR greater than 1000:1. The CSLC designs produce more than an order of magnitude increase in null transmission over the ideal case. However, the SmA*/SmC* tuner produces a significant improvement over the symmetric tuner. The former produces null transmission below 1.6% throughout the tuning band, while the symmetric case produces null transmission as high as 4%.

Optimum broad-band tunability of a Lyot filter using rotatable chromatic elements requires two active elements per stage. This result is based on several design considerations, including chromaticity compensation (effective tuning bandwidth), reasonable tilt requirements, and practical considerations such as overall transmission, size, and design complexity. Due to the first of these considerations, broadband tuning requires two elements, even if $\pi/4$ tilt electroclinic materials are available. Currently, an FSR of tunability actually requires greater than two CSLC elements, due to a limited range of SmA* tilt. Thus, the optimum design presently is one which achieves an FSR of analog tuning with a minimum number of active elements. Limiting the number of elements impacts the filter performance in several ways. The requirement for a large number of elements increases the physical filter length, which reduces the field of view and peak transmission. The reproducibility is also degraded with increased number of independently controlled analog devices. Reproducibility with the SmA*/SmC* tuner, for example, is superior to that with the dual-SmA* tuner due to the presence of a binary device in the former tuner.

While SmA* materials may exhibit higher tilt, materials having tilts of $\pi/16$ are readily available. In a cascaded SmA* tuner design with alternating tilt angle, a minimum of four SmA* devices with $\pi/16$ tilt angle are required for full tuning. A simplification can be made by noting that an analog FSR of tuning can be accomplished in discrete scans of FSR/2, much the same as the SmA*/SmC* tuner. Using a $\pi/8$ tilt SmC* device with two $\pi/16$ tilt SmA* devices produces this tuning scheme. With the SmC* in an unswitched state, the SmA* devices analog rotate the polarization through FSR/2. The SmA*'s are then reset and the SmC* is switched. Switching the SmC* device reflects the polarization, allowing the SmA's to scan the remaining FSR/2.

Given the present limitations in range of tilts available with SmA* devices, freedom of optimization is limited in the three-CSLC device tuner design. The task of maximizing the tuning band is based on proper selection of the smectic layer normal orientation of each element. From a practical standpoint, the SmA* devices should be mounted in the same housing. This allows a single analog voltage and temperature control line for each stage. It also facilitates accurate relative alignment of the SmA* devices. There are therefore two possible arrangements of the tuner: SmC* preceding the analog devices and SmC* following the analog devices. Both of these arrangements are explored.

The general output transmission function for a three-CSLC device tuner is derived using Jones calculus. This can be written in separated form as, $$T(\lambda,\alpha) = T_I(\lambda,\alpha) + T_E(\lambda,\alpha) \tag{85}$$

where $$T_I(\lambda,\alpha) = \cos^2[\Gamma/2 - 2(\alpha_3 - \alpha_2 + \alpha_1)] \tag{86}$$

and, $$T_E(\lambda,\alpha) = -\sin^2[\delta/2]\sin[2(\alpha_3 - \alpha_2 + \alpha_1)]\sin[\Gamma - \tag{87}$$

$$2(\alpha_3 - \alpha_2 + \alpha_1)] + -2\sin^2[\delta]\cos[\alpha_2 - \alpha_1]\cos[\alpha_3 - \alpha_2] +$$

$$4\sin^2[\delta]\cos^2[\alpha_2 - \alpha_1]\cos^2[\alpha_3 - \alpha_2](\sin^2[\delta/2]\cos^2[\Gamma/2 -$$

$$(\alpha_3 + \alpha_1)] + \cos^2[\delta/2]\cos^2[\Gamma/2 + (\alpha_3 - \alpha_1)])$$

In the case of a dual-CSLC device tuner, the optimization is based on a single parameter, $\alpha_o$, which allows a mathematical solution by examination of the chromatic transmission function. The additional degree of freedom associated with the three-CSLC device tuner clearly results in a more complicated transmission function and optimization scheme. Therefore, optimization is based on the observation that resulted from the dual-CSLC device tuner analysis: optimum filter performance occurs with modulation about the crossed waveplate orientation and, static $\alpha_o$ results showed that minimum chromatic transmission at maximum tuning requires that the smectic layer normals be oriented either parallel or perpendicular to the input polarization. In other words, the director orientations of the two devices (with static $\alpha_o$) are modulated with opposite sign about 0 and $\pi/2$, or vice versa. There are three terms that contribute to the above chromatic transmission function. The first of these is similar in form to an expression resulting with single and dual-element tuners. As before, this term is zero with the untuned transmission function and increases in magnitude with tuning. The remaining two terms are proportional to cosines of difference angles in the waveplate orientations. The latter fact is in agreement with the first of the above conditions. By crossing the axes of adjacent elements, these expressions become proportional to sines, rather than cosines of difference angles. Conversely, a series of transformations for near parallel waveplates, tends to increase the chromatic transmission, further degrading the tuning bandwidth with the number of devices.

Figure 13A:
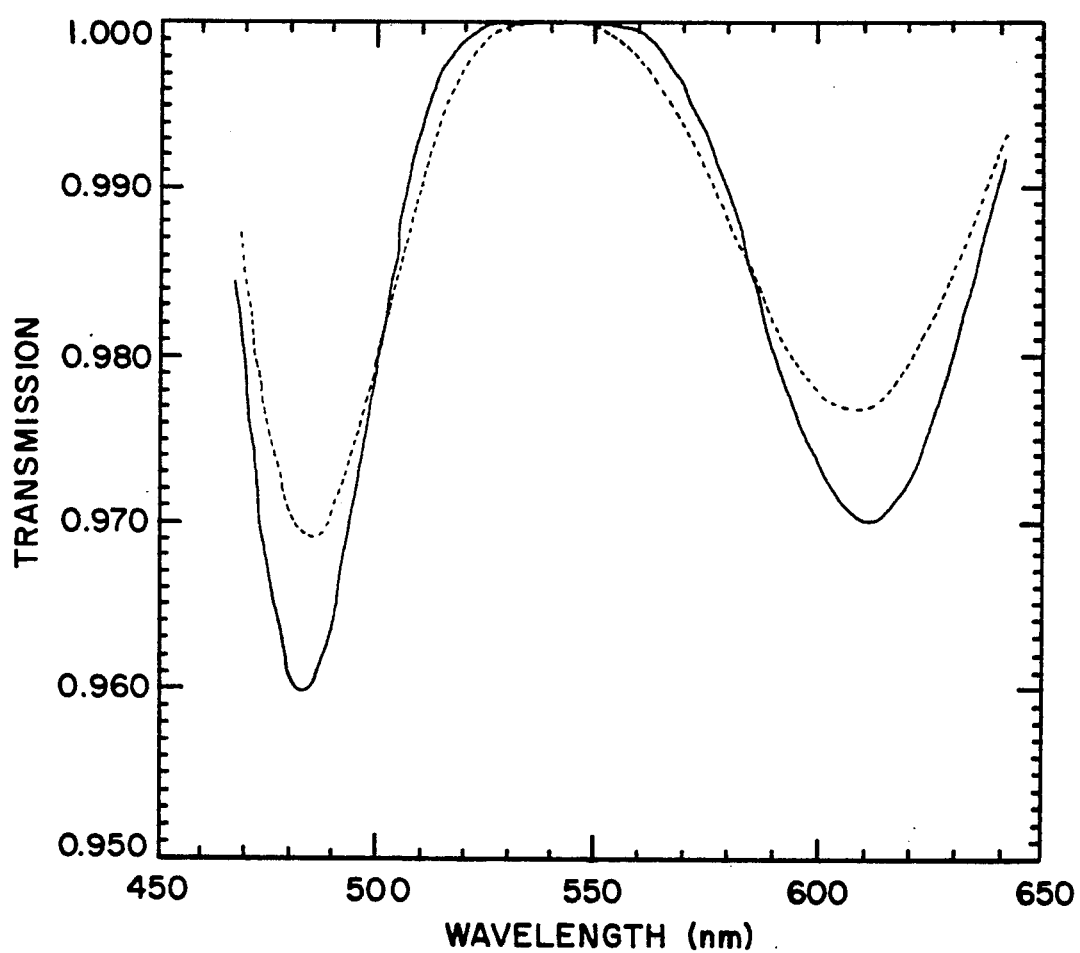
FIG. 13(a and b) are theoretical transmission curves for the three-CSLC tuner for tuning through an FSR. View "a" is the theoretical peak transmission and view "b" is the theoretical null transmission. In both views, the dotted curve is for the SmC* device positioned behind the two SmA* devices and the solid line is for the SmC* device positioned in front of the two SmA* devices.
Figure 13B:
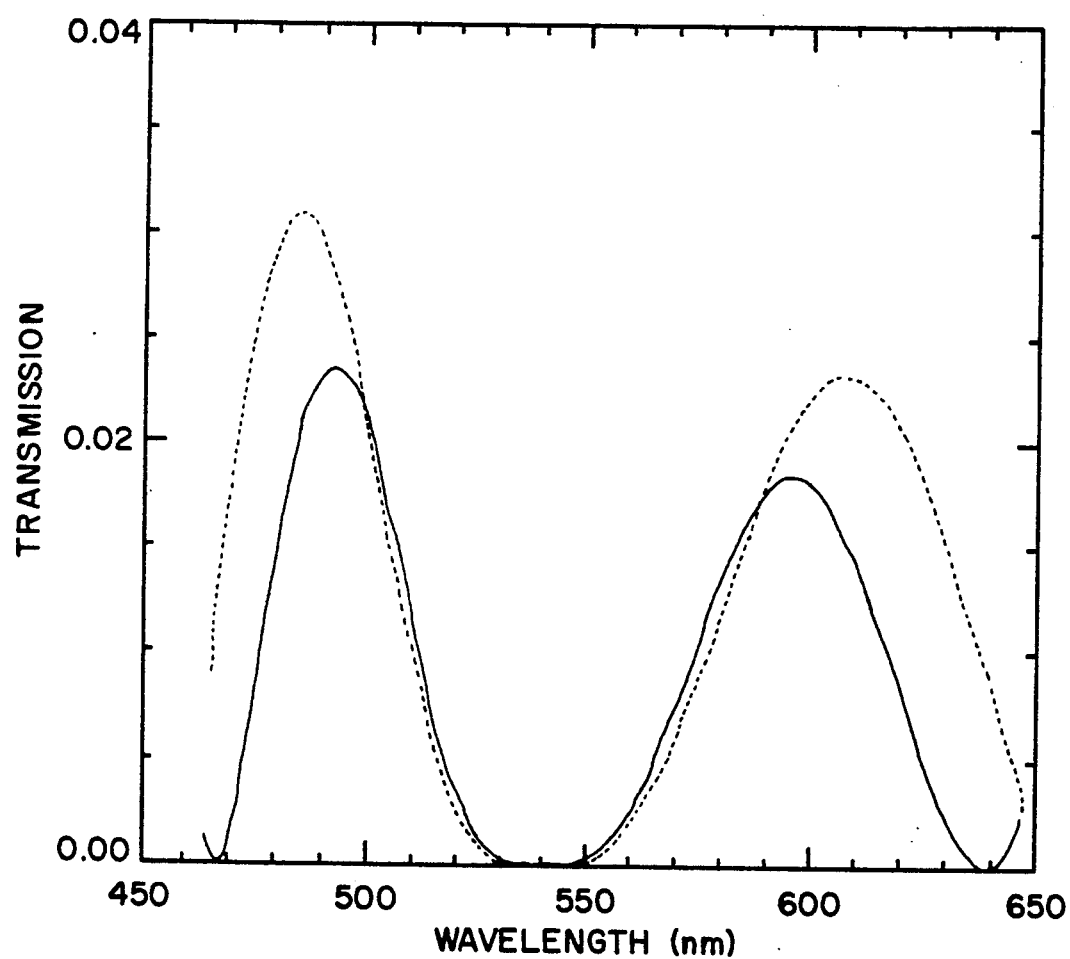
Figure 14A:
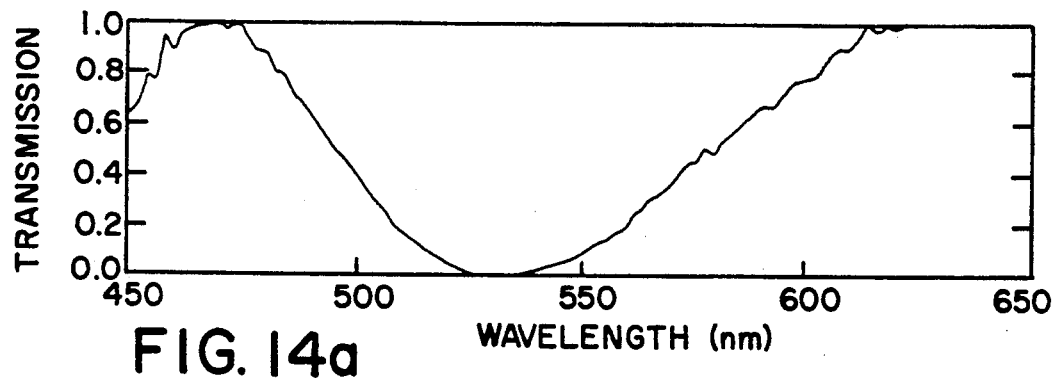
FIG. 14(a-h), view a-d are experimental transmission spectra for a single-stage filter having a three CSLC device tuner (a SmC* FLC and two cascaded SmA* LC cells). The spectra of views a-d were taken with the SmC* FLC in the unswitched state and the spectra of views e-h were taken with the SmC* FLC in the switched state.
Figure 14B:
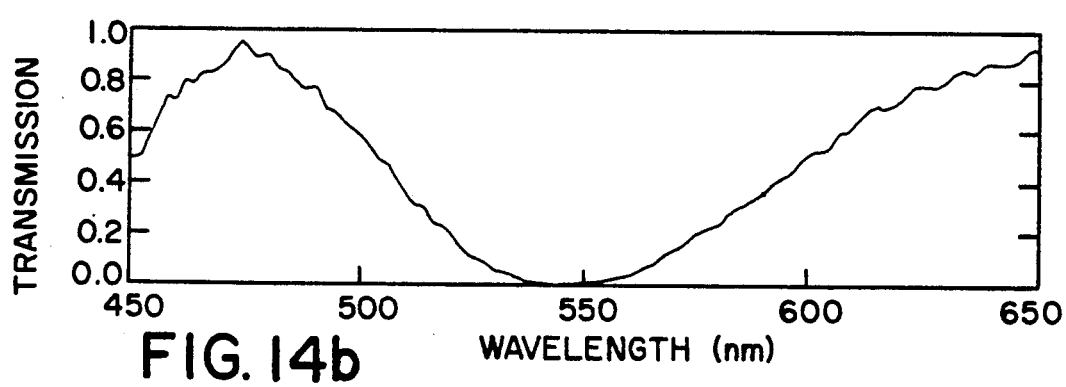
Figure 14C:
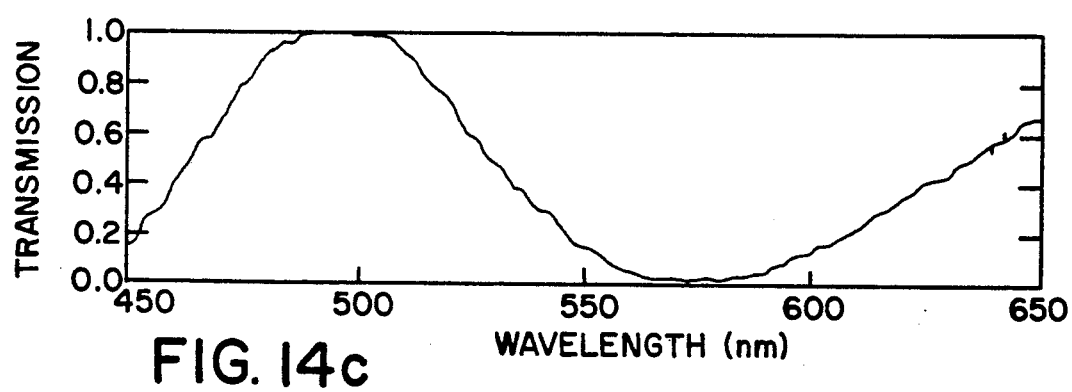
Figure 14D:
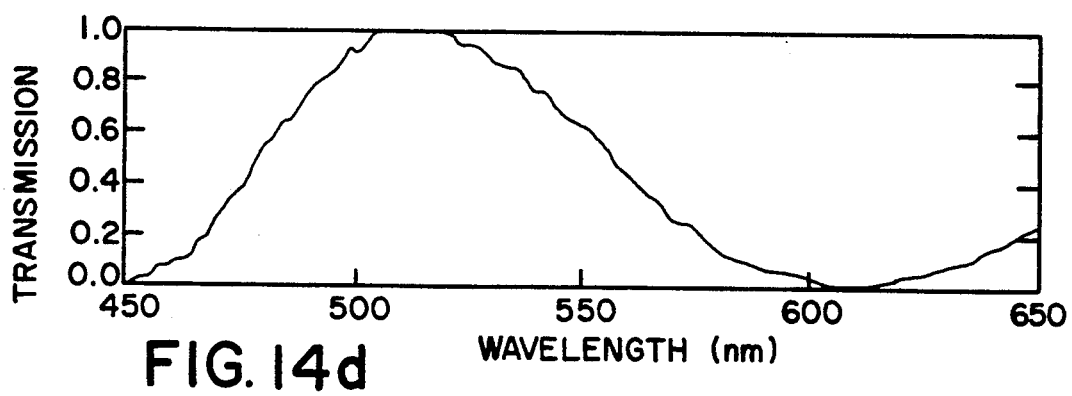
Figure 14E:
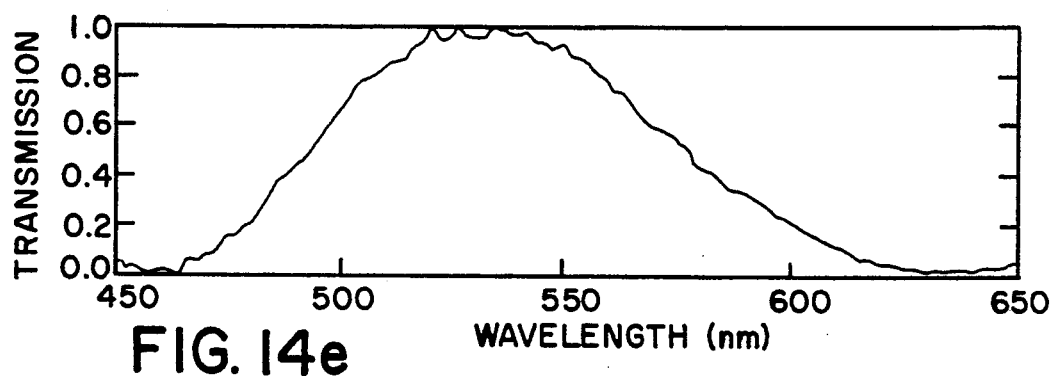
Figure 14F:
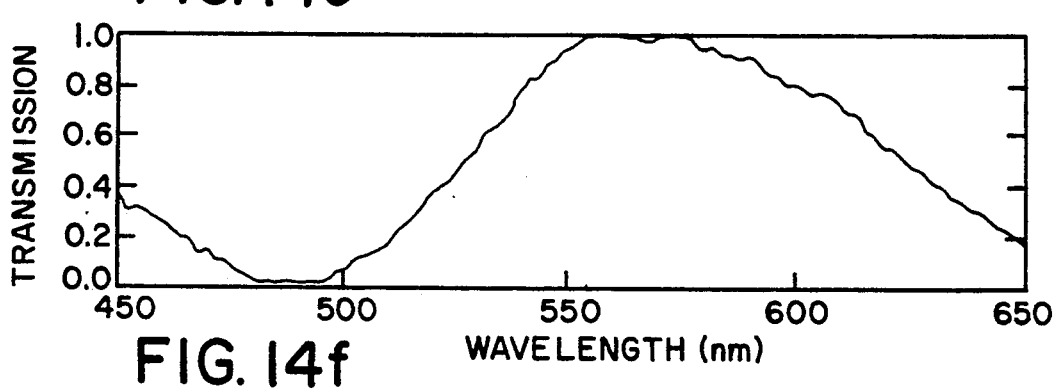
Figure 14G:
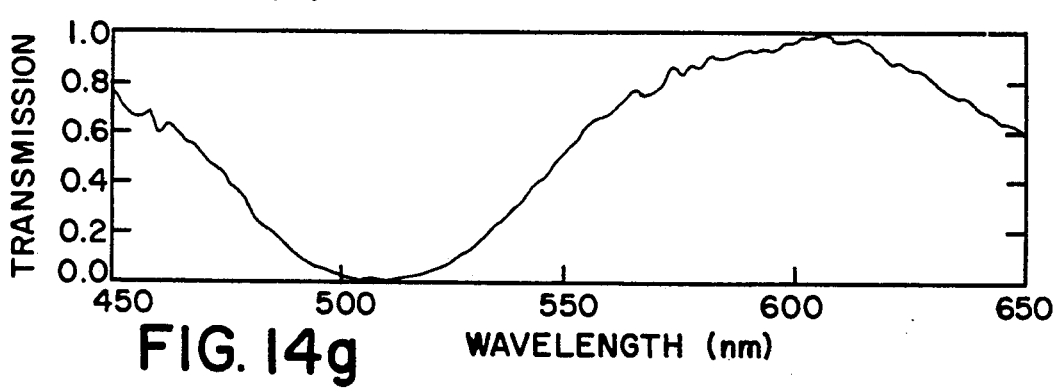
Figure 14H:
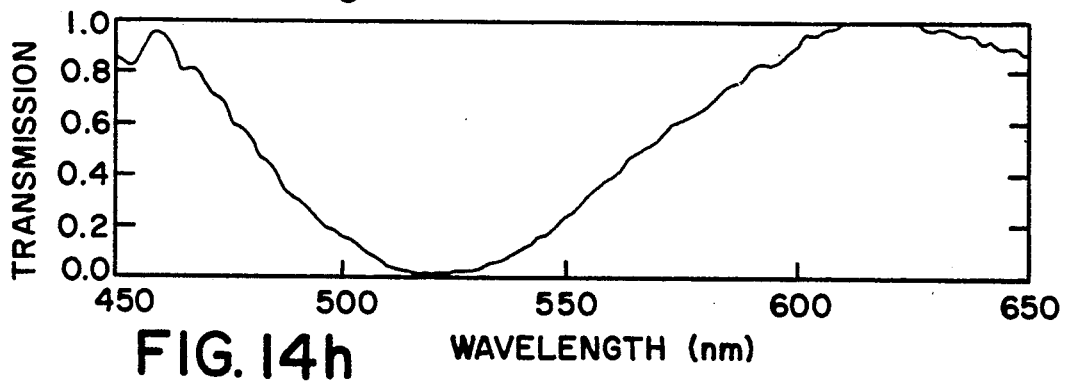

Based on these arguments, two designs are analyzed using the above transmission function. FIGS. 13a and 13b show the peak/null transmission throughout an FSR of tuning for a single-stage filter tuned with three CSLC devices. The filter stage contains a three-wave retarder at design wavelength 540 nm. FIG. 13a shows the theoretical peak transmission wavelength for a SmC* device proceeding the two SmA* devices (solid line), and the SmC* device following the two SmA* devices (dotted line). FIG. 13b shows the corresponding theoretical null transmission throughout the FSR of tuning. The switching scheme corresponding to the solid line curves is given by, $$\alpha_1 = \pm\pi/8 \quad (88)$$
$$\alpha_2 = (\pi/2 + \alpha)$$
$$\alpha_3 = -\alpha$$

where $\alpha=(-\pi/16 \rightarrow \pi/16)$, and the switching scheme for the dotted line curves is given by, $$\alpha_1 = -\alpha \quad (89)$$
$$\alpha_2 = (\pi/2 + \alpha)$$
$$\alpha_3 = \pm\pi/8$$

The best performance in peak transmission occurs for the SmC* following the SmA*'s. The transmission is 1% higher at the largest dip at 485 nm for this case. More significantly, the null transmission is higher throughout the tuning bandwidth for this case. Based on optimization of SCR, the best design for the three-CSLC device tuner is therefore with the SmC* device proceeding the SmA* devices.

A filter stage was experimentally demonstrated using the optimized three-CSLC device tuner design described above. A four stage continuously tunable Lyot filter was also based on this tuning scheme. The four-stage constructed filter tunes continuously from 485 nm to 615 nm, which is an FSR of the low-order stage.

A low-order single-stage filter like that of FIG. 9 was constructed using the three-CSLC device tuner design having a fixed birefringent element which provided 3-waves of retardation at wavelength 535 nm, 2 SmA* SSFLCs and a single SmC* SSFLC. The aim of the implementation was to demonstrate an FSR of tuning, with the SCR predicted by computer modelling. In order to isolate polarization loss from other sources of loss, the transmission spectra are normalized by the spectrum measured with each of the devices oriented along the direction of the polarizers. This assumes that the transmission loss is identical for propagation parallel or perpendicular to the optic axes. Prior to normalization, a background component is subtracted from each of the spectra using crossed polarizers. FIG. 14a-h shows a scan of the filter spectrum through an FSR. With the SmC* unswitched ($-\pi/8$), the filter scans the peak through an FSR/2 through the short-wavelength band (FIG. 14a-d). The SmC* is then switched and the SmA*'s are reset, followed by a scan of the peak through an FSR of the long wavelength band (FIG. 14e-h). This filter had a measured mean SCR greater than 100:1.

The optimized three-CSLC device tuner was used to demonstrate a multiple-stage continuously tunable Lyot filter. The filter was designed for low resolution (10–15 nm), large FSR (ideally 320–680 nm), large aperture (2.5 cm), moderate peak transmission (>5%), very low out-of-band transmission(<0.1% integrated), and rapid tuning (<1 ms scan). A four-stage Lyot filter was constructed which is centered at design wavelength $\lambda_d=540$ nm, with a lowest order stage of m=4. This gives an FSR, neglecting dispersion of 140 nm, which is well within the achromatic bandwidth of the tuner. The complete filter consisted of five HN-42HE polarizers, four birefringent elements with 4,8,16, and 32 waves of retardation at 540 nm, four achromatic quarter-wave retarders, four $\pi/8$ tilt SmC* devices, and eight $\pi/16$ tilt SmA* devices. The breadboard four stage filter fit on a 45 cm Newport Corporation optical rail. The binary voltages applied to the SmC* devices and the analog voltages and temperature control to the SmA* devices were under computer control. The proper voltage combinations to obtain the desired spectrum from each stage, for several filter outputs, was initially obtained. True analog tuning can be obtained by interpolation between each of the 16 spectra analyzed.

Figure 15:
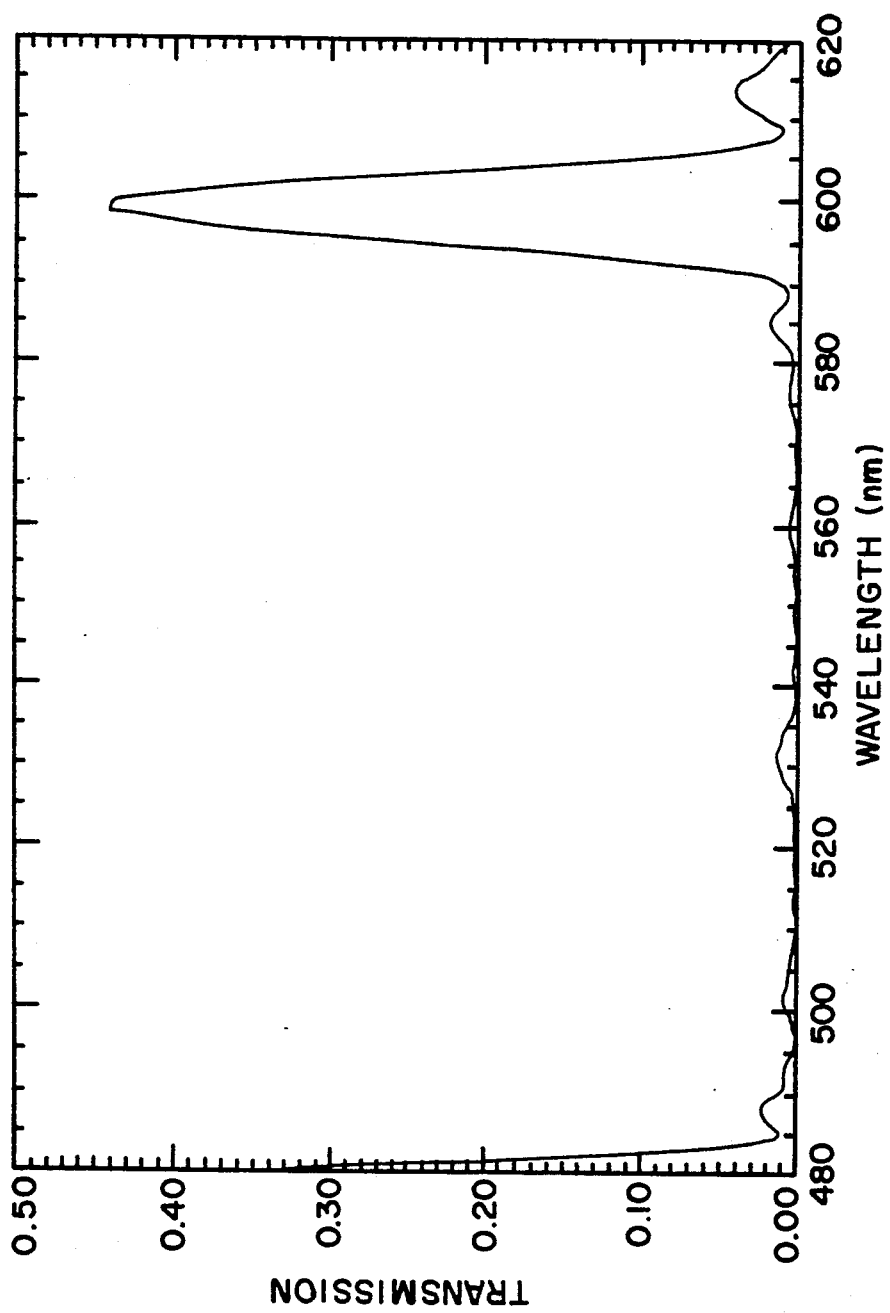
FIG. 15 illustrates a typical output spectrum from a four-stage tunable Lyot-type filter having a three-CSLC cell tuner.
Figure 16A:
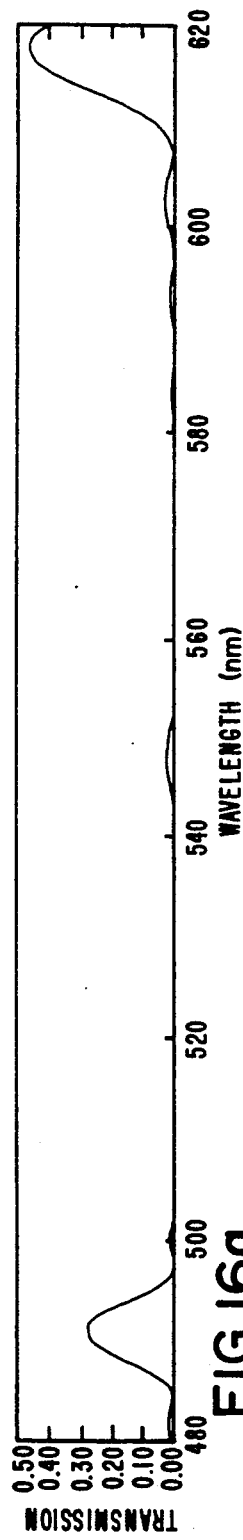
FIG. 16(a-h) is an experimental output from a four-stage tunable Lyot-type filter having a three-CSLC cell tuner scanned through an FSR in steps of twice the FWHM.
Figure 16B:
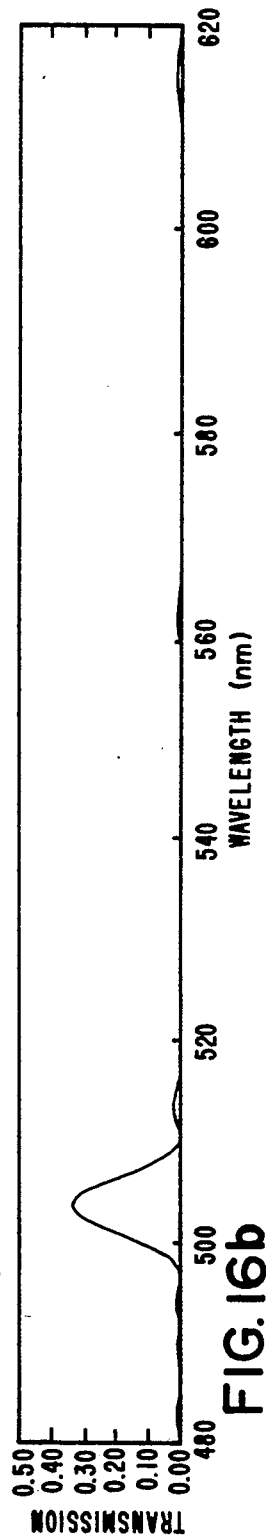
Figure 16C:
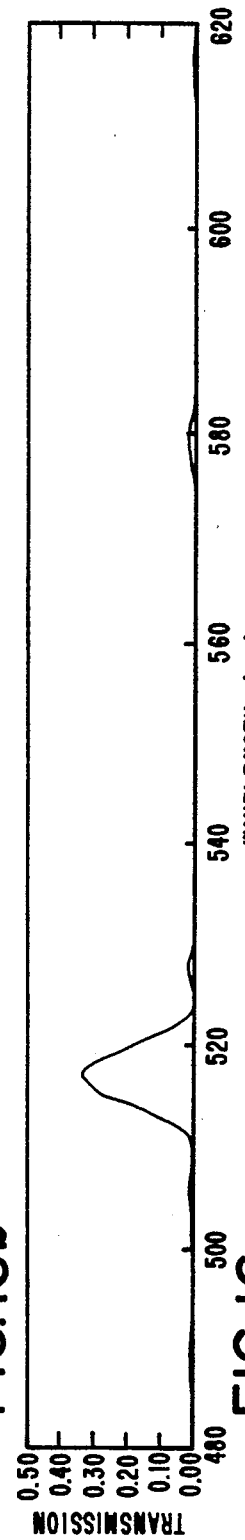
Figure 16D:
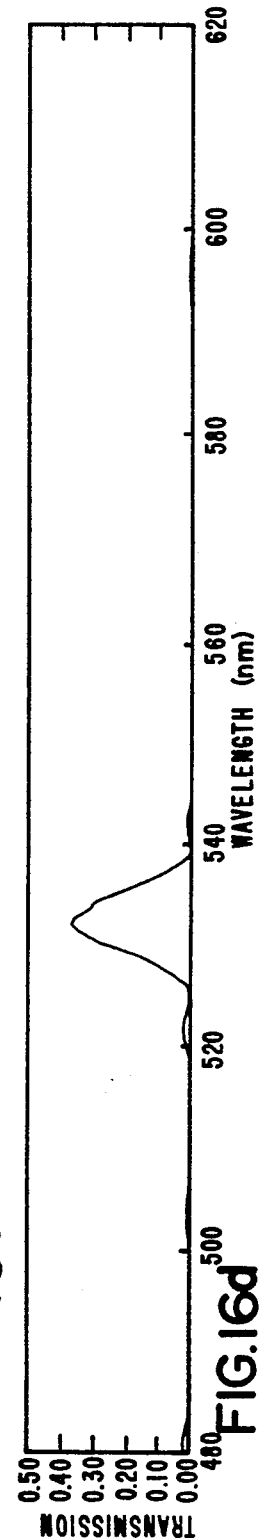
Figure 16E:
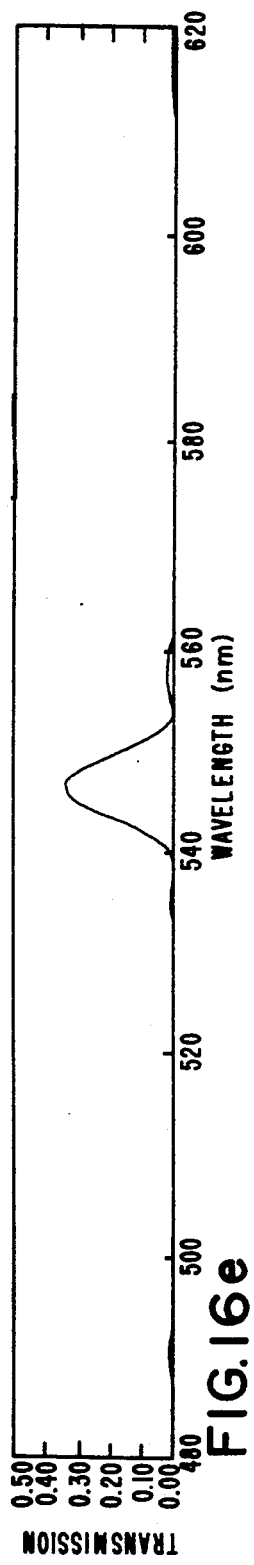
Figure 16F:
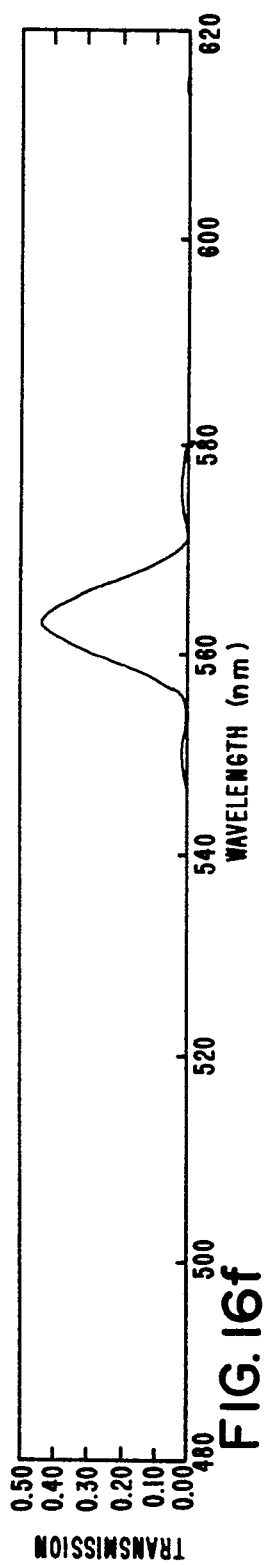
Figure 16G:
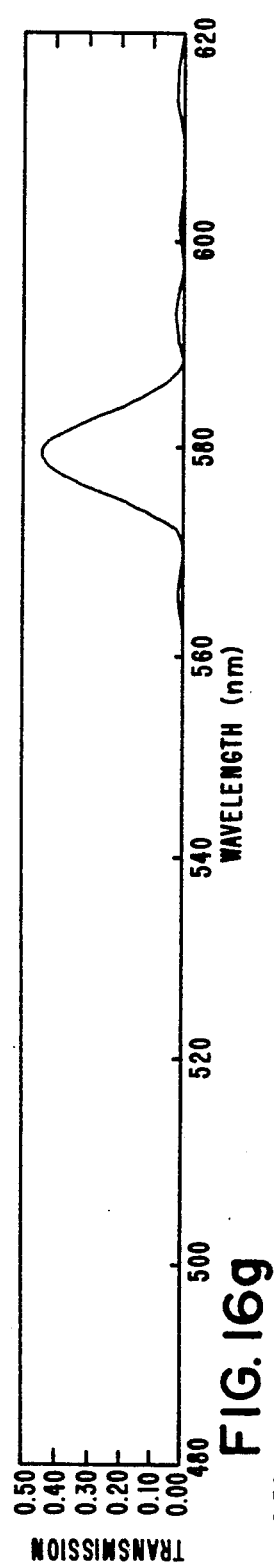
Figure 16H:
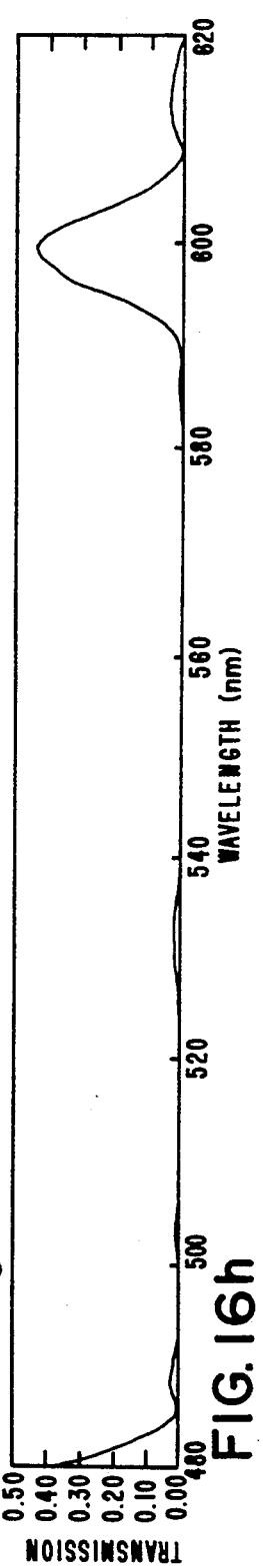
Figure 17:
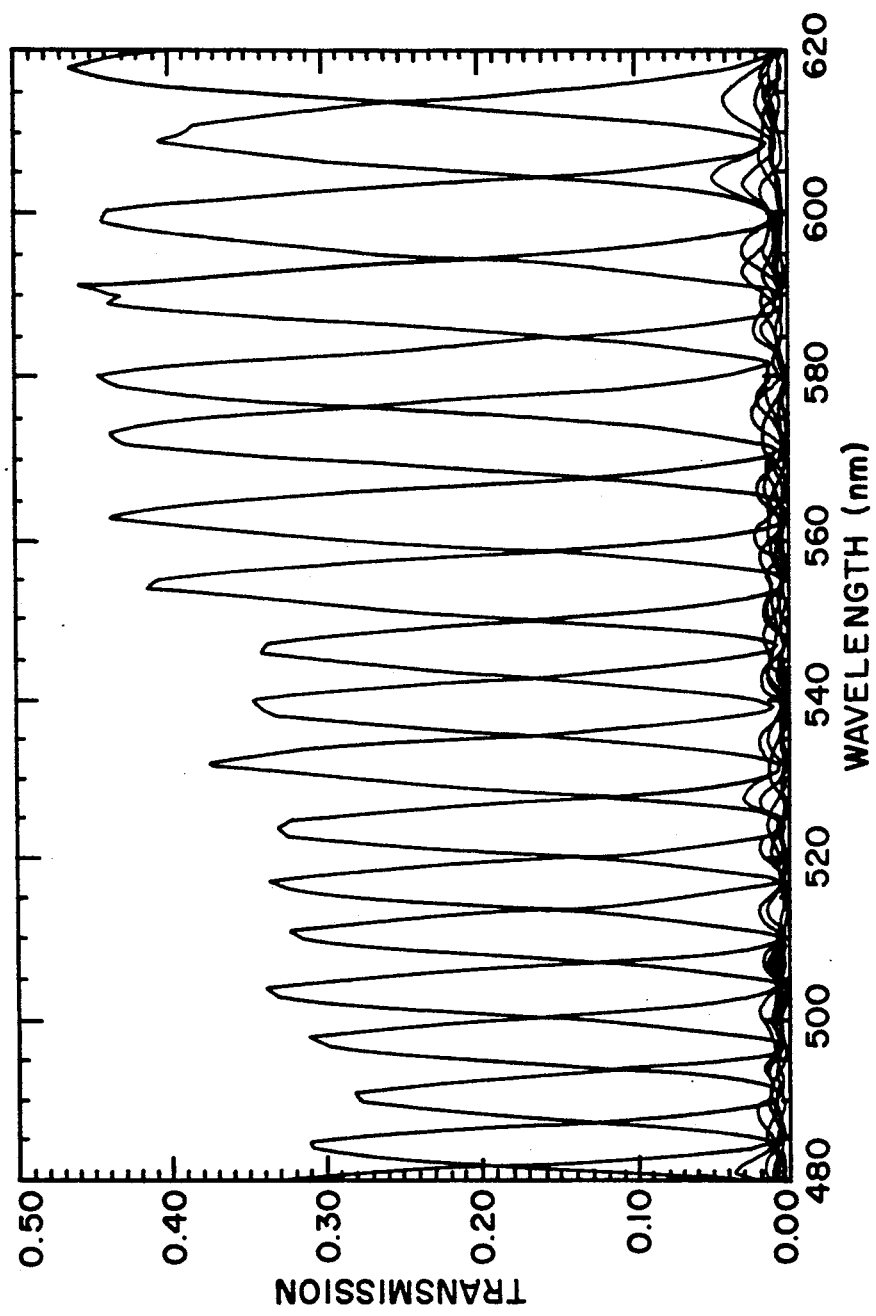
FIG. 17 is an experimental spectrum from the four-stage tunable Lyot filter showing switching in increments of an FWHM.

FIG. 15 shows a single output of the 4-stage Lyot filter at a peak output wavelength 600 nm, detuned from the filter design wavelength by 60 nm. The mean full-width-at-half-maximum (FWHM) in an FSR of tuning is roughly 10 nm. FIG. 16 shows discrete tuning steps through the spectrum in increments of 2FWHM's. The periodicity of the spectrum is indicated in FIG. 16a, which exhibits two transmission maxima. A transmission loss is clearly visible for tuning toward short wavelengths. This is most evident in FIG. 17, which shows output spectra at each FWHM. This loss was attributed to the spectral characteristics of the CSLC transmission, which are very evident after propagation through 12 devices. It was determined that the low contrast interferometric effects of the indium-tin-oxide transparent electrode layers of the CSLC cells were responsible for the loss. The high index of the material, and the particular thickness is sufficient to produce significant losses, particularly when several devices are cascaded. Overall, the filter transmission remained high throughout the tuning band and the optical quality of the spectra produced by the filter were quite good. The short-term stability of the output spectrum was quite good. Experiments to measure long-term thermal drift (on the order of minutes) in director orientation showed that a value <0.1°/°C. was typical. This represents a small fraction of the tilt required for an FSR of tuning, which is 22.5° for a SmA* device. However, very long term application of DC voltages (on the order of hours) was shown to produce a significant drift. This is probably a result of accumulated space-charge due to ionic drift. This problem could be solved by always applying an AC square wave to the SmA* devices, producing DC balancing. This halves the tuning speed of the filter, resulting in better reproducibility and lifetime for the filter.

An important consideration in the optical performance of the filter is the half-wave retardation wavelength of the active elements. In this experimental demonstration, the CSLC retarders were half-wave at 540±5 nm. Computer modelling indicates that a shift in the retardation greater than 10 nm produces a significant loss in SCR.

The filter switching speed was evaluated visually, by observing the time-averaged spectra using the grating spectrometer. A modulation between 8 spectra, coinciding with alignment of spectral nulls of adjacent bands, as shown in FIG. 16, produces a series of bright and dark bands. Modulation between the 8 bands with a 400 μs time constant resulted in no visually perceived degradation in the contrast between peak/null transmission.

We claim:

1. In a tunable optical filter comprising one or more stages optically coupled in sequence wherein a stage comprises an entrance polarizer which determines the polarization of light entering the stage and an exit polarizer which is oriented at a fixed angle with respect to the input polarization of the stage and a birefringent element or series of birefringent elements therebetween, wherein at least one stage of said filter comprises a fixed birefringent element and N chiral smectic liquid crystal cells, where N is two or more, between the polarizers of said stage said N chiral smectic liquid crystal cells having two or more optic axis orientations and means for applying an electric field to said N chiral smectic liquid crystal cells whereby the optic axis of each of said cells can be rotated between or among said optic axis orientations wherein the improvement comprises: positioning said fixed birefringent element in said stage such that it is neither the first nor the last birefringent element in said stage.

2. The improved tunable optical filter of claim 1 wherein said improvement comprises positioning said fixed birefringent element in said stage such that when the number of CSLC cells in said stage, N, is an even number, the fixed birefringent element is positioned as the $\{(N/2)+1\}^{th}$ birefringent element in the stage and when N is an odd number, the fixed birefringent element is positioned as either the $\{(N+1)/2\}^{th}$ or the $\{(N+3)/2\}^{th}$ element in said stage.

3. The improved tunable optical filter of claim 2 wherein the retardations of the N CSFLC cells in said stage are chosen such that the pure spectral outputs of said stage are also unique.

4. The improved tunable optical filter of claim 3 wherein the retardations of chiral smectic liquid crystal cells on one side of the fixed birefringent element are different than the retardations of CSFLC cells on the other side of the fixed birefringent.

5. The improved tunable optical filter of claim 1 wherein each of said stages comprises at least two chiral smectic ferroelectric liquid crystal cells.

6. The improved tunable optical filter of claim 1 wherein said chiral smectic liquid crystal cells are ferroelectric liquid crystal cells having two optic axis orientations.

7. The improved tunable optical filter of claim 5 wherein said chiral smectic ferroelectric liquid crystal cells are bistable chiral smectic SSFLC cells.

8. The improved tunable optical filter of claim 1 wherein said entrance and exit polarizers are oriented at 0° or 90° with respect to one another.

9. The improved tunable optical filter of claim 1 wherein said fixed birefringent element within a stage is oriented at an angle of ±45° with respect to the direction of polarization of light entering that stage.

10. The improved tunable optical filter of claim 1 wherein said optic axes of said chiral smectic liquid crystal cells are independently rotatable by means of said applied field between or among said optic axis orientations.

11. The improved tunable optical filter of claim 10 wherein the N chiral smectic liquid crystal cells within a stage are electronically switchable such that all of the output spectra of said stage are pure spectra.

12. The improved tunable optical filter of claim 11 wherein the retardations of the N chiral smectic liquid crystal cells in said stage are selected such that all of the pure output spectra of said stage are also unique.

13. The improved optical filter of claim wherein said chiral smectic liquid crystal cells are analog chiral smectic liquid crystal cells operated in a multiple-discrete-state mode.

14. The improved optical filter of claim 13 wherein said analog chiral smectic liquid crystal cells are either chiral smectic A electroclinic cells or distorted helix ferroelectric cells.

15. The improved tunable optical filter of claim 1 wherein the chiral smectic liquid crystal cells within a stage are oriented such that one of the optic axis orientations of each CSLC cell is at 0°, ±45° or 90° with respect to the polarization of light entering that stage.

16. The improved tunable optical filter of claim 1 wherein in each of said chiral smectic liquid crystal cells in a stage, two of the optic axis orientations of said cell are separated from each other by an angle of ±45°.

17. The improved tunable filter of claim 1 which comprises a fixed birefringent element in each stage and wherein the thicknesses of the fixed birefringent elements in the stages of said filter increase in thickness in a mathematical progression.

18. The improved tunable filter of claim 17 wherein the thicknesses of the fixed birefringent elements in the stages of said filter increase in thickness in a geometric progression.

19. The improved tunable filter of claim 17 having M stages where M is two or more wherein the number of CSLC cells in a stage is the number necessary to obtain the required number of optical states per stage as pure spectral outputs wherein the number of optical states per stage increases in the series $0, 2, 4 \ldots 2^{M-1}$ such that the thickest stage of the filter stage contains no CSLC cells.

20. The improved tunable filter of claim 19 wherein the retardations of the CSLC cells in a stage are chosen such that all pure spectral outputs of a stage are also unique.

21. An improved tunable optical filter comprising one or more optically coupled stages along a light propagation axis wherein a stage comprises an entrance polarizer and an exit polarizer which are oriented at a fixed angle with respect to each other, wherein the entrance polarizer of a stage defines the polarization of light entering that stage wherein one or more stages of said filter comprise N optically coupled chiral smectic liquid crystal cells between said polarizers wherein N is three or more, said chiral smectic liquid crystal cells each having two or more optical axis orientations and means for applying an electric field to said chiral smectic liquid crystal cells whereby the optic axis of each of said cells can be rotated between or among said optical axis orientations, the improvement which comprises independently switching said chiral smectic liquid crystal cells within said stage such that the output spectra of said stage are all pure spectra.

22. The improved tunable optical filter of claim 21 wherein the retardations of each of the chiral smectic liquid crystal cells in said stage are chosen such that all of the pure spectral outputs of said stage are unique.

23. The improved tunable optical filter of claim 21 wherein the retardations of each of the chiral smectic liquid crystal cells in said stage are different from each other.

24. The improved tunable optical filter of claim 22 wherein the sums and differences of the retardations of the chiral smectic liquid crystal cells in said stage are unique.

25. The improved tunable optical filter of claim 21 wherein the chiral smectic liquid crystal cells of said stage are discrete state chiral smectic liquid crystal cells.

26. The improved tunable optical filter of claim 25 wherein said discrete state chiral smectic liquid crystal cells are bistable surface-stabilized chiral smectic C ferroelectric liquid crystal cells.

27. The improved tunable optical filter of claim 25 wherein said discrete state chiral smectic liquid crystal cells are analog chiral smectic liquid crystal cells operated in an multiple-discrete-state mode.

28. The improved tunable optical filter of claim 20 wherein said chiral smectic liquid crystal cells are analog chiral smectic A electroclinic cells or distorted helix ferroelectric cells operated in a multiple-discrete-state mode.

29. The improved tunable optical filter of claim 20 wherein the chiral smectic liquid crystal cells within a stage are oriented such that one of the optic axis orientations of each cell is at 0°, ±45° or 90° with respect to the polarization of light entering that stage.

30. The improved tunable optical filter of claim 20 wherein in each of said chiral smectic liquid crystal cells in a stage, two of the optic axis orientations of said cell are separated from each other by an angle of ±45°.

31. The improved tunable optical filter of claim 20 wherein said entrance and exit polarizers of said stages are parallel or perpendicular with respect to each other.

32. An improved continuously tunable optical filter having one or more optically coupled stages wherein a stage comprises: an entrance polarizer which defines the polarization of light entering the stage and an exit polarizers which is oriented at a fixed angle with respect to the polarization of light entering the stage, a birefringent element which can be active or fixed and which further comprises in at least one stage an achromatic quarter-waveplate, a first analog chiral smectic liquid crystal half-wave cell and means for applying a variable electric field to said analog chiral smectic liquid crystal half-wave cell such that the optic axis of said cell can be rotated said achromatic quarter-waveplate optically coupled with said birefringent element and said first analog chiral smectic liquid crystal and positioned in said stage between said birefringent element and said analog chiral smectic liquid crystal half-wave cell wherein the improvement comprises adding to said stage N additional analog chiral smectic liquid crystal half-wave cells which are optically coupled in series with each other and said first analog chiral smectic liquid crystal half-wave cell, where N is 1 or more, and a means for applying a variable electric field to said N chiral smectic liquid crystal cell such that the optic axes of all said chiral smectic liquid crystal half-wave cells in series in said stage can be rotated such that the direction of rotation of the optic axes of sequential cells in said series of cells rotate in opposite directions and wherein the optic axes of sequential cells in said series of cells in said stage in the zero-field state with no electric field applied are perpendicular to each other.

33. The improved continuously tunable filter of claim 32 wherein N is one.

34. The improved continuously tunable filter of claim 33 wherein said two chiral smectic liquid crystal cells have a maximum tilt angle of about 11.25 ($\pi/8$).

35. The improved continuously tunable filter of claim 32 wherein said analog chiral smectic liquid crystal cells are chiral smectic A electroclinic liquid crystal half-wave cells or distorted helix ferroelectric liquid crystal cells.

36. The improved continuously tunable filter of claim 35 wherein said analog chiral smectic liquid crystal half-wave cells are chiral smectic A electroclinic liquid crystal cells.

37. The improved continuously tunable filter of claim 32 further comprising a discrete chiral smectic liquid crystal half-wave cell have two or more optic axis orientations in said stage and a means for applying an electric field to said discrete state cell such that the optic axis of the cell can be rotated between or among said optic axis orientations said discrete chiral smectic liquid crystal cell positioned in said stage either between said achromatic quarter waveplate and said series of analog chiral smectic liquid crystal cells or between said series of analog chiral smectic liquid crystal cells and the exit polarizer of said cell.

38. The improved continuously tunable filter of claim 37 which is tunable of an entire free spectral range.

39. The improved continuously tunable filter of claim 32 wherein said entrance and exit polarizers of said stage are parallel or perpendicular with respect to each other.

40. The improved continuously tunable filter of claim 32 wherein said birefringent element is a fixed birefringent element.

41. The improved continuously tunable filter of claim 40 wherein said fixed birefringent element is oriented at ±45° with respect to the plane of polarization of light entering said stage.

42. The improved continuously tunable filter of claim 32 wherein the optic axis of said achromatic quarter waveplate is oriented at 0° or 90° with respect to the plane of polarization of light entering said stage.

* * * * *

UNITED STATES PATENT AND TRADEMARK OFFICE
CERTIFICATE OF CORRECTION

PATENT NO. : 5,231,521

DATED : July 27, 1993

INVENTOR(S) : Johnson et al.

It is certified that error appears in the above-identified patent and that said Letters Patent is hereby corrected as shown below:

At column 12, line 6, "$a_2 = 0$, $a_2 \pi/4$" should be --$a_1 = 0$, $a_2 = \pi/4$--.

At column 12, equation 8, "$e^{-\Gamma_i(\lambda)/2}0$" should be -- $e^{-i\Gamma_j(\lambda)/2}$    0--. Note: the "0" should appear in column two of the matrix.

At column 14, line 45 (equation 12), delete "ti".

At column 16, line 4, after "listed in" insert --Table 1, the number of pure--, and after "2,4,6," insert --9 and 12,--.

At column 16, Table 2, insert the numeral --1-- at the first row of the column under "N".

At column 20, equation 20, the "2" appearing on the right side of the righthand bracket should be deleted.

At column 25, line 24, "$S_1$-$S_3$" should be --$\hat{S}_1$-$\hat{S}_3$--.

At column 29, equation 50, " = $_i($" should be -- = $T_j($-- .

At column 30, line 59, "$\lambda_1$," should be --$\lambda_d$--.

At column 31, equation 62, second line, "2a]" should be --[2a]--.

At column 35, line 37, delete the hyphen after "=(". Hyphenating the equation indicates that the next value is a negative; this should not be done.

UNITED STATES PATENT AND TRADEMARK OFFICE
CERTIFICATE OF CORRECTION

PATENT NO. : 5,231,521

DATED : July 27, 1993

INVENTOR(S) : Johnson et al

Page 2 of 2

It is certified that error appears in the above-indentified patent and that said Letters Patent is hereby corrected as shown below:

At column 37, line 54, delete the hyphen after " = ".

Signed and Sealed this

Third Day of May, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,231,521
DATED : July 27, 1993
INVENTOR(S) : Johnson et al

It is certified that error appears in the above-indentified patent and that said Letters Patent is hereby corrected as shown below:

At Column 12, equation 8, should read $$-- \quad W(\Gamma_i, 0) = \begin{vmatrix} e^{-i\Gamma_i(\lambda)/2} & 0 \\ 0 & e^{i\Gamma_i(\lambda)/2} \end{vmatrix} \quad --$$

Signed and Sealed this

Thirty-first Day of May, 1994

Attest:

BRUCE LEHMAN

*Attesting Officer*  *Commissioner of Patents and Trademarks*